(12) United States Patent
Koyama

(10) Patent No.: US 7,551,376 B2
(45) Date of Patent: Jun. 23, 2009

(54) LENS BARREL, AND CAMERA, MOBILE INFORMATION TERMINAL AND IMAGE INPUT DEVICE USING THE LENS BARREL

(75) Inventor: Terunori Koyama, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 23 days.

(21) Appl. No.: 11/754,380

(22) Filed: May 29, 2007

(65) Prior Publication Data

US 2008/0007847 A1 Jan. 10, 2008

(30) Foreign Application Priority Data

May 26, 2006 (JP) .............................. 2006-146445

(51) Int. Cl.
G02B 7/02 (2006.01)
(52) U.S. Cl. ...................................... 359/823; 359/811
(58) Field of Classification Search ......... 359/694–698, 359/704, 823, 722, 723, 725, 726, 811
See application file for complete search history.

(56) References Cited

U.S. PATENT DOCUMENTS 5,708,872 A * 1/1998 Fukino ....................... 396/133
6,008,954 A * 12/1999 Shintani et al. ............. 359/704

FOREIGN PATENT DOCUMENTS

| JP | 2003-149723 | 5/2003 |
|---|---|---|
| JP | 2003-315861 | 11/2003 |
| JP | 2006-243549 | 9/2006 |
| JP | 2006-243569 | 9/2006 |
| JP | 2006-243589 | 9/2006 |
| JP | 2006-243605 | 9/2006 |
| JP | 2006-243606 | 9/2006 |
| JP | 2006-250976 | 9/2006 |
| JP | 2006-250996 | 9/2006 |
| JP | 2006-251112 | 9/2006 |
| JP | 2006-251162 | 9/2006 |
| JP | 2006-251668 | 9/2006 |
| JP | 2006-259344 | 9/2006 |
| JP | 2006-330657 | 12/2006 |
| JP | 2007-010899 | 1/2007 |
| JP | 2007-114323 | 5/2007 |
| JP | 2008-15119 | 1/2008 |
| JP | 2008-64800 | 3/2008 |
| JP | 2008-076581 | 4/2008 |
| JP | 2008-076713 | 4/2008 |
| JP | 2008-090065 | 4/2008 |
| JP | 2008-090201 | 4/2008 |

* cited by examiner

Primary Examiner—Ricky L Mack
Assistant Examiner—Vipin M Patel
(74) Attorney, Agent, or Firm—Oblon, Spivak, McClelland, Maier & Neustadt, P.C.

(57) ABSTRACT

The invention is directed to a lens barrel and an image input device including the lens barrel. The invention includes a third lens retention frame. The third lens retention frame includes an arm, an outer frame, a rotatable slider movable in an optical axis direction with respect to the outer frame for retaining a third lens group, and a spring for energizing the rotatable slider to the optical axis direction with respect to the outer frame. The rotatable slider takes two positions alternately every time it is pushed by an external force that is applied to the optical axis direction a forward position toward the subject side in the optical axis direction with respect to the outer frame and a backward position toward the image side in the optical axis direction with respect to the outer frame.

12 Claims, 65 Drawing Sheets

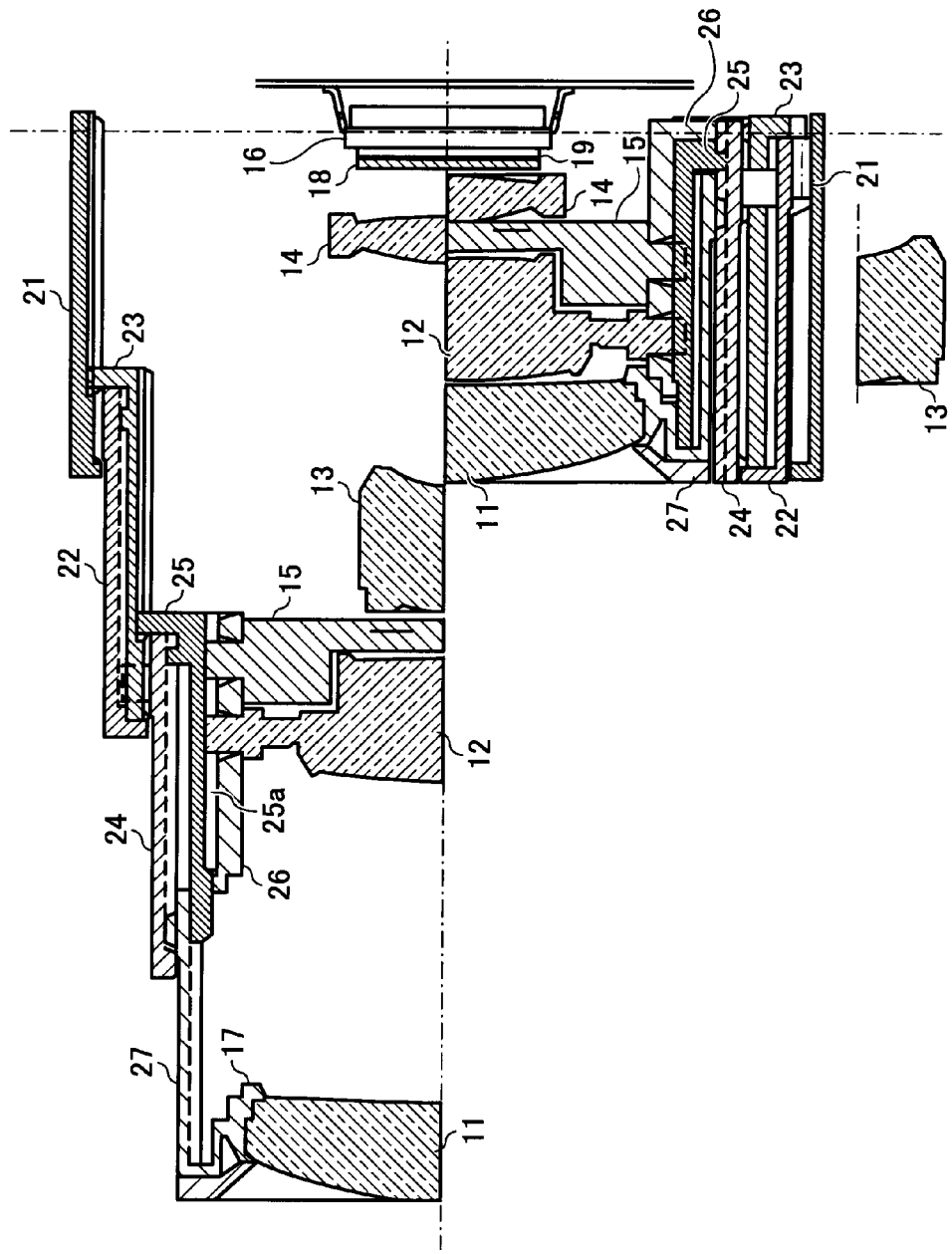

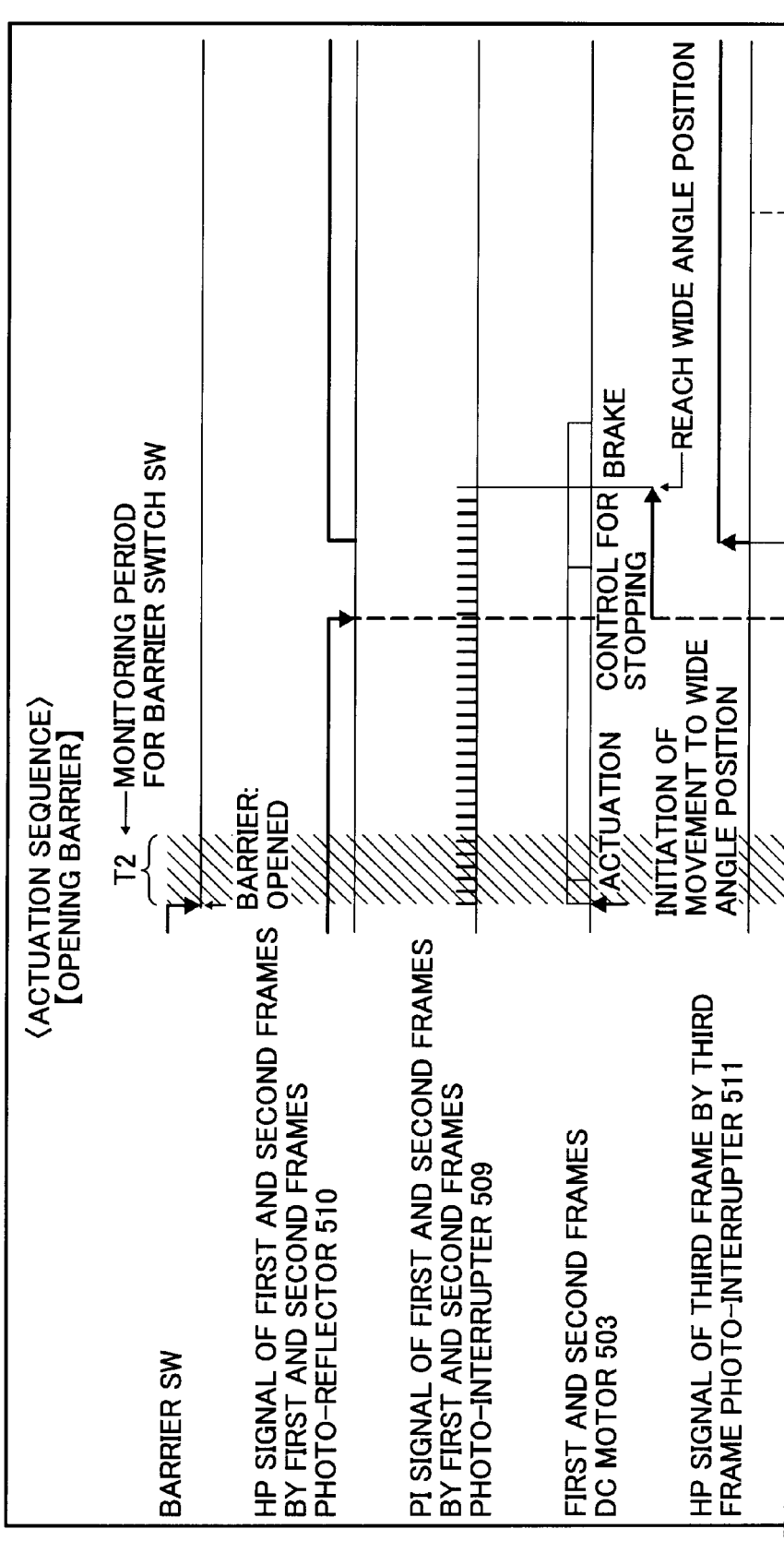

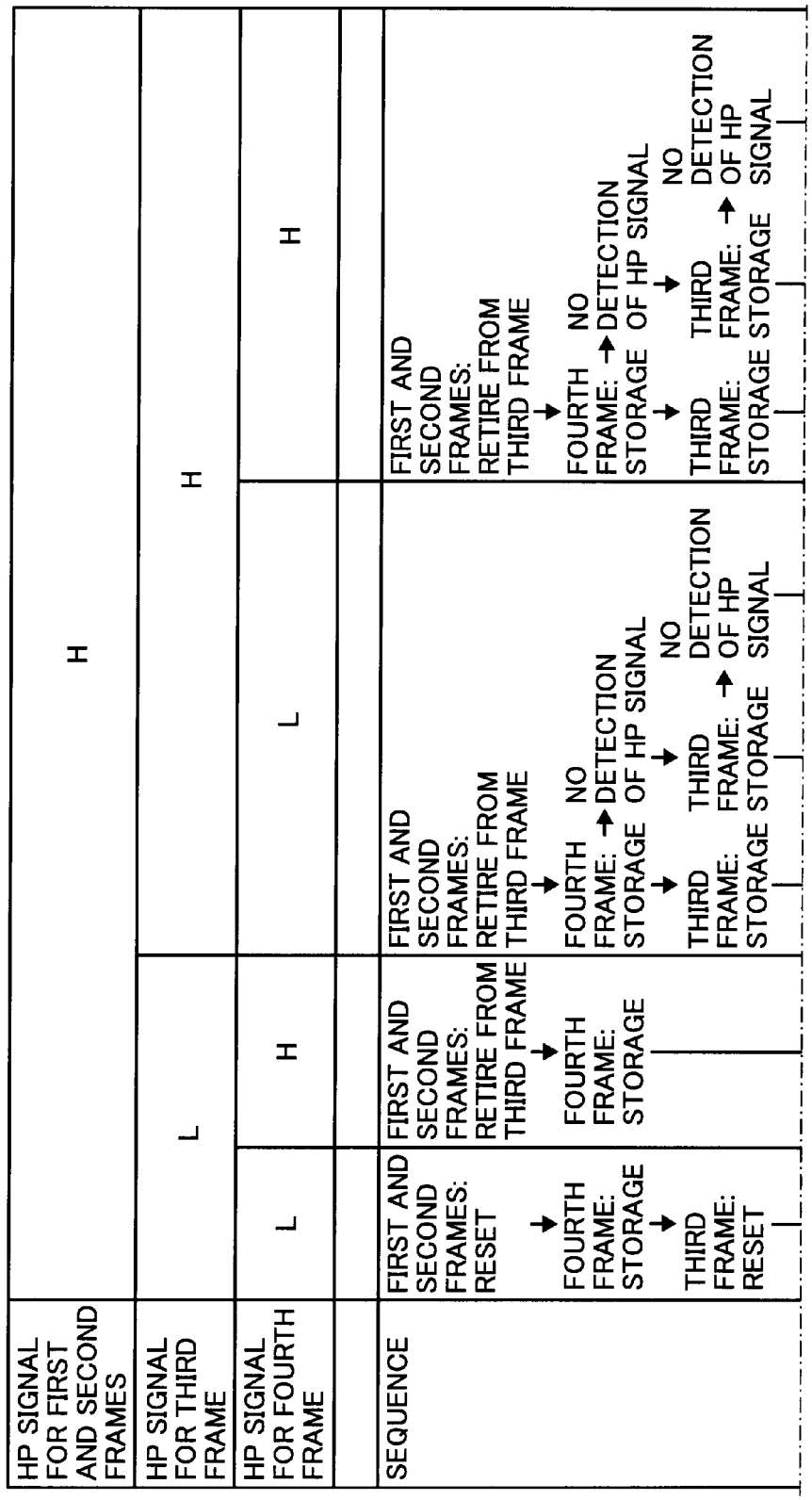
FIG. 24A1A

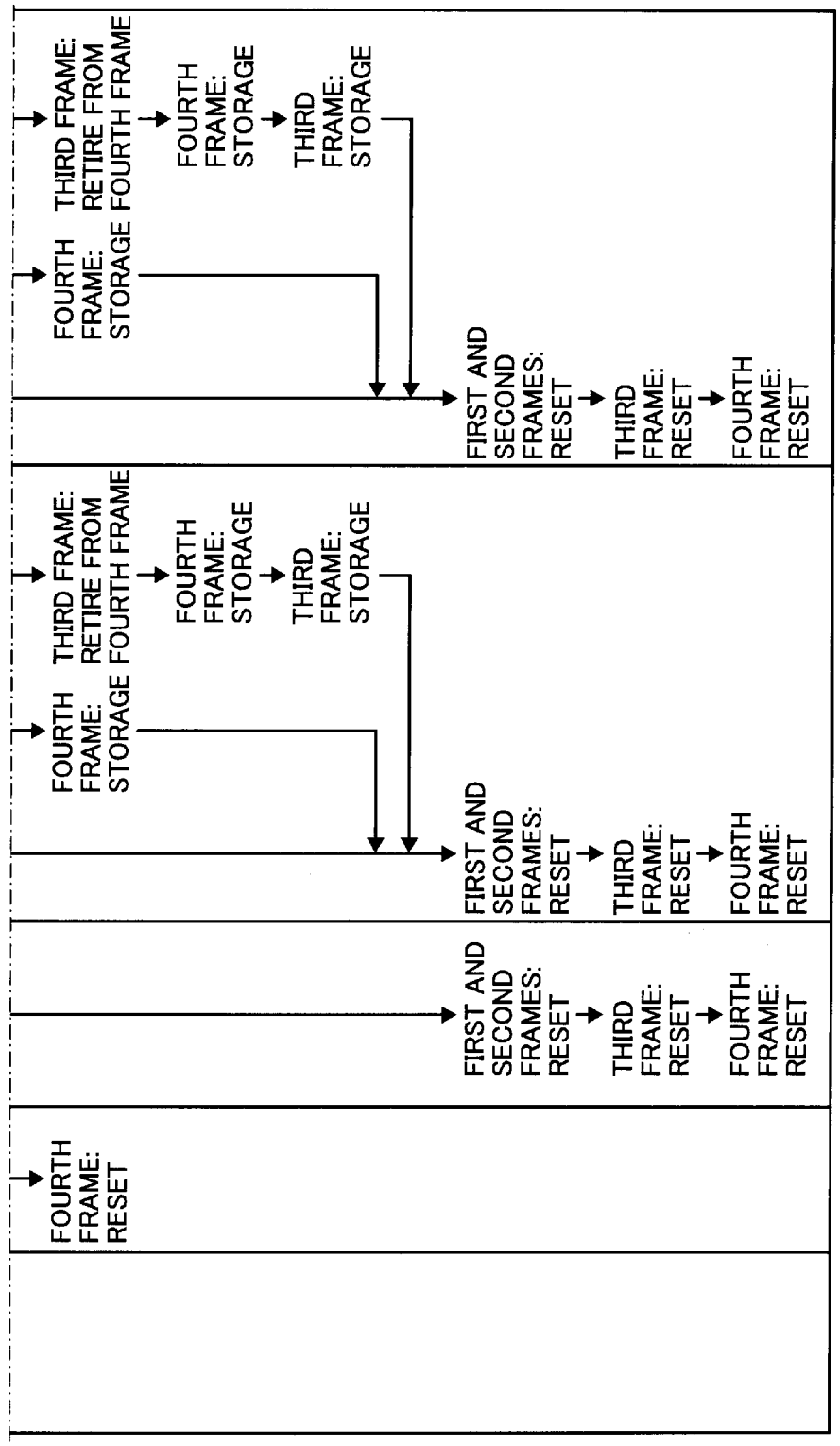
FIG. 24A1B

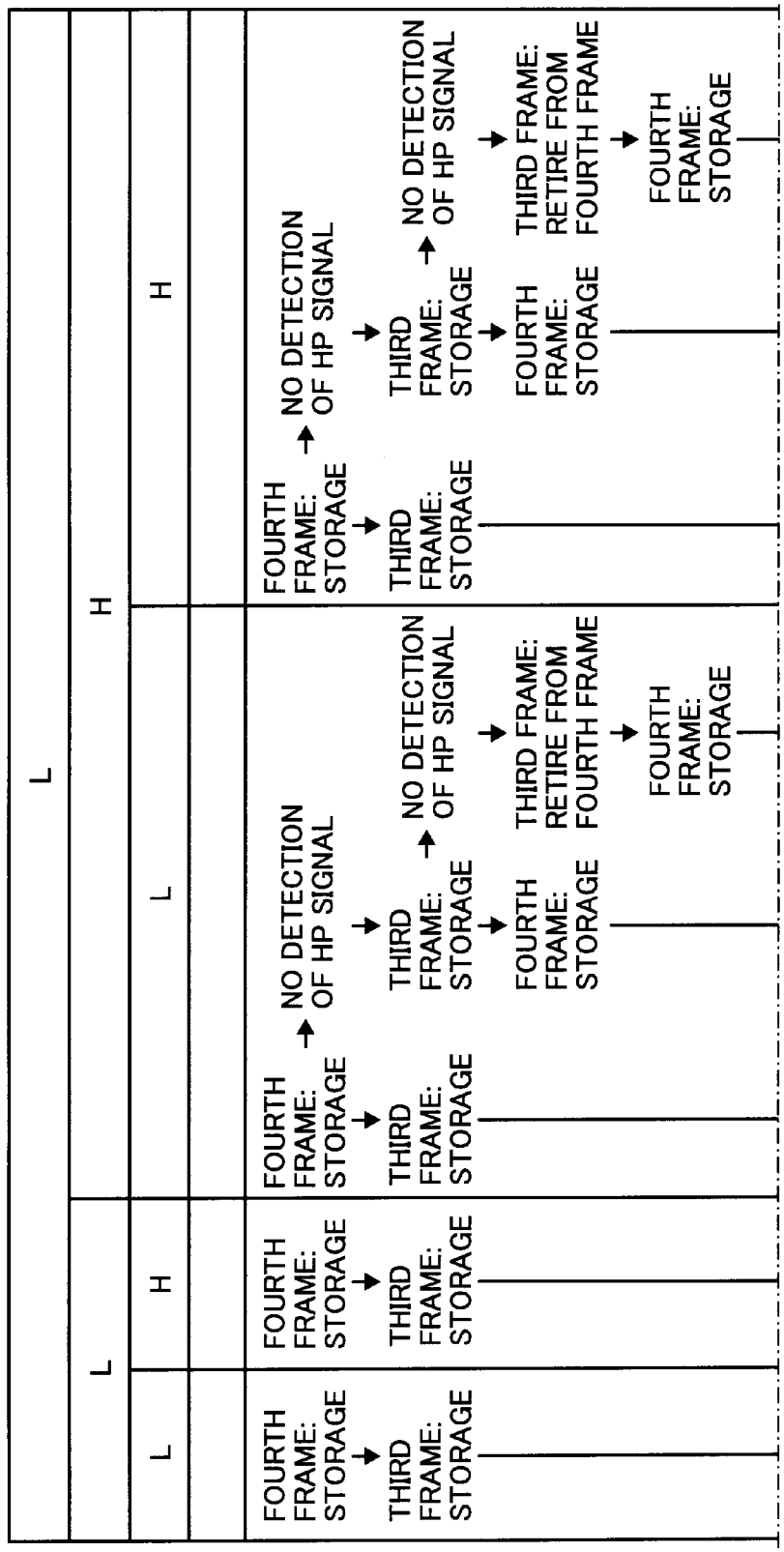

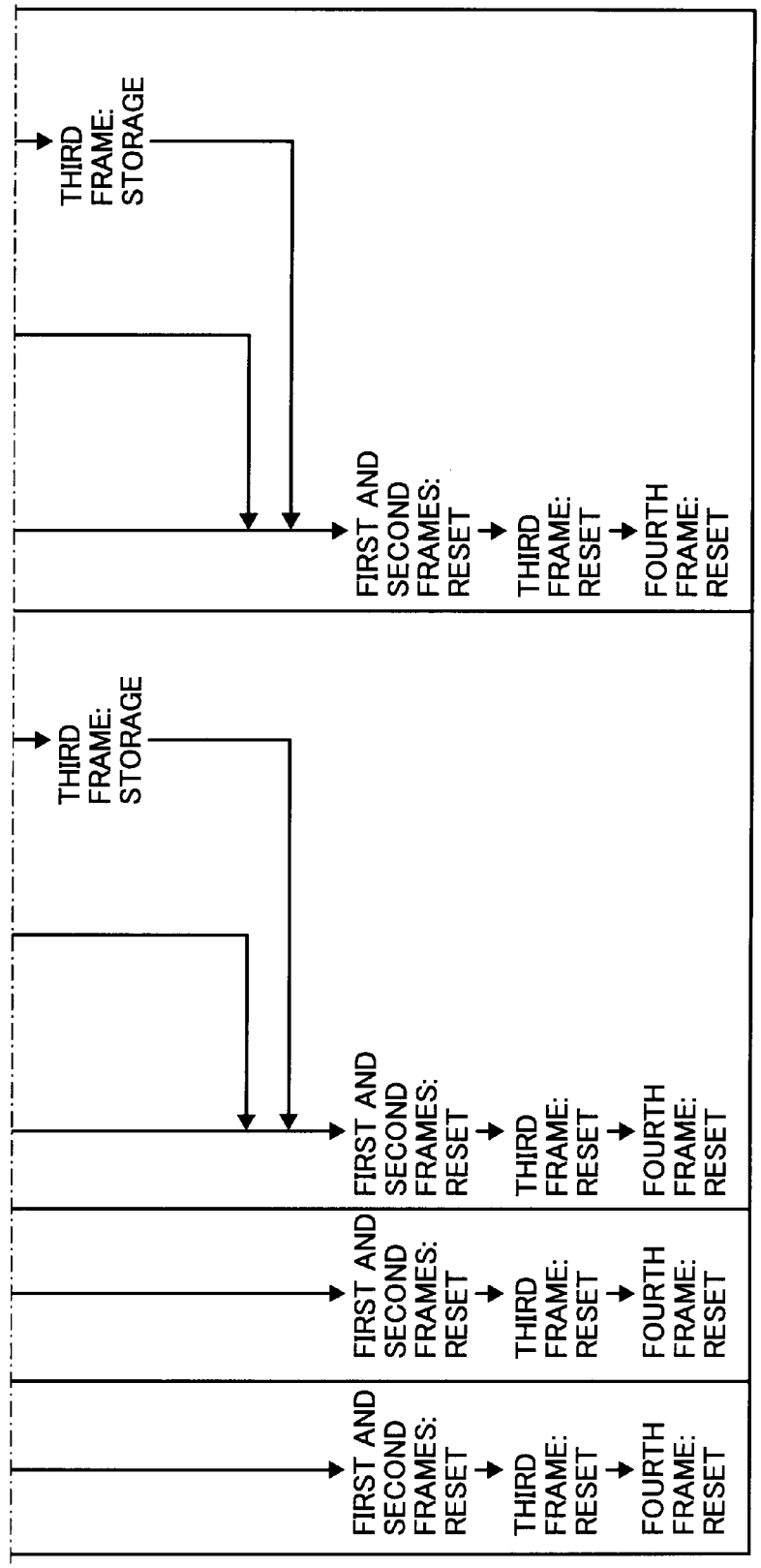

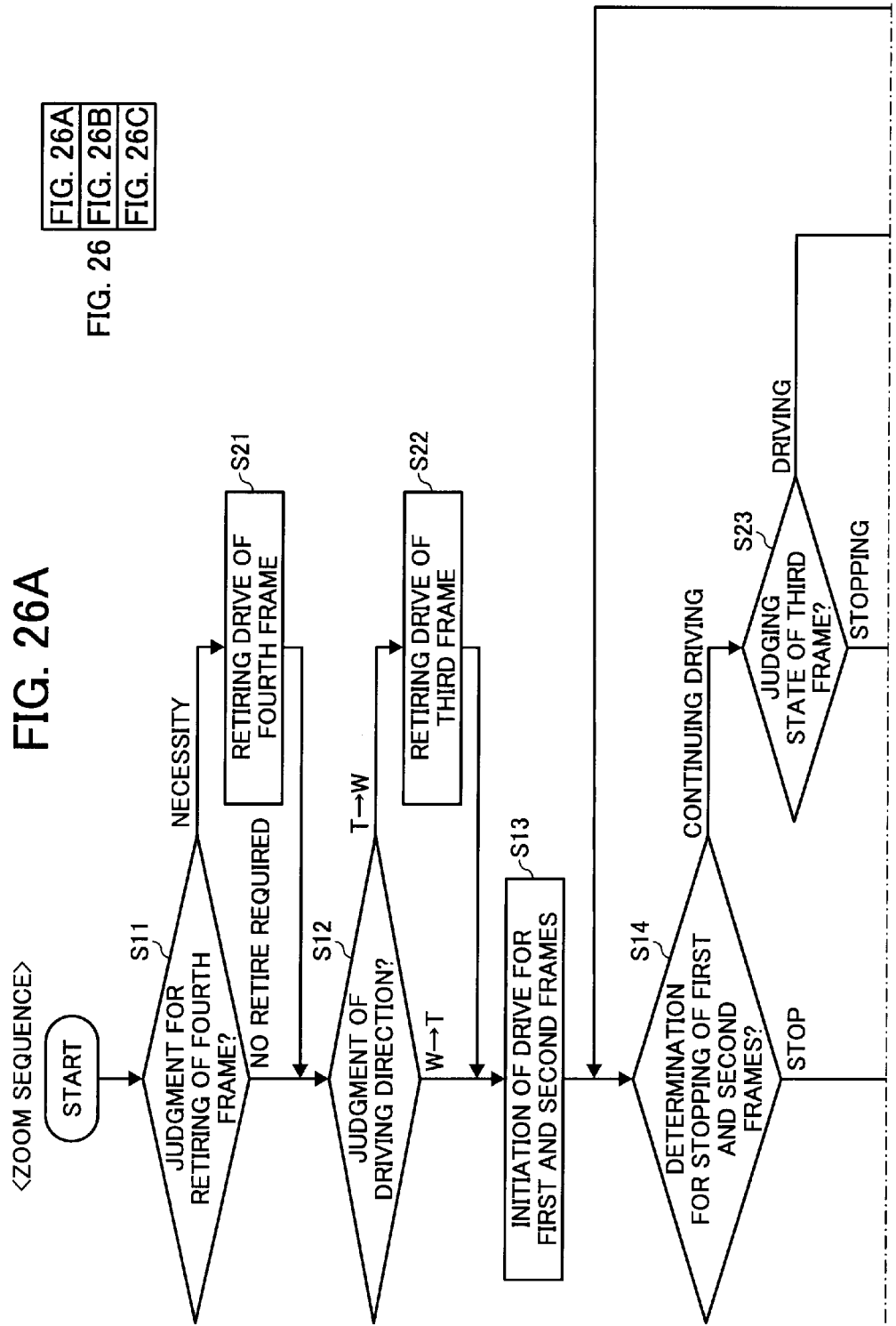

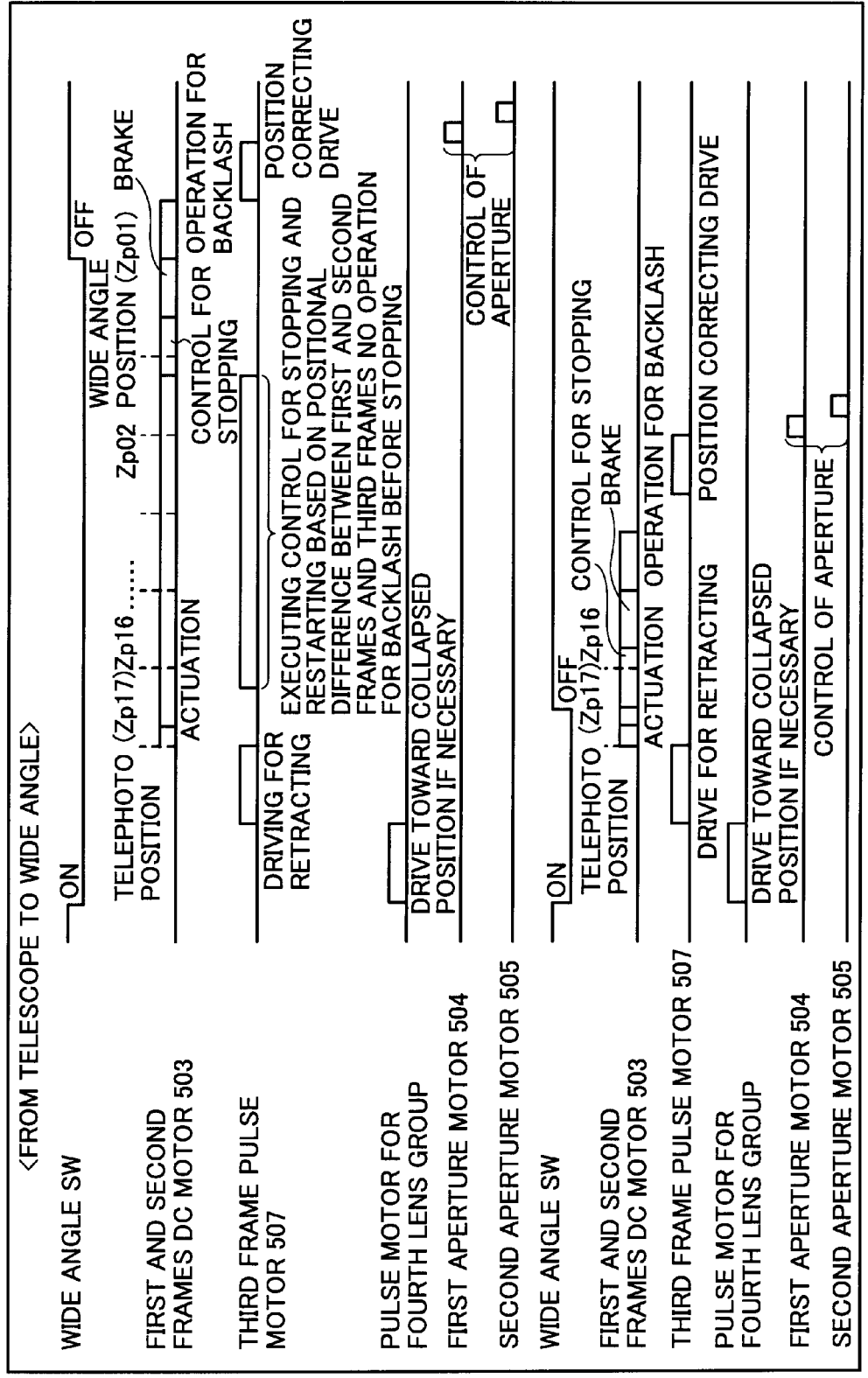

FIG. 30A
(a)
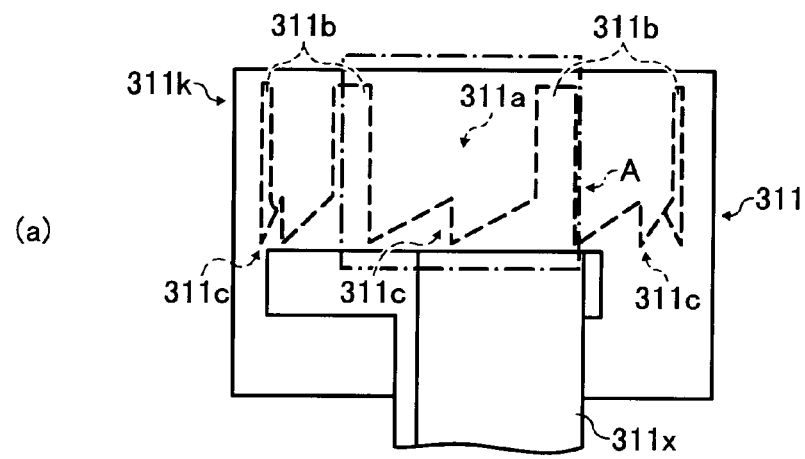
(b)
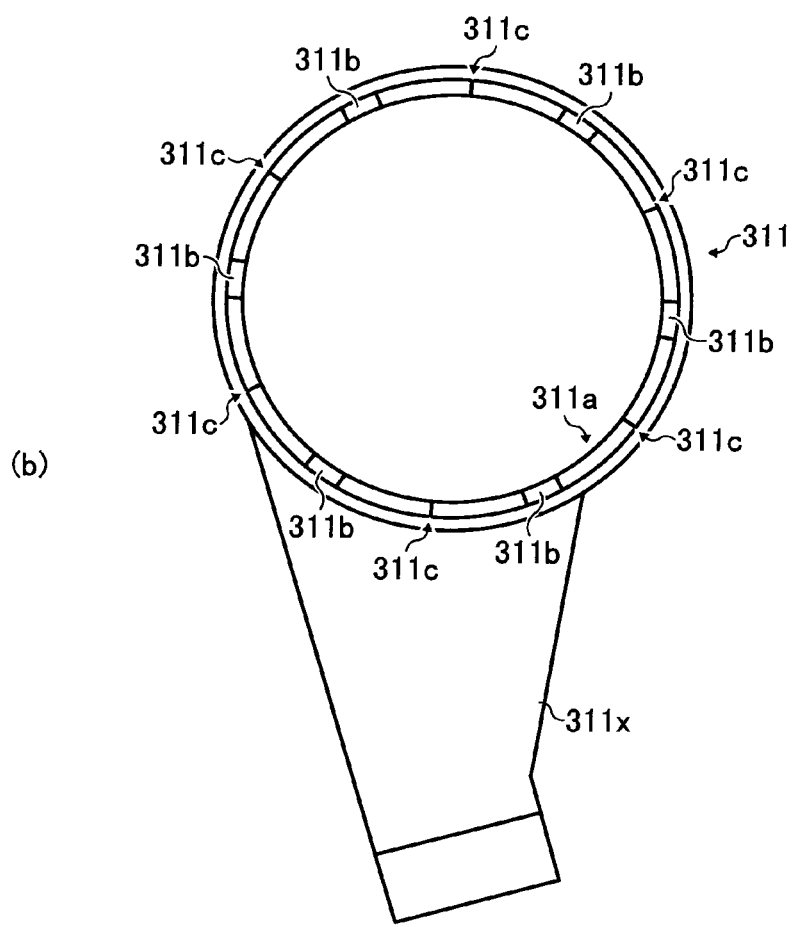

FIG. 30C
(a)
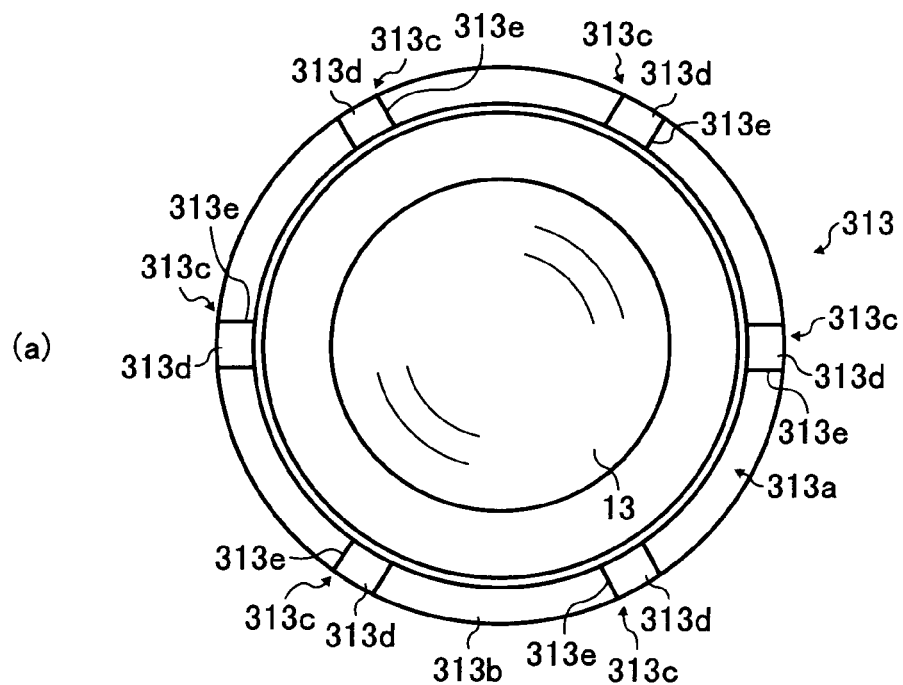
(b)
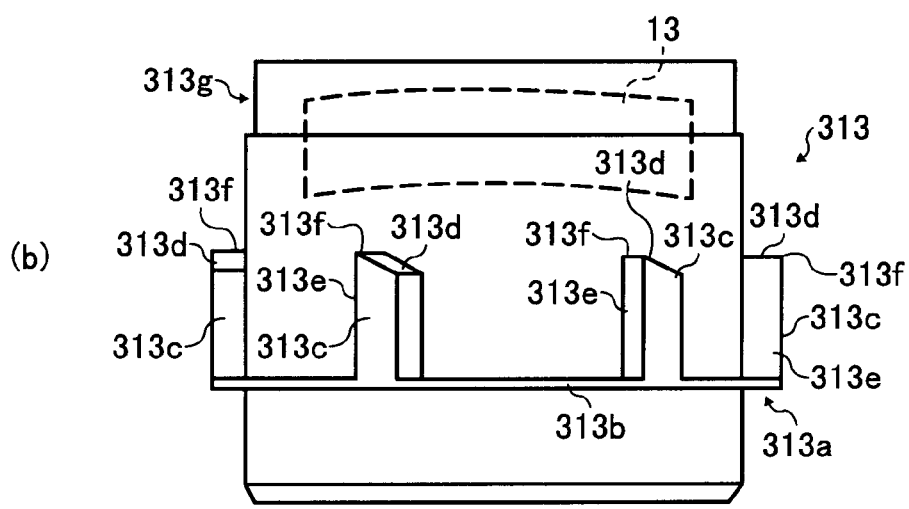

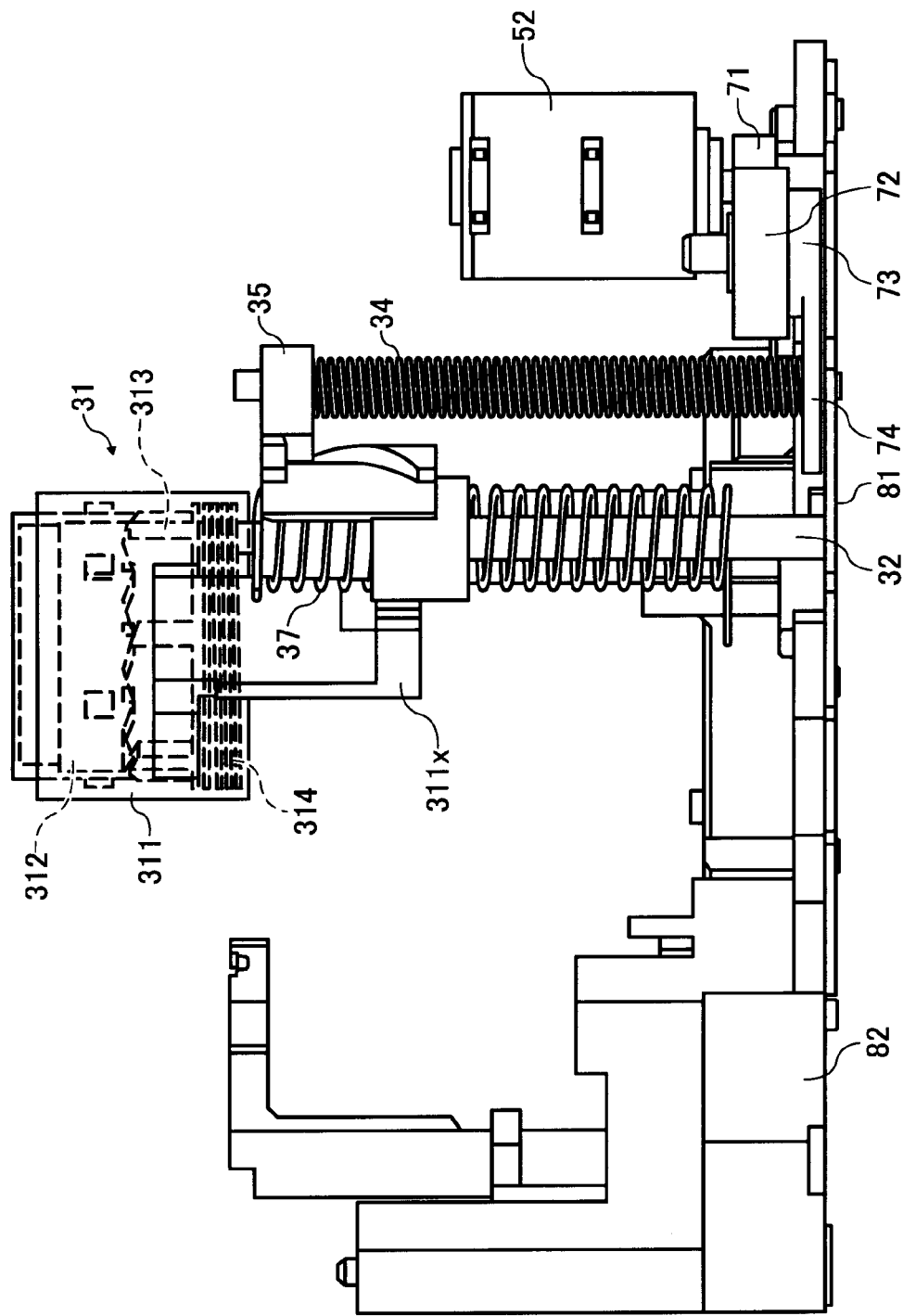

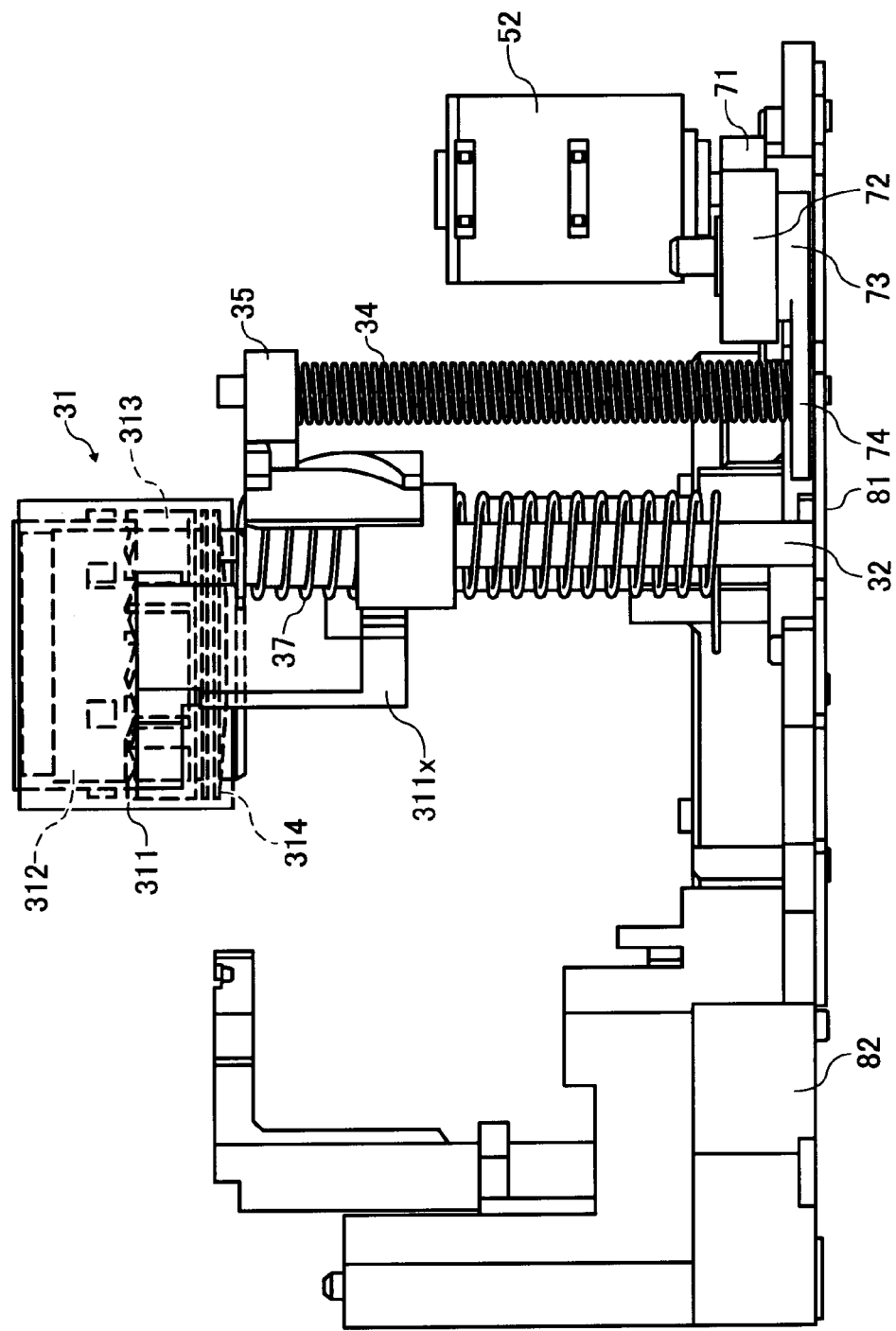

FIG. 32
(a) 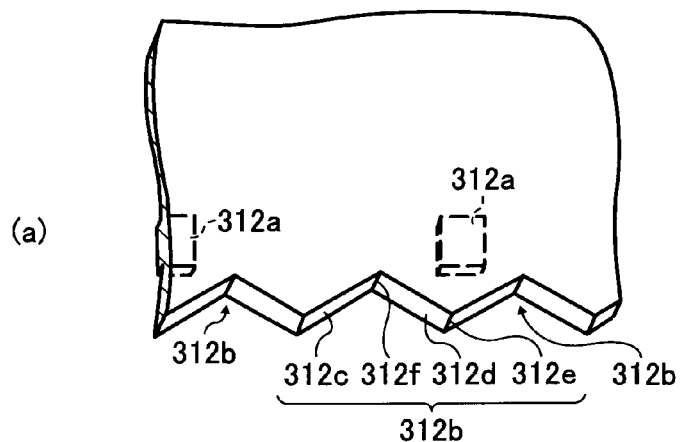
(b) 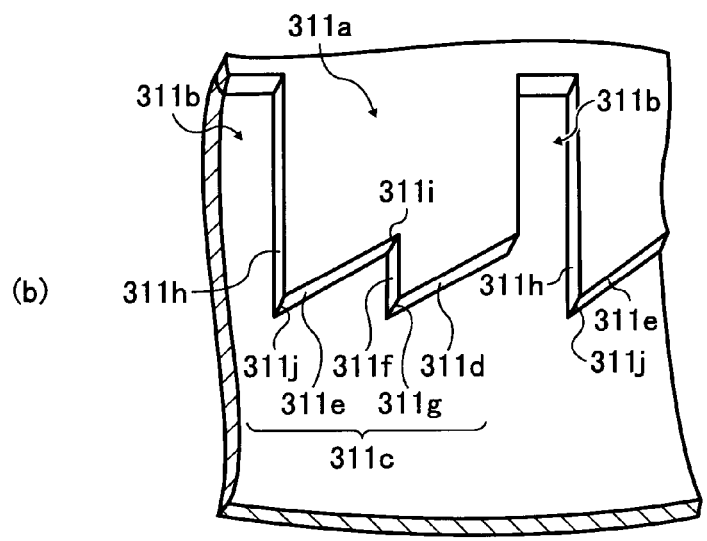
(c) 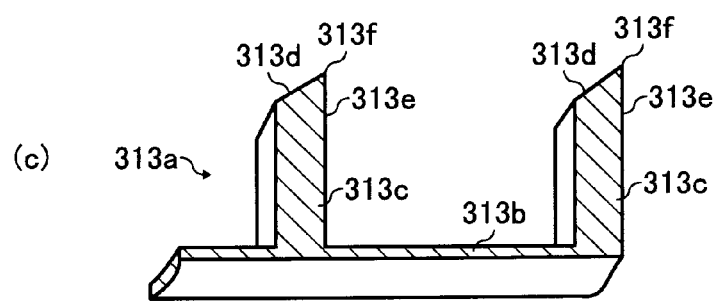

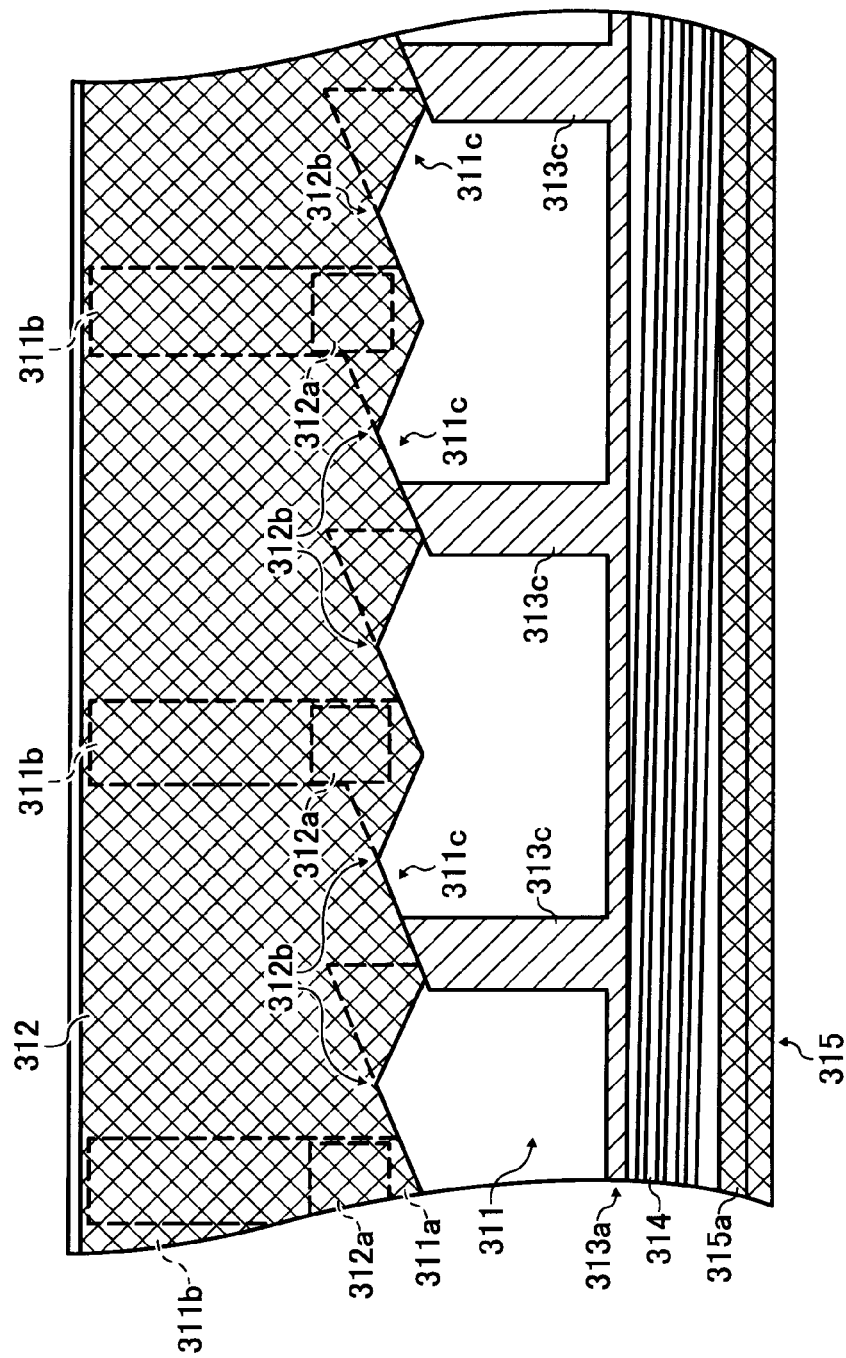

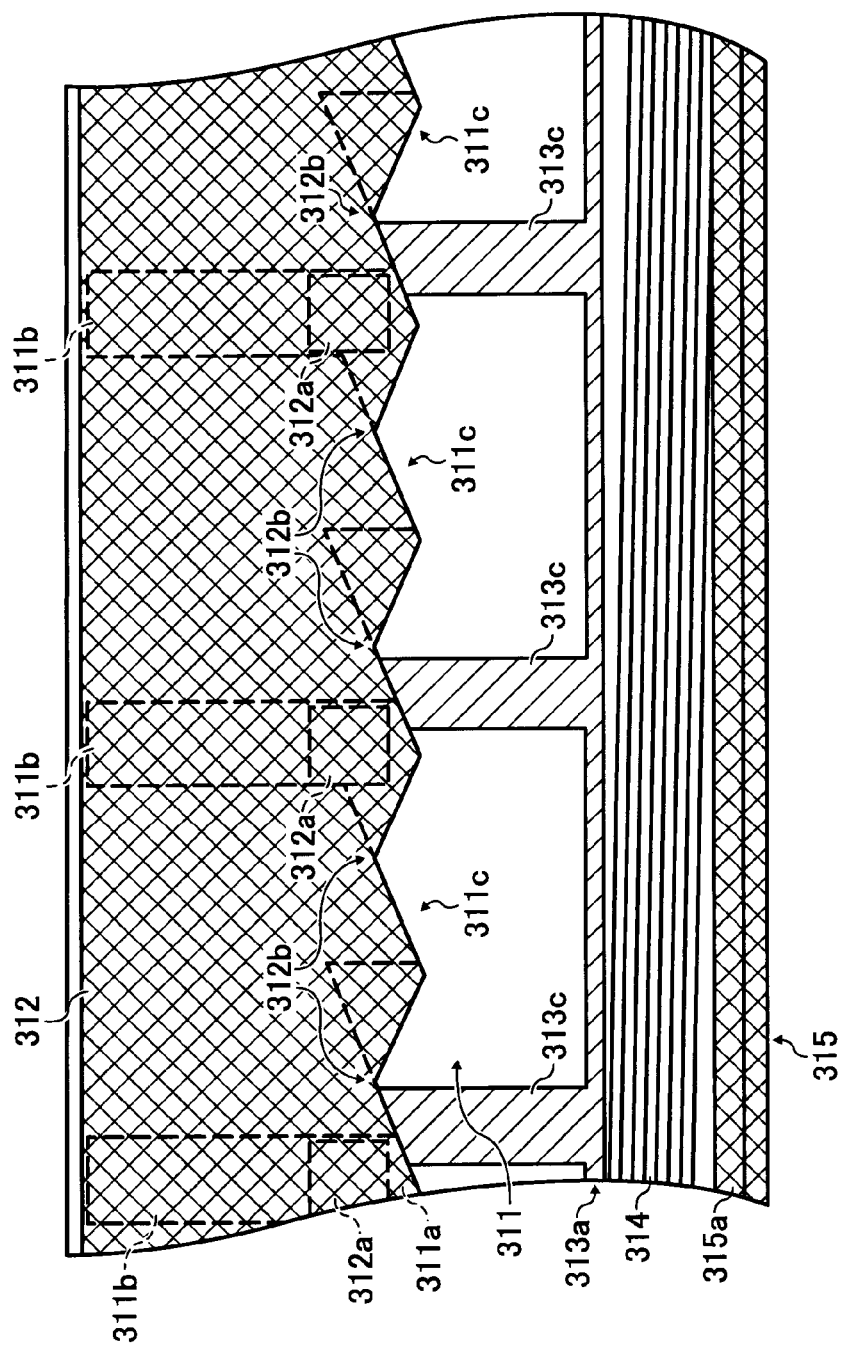

LENS BARREL, AND CAMERA, MOBILE INFORMATION TERMINAL AND IMAGE INPUT DEVICE USING THE LENS BARREL

CROSS-REFERENCE TO RELATED APPLICATIONS

This application claims priority from Japanese Patent Application No. 2006-146445, filed with the Japanese Patent Office on May 26, 2006, the contents of which are incorporated herein by reference in their entirety.

BACKGROUND OF THE INVENTION

1. Field of the Invention

The present invention relates to an improvement in a lens barrel by which photographing is enabled when at least a part of a plurality of lens groups that is retracted inside a body is pushed out to a subject side in an optical axis direction, and also to an improvement of a camera, a digital camera, a portable information terminal and an image input device including the lens barrel, respectively.

2. Description of the Related Art

Conventionally, with the development of high performance of a photographic lens such as a zoom lens and miniaturization of an imaging device such as a digital camera by the request of users, the digital camera requires a photographic lens whose movable barrel is retracted into the imaging device (camera body) when not in use.

Moreover, based on the demand for reduction in thickness of the camera body, it is highly respected that the dimensions of the movable barrel, when in retracted, in a photographic optical axis direction are made minimum.

Based on the demand for reduction in thickness of the camera body, some techniques are disclosed in which at least a part of lens groups recedes from a photographic optical axis when the movable barrel is collapsed inside the camera body.

According to the techniques, since a part of lens groups recedes from a photographic optical axis when the movable barrel is retracted, the dimensions of the movable barrel in the photographic optical axis direction can be made smaller. Accordingly, the camera body can be made thicker (see, for example, Japanese Patent Publications 2003-315861 and 2003-149723).

However, the two patent Publications disclose that because a position to which the lens group has receded from the photographic optical axis is inside a maximum outer diameter of a fixed cylinder of the camera body, the dimension of the movable barrel, when retracted, in a photographic optical axis direction can be made smaller. Owing to the larger outer diameter of the fixed cylinder, some inconvenience is caused that the camera body (imaging device) looks larger, when viewed from a front (a subject in the optical axis direction).

Therefore, in order to enable photographing, at least a part of a plurality of lens groups is moved to a subject in the optical axis direction from a retracted state in which the part is collapsed to be retracted into the body. To carry this out, the following lens barrel is proposed. The lens barrel includes a plurality of lens retention frames for retaining the plurality of lens groups for each lens group, a movable barrel for maintaining the lens retention frames inside, and a retention frame drive unit for driving the lens retention frame through the movable barrel. The lens retention frame includes a receding lens retention frame by which all the lens groups are placed on a photographical optical axis when the camera is ready to take pictures, and at least one lens group is moved so that the one lens group is receded to a position that is different from one on the photographic optical axis and that is outside the maximum outer diameter for the movable barrel of the other lens groups when retracted.

It is required that this technique makes at least a part of lens groups recede from, come closer to, or move along, the photographic optical axis.

The receding lens retention frame is required to have a width of the device requested by users when the movable barrel is collapsed, and to be advanced to a position at which an image is formed when photographs are taken.

Especially with regard to a lens system having high magnification, a moving range of the receding lens retention frame is larger to the subject in the optical axis direction, compared with a lens system having low magnification. When the above technique is applied, the width of the device requested by users cannot be realized at the time the movable lens is retracted. Accordingly it is difficult to have both the width of the device requested by users and high magnification.

For the foregoing reasons, there is a need for a lens barrel that can make smaller a lens system of a plurality of lenses groups, which leads to a small width of the device, and that can make the lens system higher magnification. There is also a need a camera, a digital camera, a portable information terminal, and an image input device including the lens barrel therein, respectively.

SUMMARY OF THE INVENTION

The present invention is directed to a lens barrel that satisfies this need. The present invention is also directed to a camera, a digital camera, a portable information terminal, and an image input device including the lens barrel therein, respectively.

The lens barrel provided in a body comprises a plurality of lens groups; a plurality of lens retention frames for retaining each of the plurality of lens groups to make a collapsed state of collapsing at least a part of the plurality of lens groups by retracting the lens groups inside the body and make a photographing state of photographing a subject by moving the part of the plurality of lens groups to a subject side in an optical axis direction from the collapsed state; a movable lens cylinder for retaining the lens retention frames inside; and a lens retention frame drive unit for driving the movable lens cylinder, wherein, in the photographing state, the lens retention frames dispose all of the lens groups at a photographing position on a photographic optical axis, and in the collapsed state, at least one of the lens retention frames recedes the lens group thereof at a collapsed position that is not on the photographic optical axis and is outside a maximum outer radius of the movable lens cylinder of the other lens groups. And the one retention frame comprises an arm for moving the receding lens group between the photographing position and the collapsed position; an outer frame incorporating the arm; an inner frame movable to the optical axis direction with respect to the outer frame for holding the lens group thereof; and an energizing unit provided between the outer frame and the inner frame for energizing the inner frame to the optical axis direction with respect to the outer frame, wherein every time the inner frame is pushed by an external force applied to the optical axis direction, the inner frame is constructed to alternately takes two positions of a forward position and a backward position, the forward position proceeding forward to the subject side in the optical axis direction with respect to the outer frame, the backward position proceeding backward to the image side in the optical axis direction with respect to the outer frame.

Preferably, a lens barrel further comprises a fitting groove formed to extend to the outer frame parallel to the optical axis; and a fitting protrusion formed to fit in with and be guided by the fitting groove in the inner frame, wherein the two positions are formed, according to a state when the fitting groove and the fitting protrusion are fitted and another state when they are not.

Preferably, the inner frame is pushed to a direction of the image side of the optical axis direction with respect to the outer frame.

Preferably, the inner frame is pushed to a direction of the subject side of the optical axis direction with respect to the outer frame.

Preferably, the inner frame is pushed to the optical axis direction with respect to the outer frame by driving the one lens retention frame.

Preferably, the inner frame is pushed to the optical axis direction with respect to the outer frame by driving the movable lens cylinder.

Preferably, the inner frame is pushed to the optical axis direction with respect to the outer frame by a force from a user.

Preferably, a camera comprises the lens barrel described above.

Preferably, a digital camera comprises the lens barrel described above.

Preferably, a portable information terminal comprises the lens barrel described above.

Preferably, an image input device comprises the lens barrel described above.

BRIEF DESCRIPTION OF THE DRAWINGS

These and other features, aspects, and advantages of the present invention will become better understood with regard to the following description, appended claims, and accompanying drawings.

FIGS. 9A and 9B are a vertical cross sectional view showing, in an upper half and a lower half with respect to an optical axis, main parts of the lens groups, the lens retaining frames, and the various lens cylinders of the lens barrel; FIG. 9A is in the photographing state in which the lens groups are extended or protruded, and FIG. 9B is in the collapsed state in which the lens groups are retired to be collapsed, respectively.

FIGS. 17A and 17B are perspective views showing an exterior appearance and a structure of a camera according to the related art of the present invention as viewed from the subject in the optical axis direction, in which FIG. 17A shows a state in which a photographing lens is collapsed in a body of the camera, and FIG. 17B shows a state in which the photographing lens is projected or extended from the camera body.

FIG. 24 B is a timing chart for the reset sequence.

FIG. 28 is a timing chart showing a zoom sequence when the zoom is adjusted from a telephoto position to a wide angle position.

FIG. 30A is a two-face view of the outer frame of the third lens retention frame in accordance with the embodiment of the invention.

FIG. 30C is a two-face view of the rotatable slider of the third lens retention frame in accordance with the embodiment of the invention.

FIG. 31A is a side view of the third lens retention frame in which the rotatable slider has moved backward to a position called a retraction state on the image side in the optical axis direction with regard to the outer frame.

FIG. 31F is a side view of the third lens retention frame in which the rotatable slider is rotating by a spring with regard to the outer frame, showing the state immediately after the state of FIG. 31E.

FIG. 32 is an exploded perspective view of FIG. 29C.

FIG. 32C is a structural view of the circumferential wall of the rotatable slider 313, in which the rotatable slider is being rotated by the spring with regard to the outer frame, showing a state immediately after the state shown in FIG. 32B.

FIG. 32F is a structural view of the circumferential wall of the rotatable slider 313, in which the rotatable slider is being rotated by the spring with regard to the outer frame, showing the state immediately after the state shown in FIG. 32E.

FIGS. 33A-C represent a concept view of a lens barrel for explaining an operating method of the third lens retention frame in accordance with the embodiment of the invention, in which:

FIG. 33A shows the third lens retention frame that is placed on a photographic axis;

FIG. 33B shows the third lens retention frame that is moved forward to the subject side in the optical axis direction; and FIG. 33C is a side view of a second rotary barrel and a straightforward barrel that are moved out to the subject side in the optical axis direction.

DETAILED DESCRIPTION OF THE PREFERRED EMBODIMENTS

Before describing a lens barrel in accordance with an embodiment of the present invention, a lens barrel in the related reference (Japanese Patent Application 2005-044909) of the present invention and a camera using the lens barrel will be explained, referring to FIGS. 1-28.

FIGS. 1 to 16B and 20 illustrate a structure of a main part of an optical system device including a lens barrel and various kinds of operation.

In FIGS. 1 to 16B and 20, the lens barrel includes a fixed frame 21 having a fixed cylinder 21a, a telescopic cylinder unit or telescopic cylinder attached to the fixed frame 21, and a plurality of lens groups disposed in the telescopic cylinder. The telescopic cylinder is movable and collapsible along an optical axis X of the plurality of lens groups.

Figure 9B:
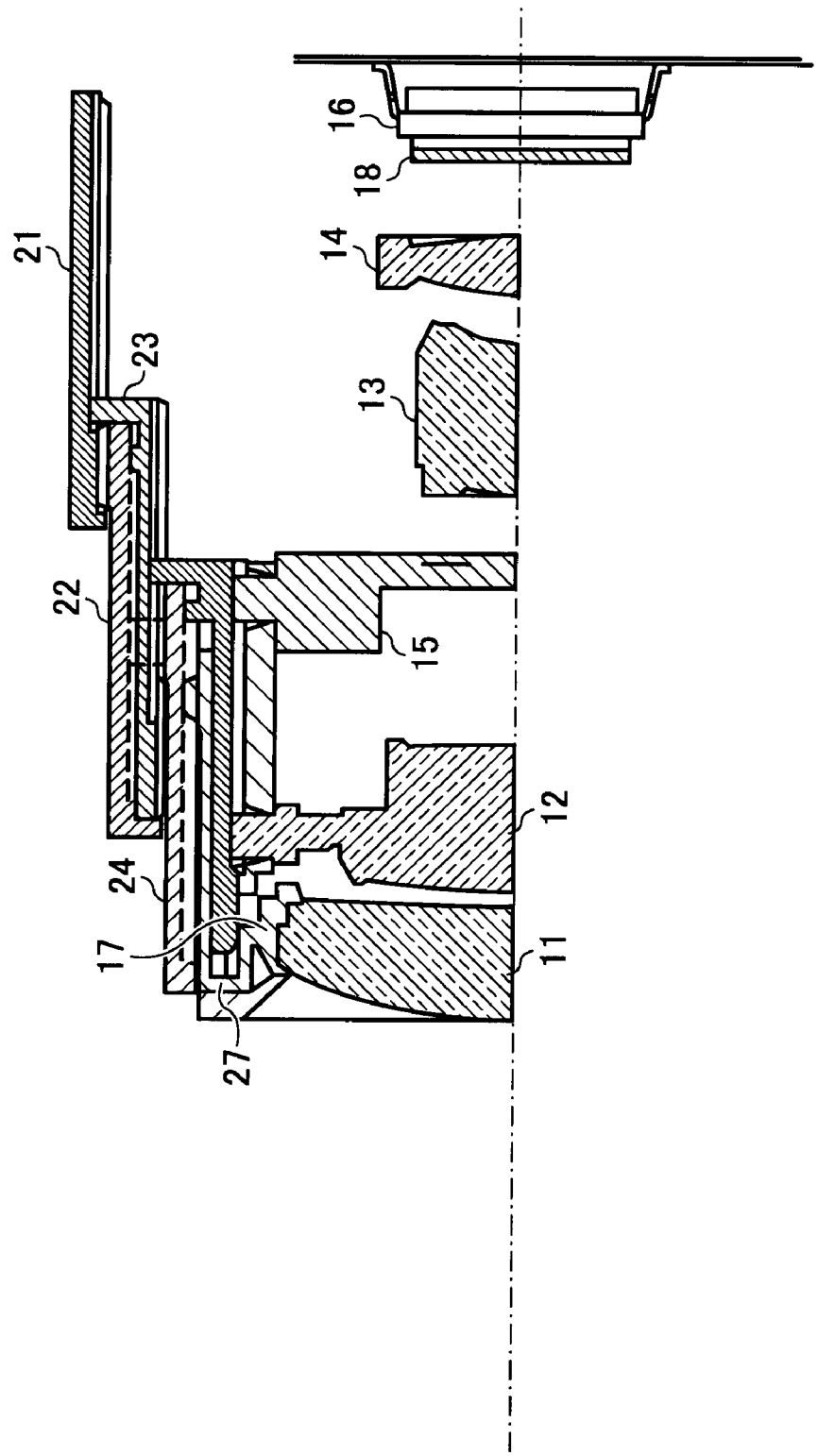

The lens groups comprise, for example, a first lens group 11, a second lens group 12, a third lens group 13, and a fourth lens group 14, which are disposed in the telescopic cylinder (see FIGS. 9A and 9B).

The telescopic cylinder includes, for example, a first rotary cylinder 22, a first liner 23, a second rotary cylinder 24, a second liner 25, a cam cylinder 26, a lineally-moving cylinder 27, and a third frame 31 (see FIGS. 5 and 8) for retaining the third lens group 13. As described below, the first rotary cylinder 22 and so on are moved along the optical axis with respect to each other with the plurality of lens groups 11 to 14. Any shape or structure may be used instead of the telescopic cylinder. For example, a plurality of peripherally spaced slidable bars or bands may be used without being limited to the cylinder shape of the telescopic cylinder.

As shown in FIGS. 9A and 9B, the first, second, third, and fourth lens groups 11, 12, 13, and 14 are positioned from a subject (not shown) in sequence and disposed on the optical axis X. A shutter/aperture unit 15 is disposed between the second lens group 12 and the third lens group 13. The first, second, third, and fourth lens groups 11, 12, 13, and 14, and the shutter/aperture unit 15 are configured to be movable in a direction of the optical axis when the telescopic cylinder is moved along the optical direction.

To use the lens barrel for image forming apparatuses or optical devices such as digital cameras or the like, as described hereinafter, for example, a solid-state image-sensing device 16 comprising a CCD (charge-coupled device) or the like is disposed adjacent to the side of an image forming plane of the fourth lens group 14.

Referring to FIGS. 9A and 9B, the first lens group 11 is attached to a first frame 17, and a cover glass 18 and a low-pass filter 19 are disposed adjacent to an image-receiving surface of the CCD 16, if needed.

Generally, as shown in FIGS. 9A and 9B, the lens barrel is structured such that the first to fourth lens groups are movable between a collapsed position S stored in the fixed cylinder 21a and an extended position D extended out of the fixed cylinder 21a, a zooming is achieved, and at least one lens group of the first to fourth lens groups can be retracted out of the optical axis into a retracted position as shown at R in FIGS. 9A and 9B. In the embodiment, at least one portion of the third lens group 13 is retracted from the optical axis passing through a through hole provided in the fixed cylinder 21a into a stored part provided in the fixed cylinder 21a and corresponding to the retracted position as described above.

In regard to this, a further detailed description will be described hereinafter.

The first lens group 11 to the fourth lens group 14 have a zoom lens function in which a focal distance is variable, as described hereinafter. The first lens group 11 includes one or more lens, and is fixed to the lineally-moving cylinder 27 via the first frame 17, which retains the first lens group 11 integrally.

The second lens group 12 includes one or more lens. A cam follower formed on a second frame (not shown) for integrally retaining the second lens group 12 is inserted into a cam groove for the second lens group 12 formed on the cam cylinder 26 shown in FIGS. 9A and 9B and 11, and engages with a linear groove 25a of the second liner 25, and the second lens group 12 is supported by the cam cylinder 26 and the second liner 25.

Figure 11:
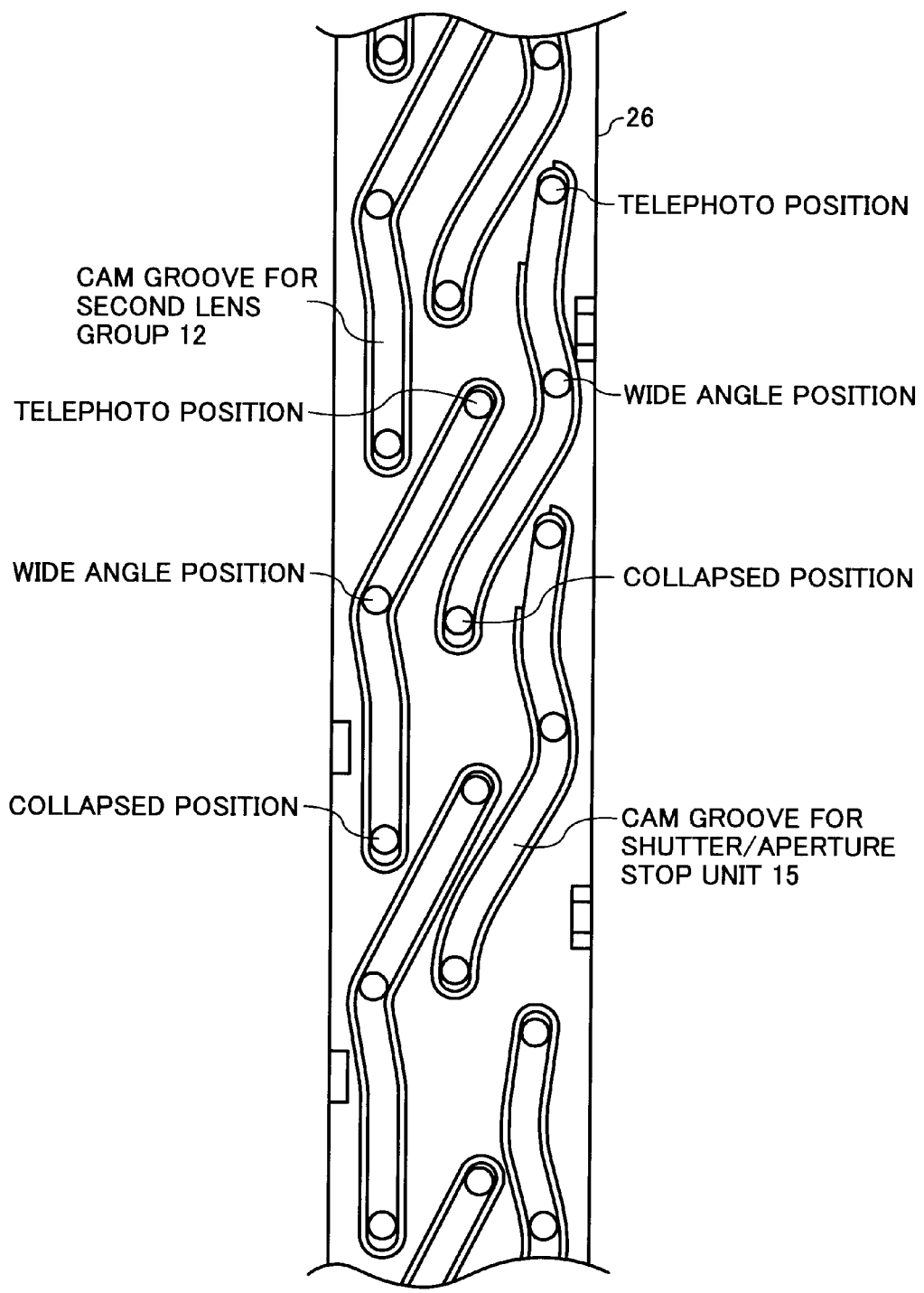
FIG. 11 is a schematic development elevational view showing a shape of cam grooves formed on a cam cylinder in a developed state.

The shutter/aperture unit 15 includes a shutter and an aperture, and a cam follower formed integrally with the shutter/aperture unit 15 is inserted into a cam groove for the shutter/aperture of the cam cylinder 26 shown in FIG. 11 and is engaged with the linear groove 25a on the second liner 25 so that the shutter/aperture unit is supported by the cam cylinder 26 and the second liner 25.

Figure 13A:
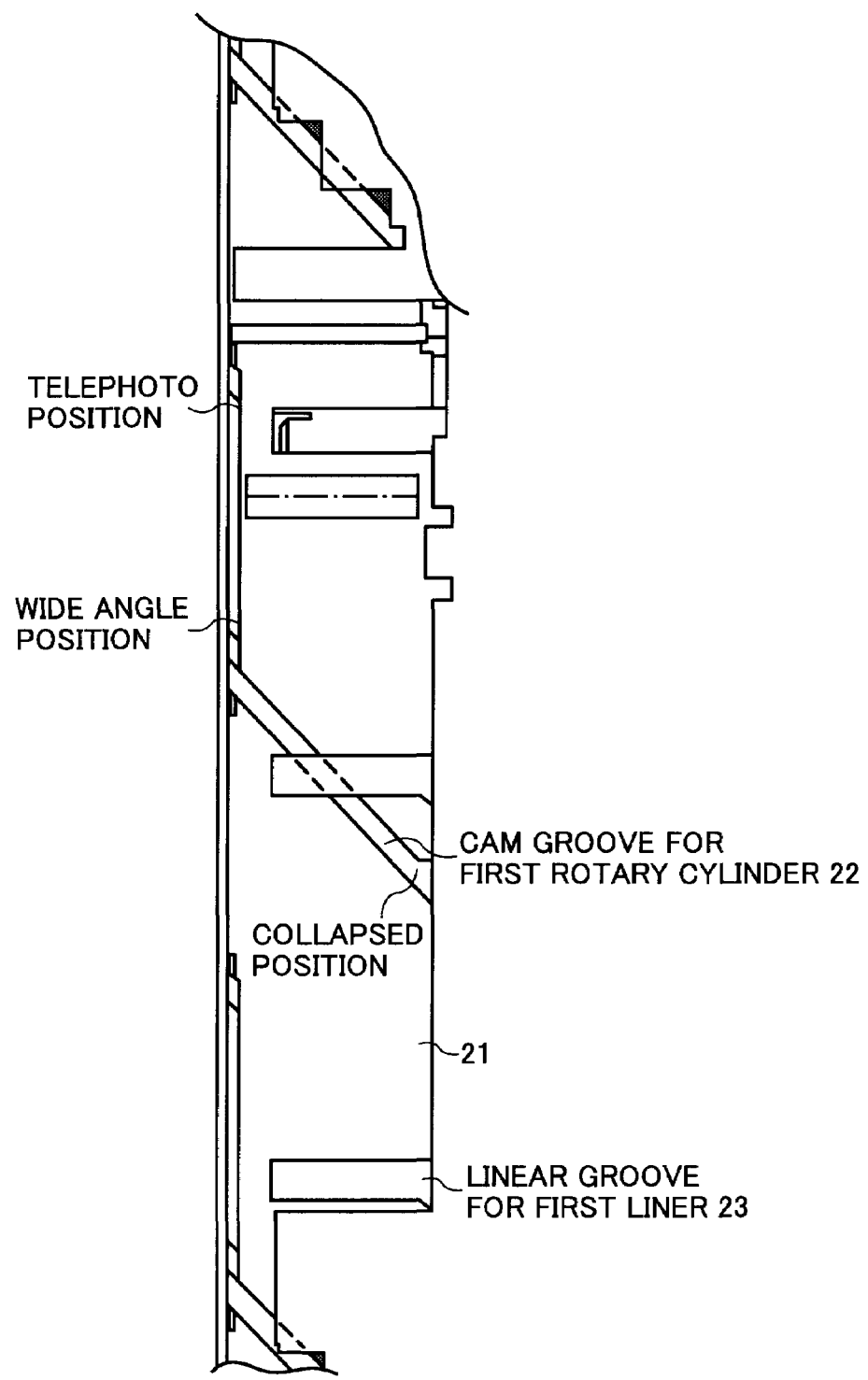
FIG. 13A is a schematic development elevational view showing a shape of cam grooves and key grooves formed on a fixed frame in a developed state with the helicoid omitted.
Figure 13B:
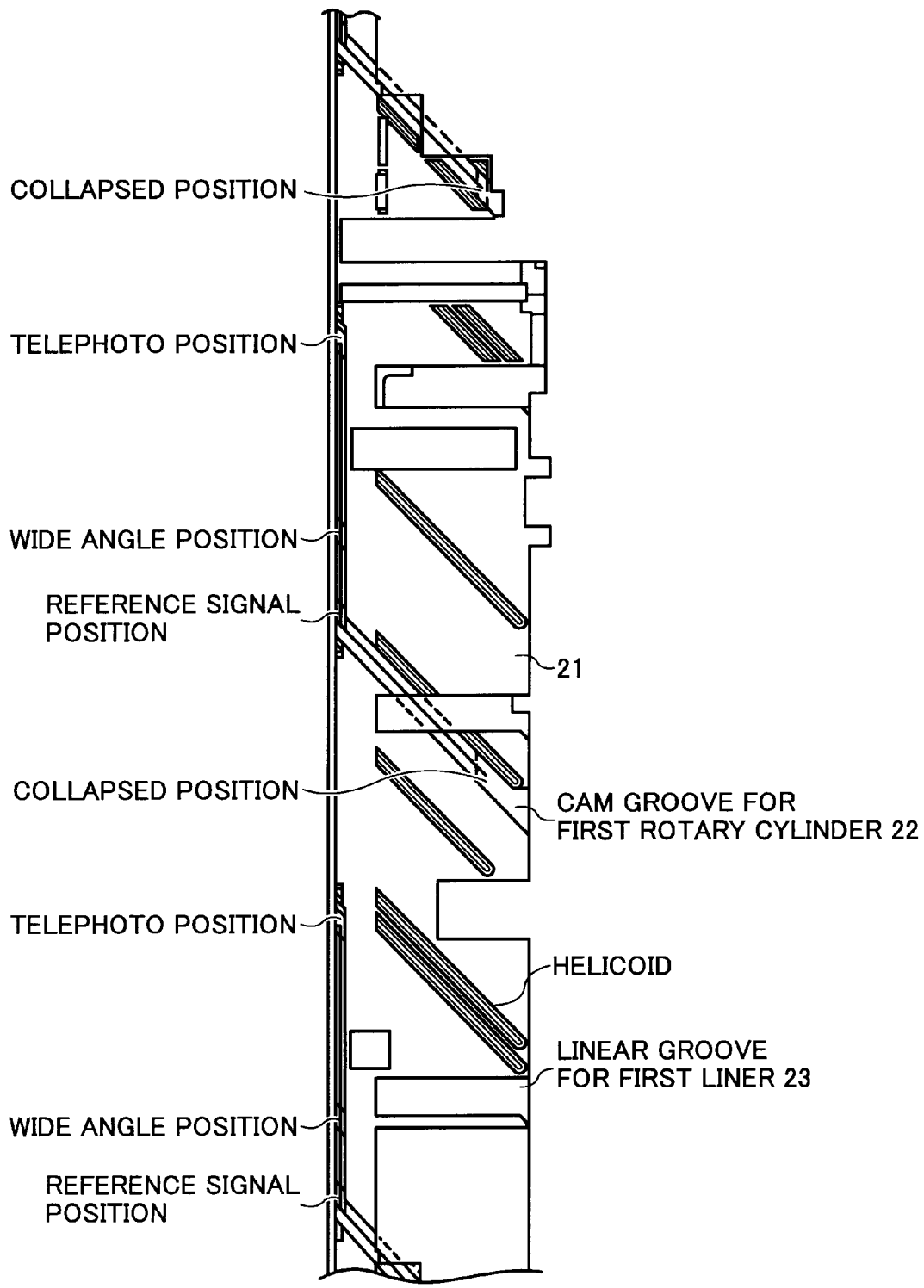
FIG. 13B is a schematic development view with the helicoid added to FIG. 13A.
Figure 13C:
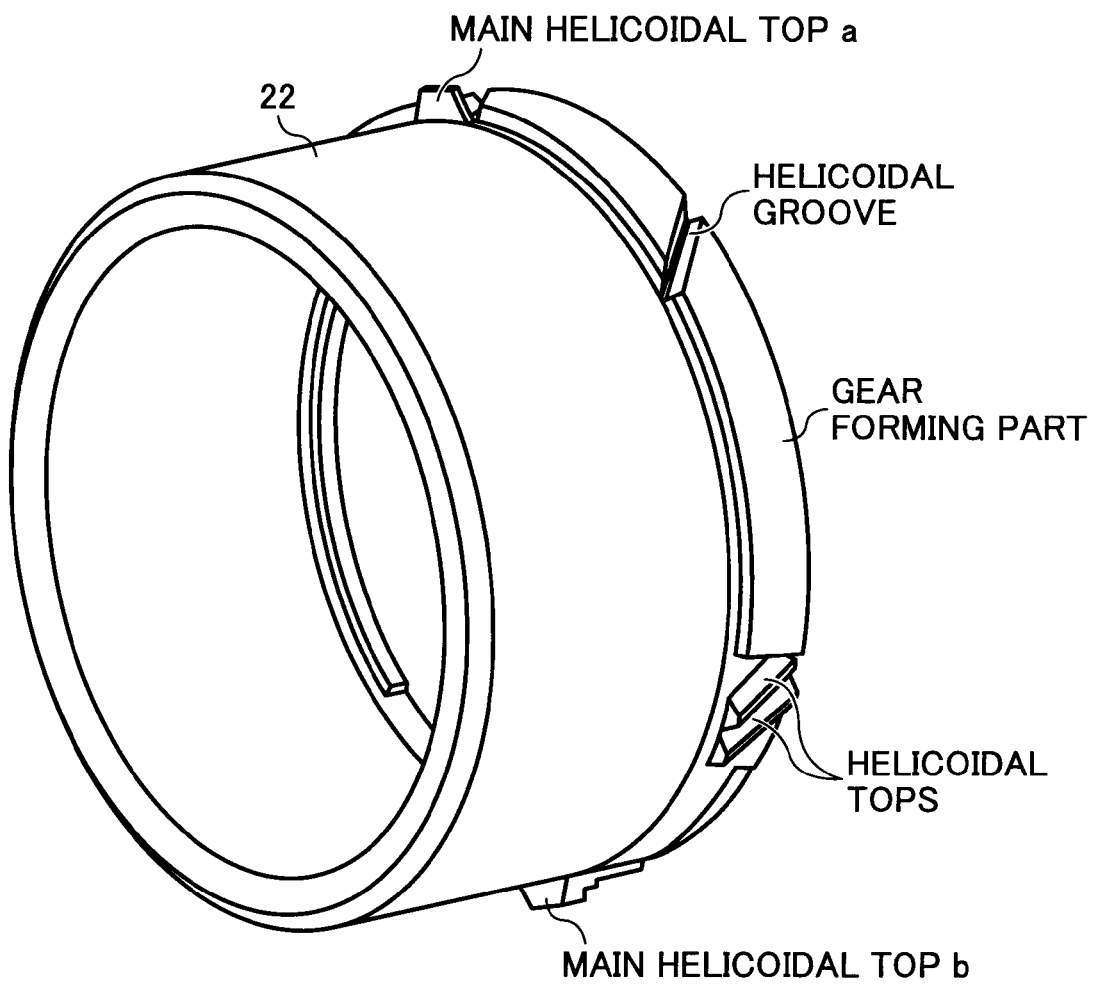
FIG. 13C is a schematic perspective view showing an appearance of a first rotary cylinder that fits with the helicoid.

The fixed frame 21 includes a cylindrical part having an inner surface which is formed with a linear groove and a helicoidal cam groove along an axial direction, as shown in FIGS. 13A and 13B. A helicoidal cam follower formed on an outer peripheral surface of a base portion of the first rotary cylinder 22 engages with the helicoidal cam groove, as shown in FIG. 13C, and a key portion formed on an inner surface of a base portion of the first liner 23 engages with the linear groove of the fixed frame of the fixed frame 21. An inner surface of the first rotary cylinder 22 is formed with a guide groove extending along a plane transverse to the optical axis X. Engaged with the guide groove is a follower or key which is formed to project from the outer peripheral surface of the first liner 23 in the vicinity of the base portion thereof and acts as a linear member.

An inner surface of the first liner 23 is formed with a linear groove along the optical axis and a helicoid, in addition, the first liner 23 is formed with a clearance groove in which a cam follower formed to project from an outer peripheral surface of a base portion of the second rotary cylinder 24 in the vicinity of the base portion is inserted.

A helicoid is formed on the outer peripheral surface of the base portion of the second rotary cylinder 24, and is engaged with the helicoid of the first liner 23. A cam follower formed to project from the outer peripheral surface of the second rotary cylinder 24 in the vicinity of the base portion engages with the linear groove formed in the inner periphery of the first rotary cylinder 22 through the clearance groove of the cam follower on the first liner 23. A key portion formed to project from the outer peripheral surface of the base portion of the second liner 25 engages with the linear groove provided on the inner peripheral surface of the first liner 23.

An inner surface of the second rotary cylinder 24 is provided with a guide groove along a plane transverse to the optical axis X, a follower or key provided to project from the outer peripheral surface of the second liner 25 is engaged in the guide groove of the second rotary cylinder 24. With such a structure, the second liner 25 moves with the second rotary cylinder 24 in the movement along the optical axis X, while the second rotary cylinder 24 is rotatable relative to the second liner 25.

The cam cylinder 26 fitted to the inner periphery of the second liner 25 is configured in such a manner that an engaging projection formed on the outer peripheral surface of the base portion is fitted to and engaged with the base portion of the second rotary cylinder 24 so as to rotate integrally with the second rotary cylinder 24. The inner surface of the second liner 25 is provided with a guide groove along a surface transverse to the optical axis X, and a follower or key provided on the outer peripheral surface (front side) of the cam cylinder 26 engages with the cam groove. With such a structure, the cam cylinder 26 moves with the second liner 25 in the movement along the optical axis X, while is rotatable relative to the second liner 25.

The base portion of the lineally-moving cylinder 27 is inserted between the second rotary cylinder 24 and the second liner 25, and a cam follower is formed to project from the outer peripheral surface of the lineally-moving cylinder 27 in the vicinity of the base portion, and the cam follower engages with the cam groove formed in the inner peripheral surface of the second rotary cylinder 24. A linear groove is formed on the inner peripheral surface of the lineally-moving cylinder 27 along the axial direction, and the key portion formed on the outer peripheral surface of the second liner 25 engages with the linear groove.

A gear portion is formed on the outer periphery of the base portion of the first rotary cylinder 22, the gear portion is engaged with one or more gears which are driven by a zooming motor 51 so that a drive force of the zooming motor 51 is transmitted to the gear portion via the gears, whereby the first lens group 11, the second lens group 12, and the shutter/aperture unit 15 are zoomed in a predetermined manner. The zooming motor comprises a usual DC motor in the embodiment.

Figure 10:
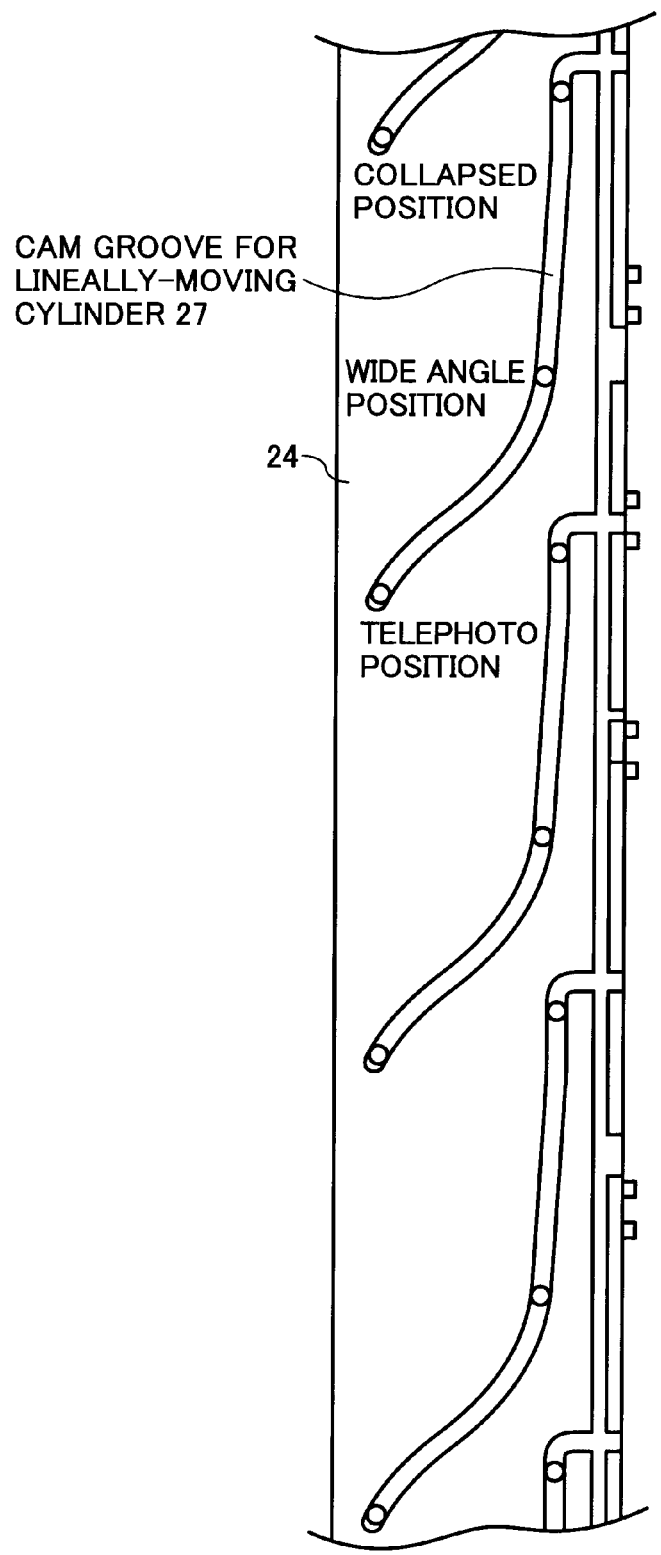
FIG. 10 is a schematic development elevational view showing a shape of cam grooves formed on a second rotary cylinder in a developed state.

Meanwhile, the cam groove on the second rotary cylinder 24 engaging with the cam follower on the linearly-moving cylinder 27 is shown in FIG. 10.

The cam groove on the cam cylinder 26 which engages with the cam follower on the lens retaining frame of the second lens group 12 and the cam groove of the cam cylinder 26 which engages with the cam follower of the shutter/aperture unit 15 are shown in FIG. 11, respectively.

Figure 12:
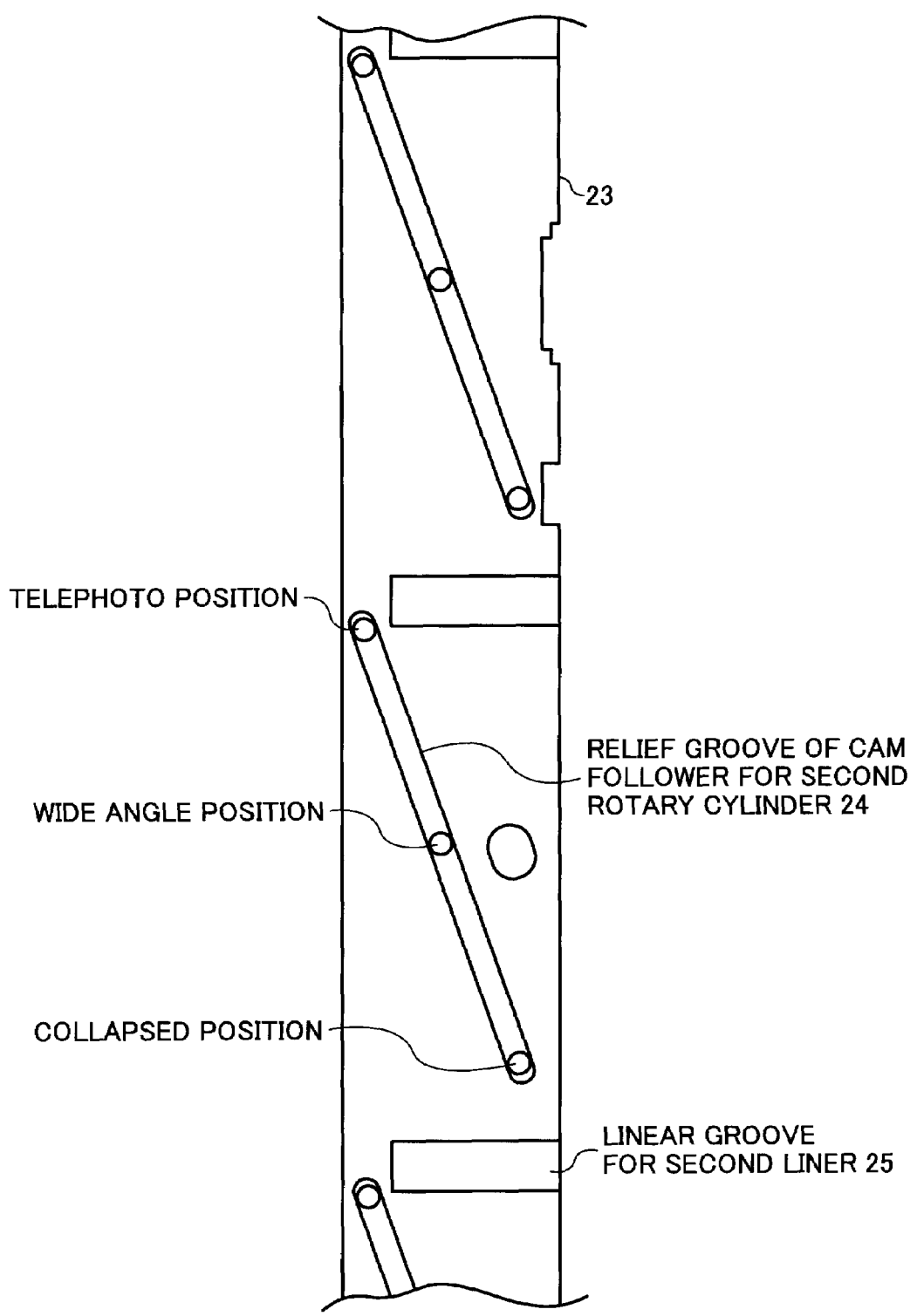
FIG. 12 is a schematic development elevational view showing a shape of cam grooves and key grooves formed on a first liner in a developed state with a helicoid omitted.

The cam groove on the first liner 23 which engages with the cam follower of the second rotary cylinder 24 and the straight groove on the first liner 23 which engages with the key groove on the second liner 25 are shown in FIG. 12, respectively.

A linear groove on the fixed frame 21 engaging with the key portion of the first liner 23 of the fixed frame and the cam groove of the fixed frame 21 engaging with the cam follower of the first rotary cylinder 22 are shown in FIGS. 13A, 13B and 13C, respectively.

Generally, the rotary cylinder, which is the closest position to the fixed frame and positioned on the outermost circumference is generally screwed onto the fixed frame through a helicoid, and the helicoid is configured to move the rotary cylinder at a constant speed relative to the fixed frame. Therefore, the rotary cylinder is in a half-extended state out of the fixed frame in a short focal length/wide angle in a course in which the rotary cylinder is moved gradually from the collapsible position through the short focal length/wide angle position to a long-focus/telephoto position.

On the contrary, in the structure described above, the first rotary cylinder 22 adjacent to the fixed frame 21 is threaded with the fixed frame of the fixed frame 21 via the cam groove of the helicoidal shape without a simple helicoidal connection. The first rotary cylinder 22 is moved completely to the maximally extended position by being driven from the collapsible or collapsed position to the short focal length/wide angle position. Thereafter, as shown in FIGS. 13A, 13B and 13C, because the subject side end of the cam groove lies in parallel with the end surface of the fixed frame, the first rotary cylinder 22 rotates at a constant position without moving along the optical axis X during driving from the short focal length/wide angle position to the long-focus/telephoto position.

In addition, the third lens group 13 is retracted out of the optical axis X in the collapsed position, in which the lens groups are collapsed in the fixed frame 21, as shown in FIGS. 9A and 9B. The third lens group 13 is moved onto the optical axis X in an extended position of the lens groups.

As the first rotary cylinder 22 is moved from the collapsed position to short focal length/wide angle position, it is extended toward the subject, while rotating in an early stage of the drawing out action and when it reach the maximally extended position, a zoom position-detector which is provided on the fixed frame 21 and comprising a photo-reflector, photo-interrupter, leaf switch or the like, for example, generates a zoom position-reference signal. Therefore, when the zoom position-reference signal generates, because it may be determined that the first rotary cylinder 22 reaches the maximally extended position, it is possible to initiate to move the third frame 31 onto the optical axis X.

Consequently, a space between the second lens group 12 and the fourth lens group 14 to insert the third lend group 13 into the optical axis X can be secured previously by completely drawing out the first rotary cylinder 22 and the first liner 23 adjacent to the fixed frame at the earlier step of the extended action. As described below, as soon as the first rotary cylinder 22 reaches the maximally extended position, the zoom position-reference signal generates, the space for inserting the third lens group is secured, and immediately, the insertion of the third lens group is initiated. Therefore, a time from the collapsible position when an electric source is turned on to the short focal length/wide angle position can be very shortened.

Figure 1:
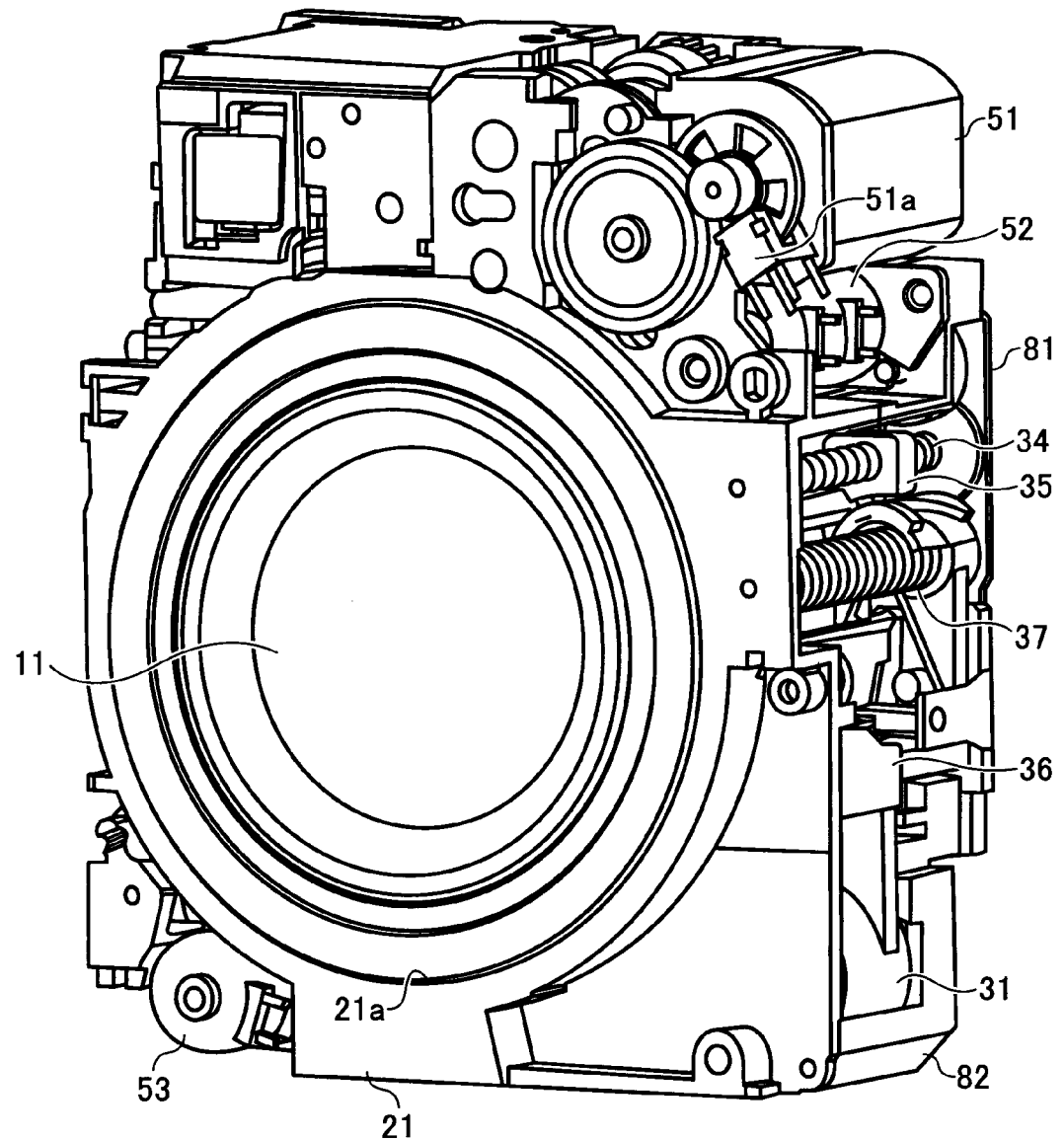
FIG. 1 is a perspective view showing a structure of a main part of an optical system device including a lens barrel according to an example related to the present invention with lens groups collapsed, as view from a subject in an optical axis direction.
Figure 2:
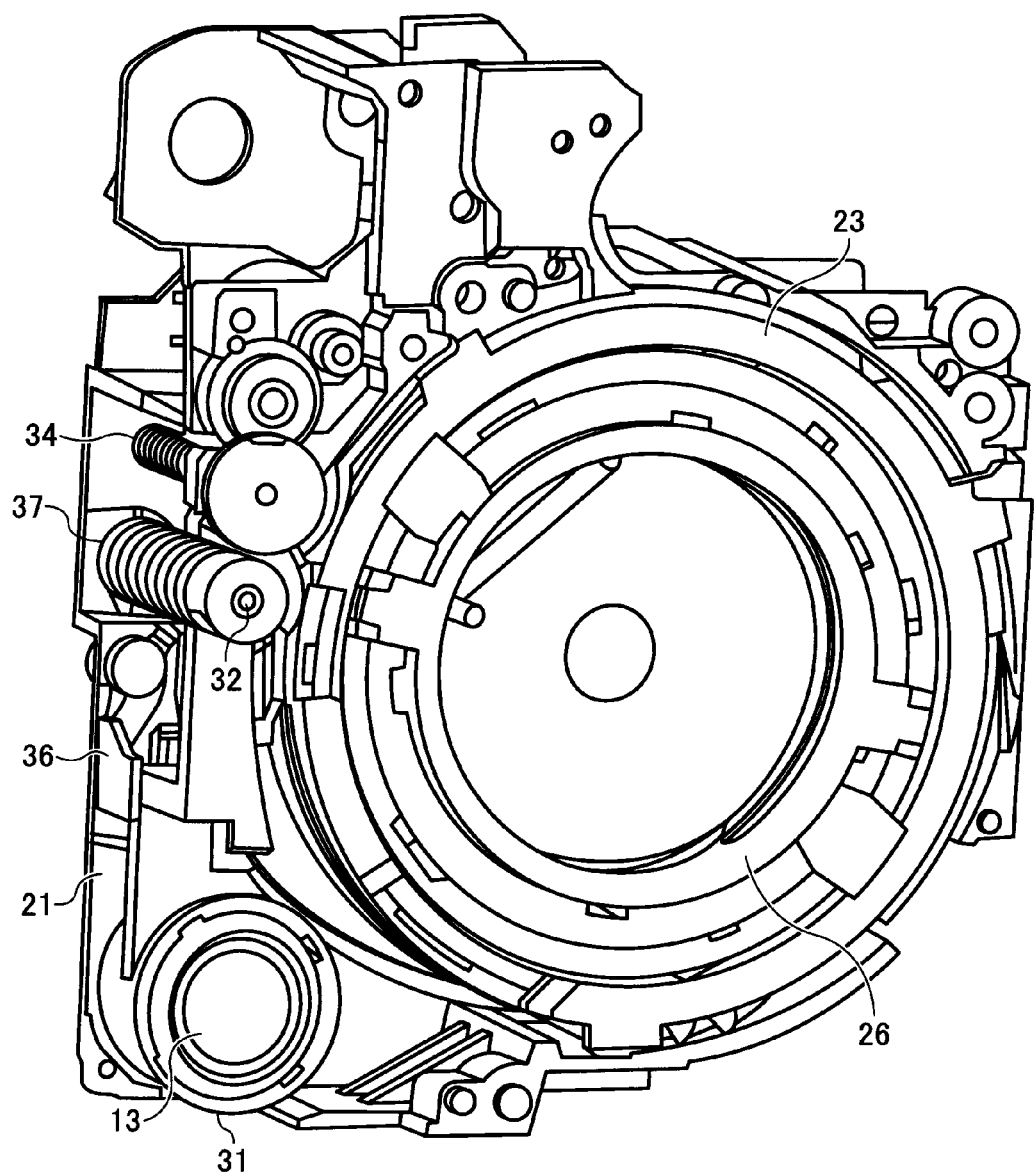
FIG. 2 is a perspective view showing the main part of the lens barrel shown in FIG. 1, as viewed from an imaging plane.
Figure 8:
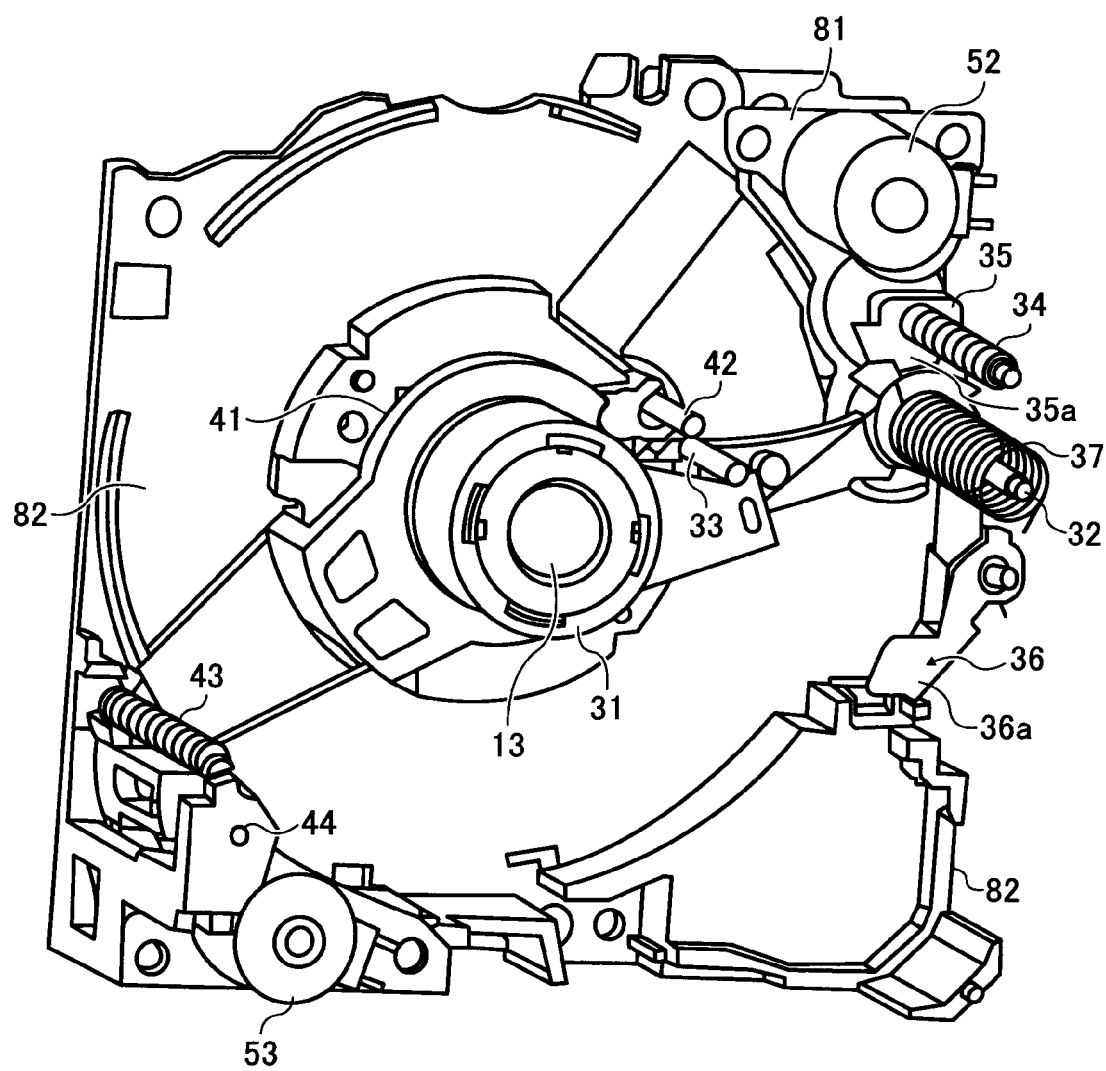
FIG. 8 is a perspective view of a layout of the third frame, the impact preventing strip, and the fourth frame for explaining operations of the third frame, which retains the third lens group, and the impact-preventing strip in the photographing state with the lens groups projected, as viewed from the subject in the optical axis direction.

As described above, the retractable third lens group 13 is retained to the third frame 31 or retractable lens retaining frame. The third frame 31 retains the third lens group 13 at one end thereof, and the other end of the third frame 31 is supported by a third group main-guide shaft 32 which extends substantially in parallel with the optical axis of the third lens group 13 so as to be capable of rotating, and sliding along the third group main-guide shaft 32. The third frame 31 is rotatable about the third group main-guide shaft 32 between a setting position in which the third lens group 13 is disposed onto the optical axis in a photographing state, as shown in FIG. 8 and the retracted position in which the third lens group 13 is retracted out of the telescopic cylinder into the fixed frame 21, as shown in FIG. 2.

In the vicinity of the third lens group 13 on the side of the rotating end of the third frame 31, a crank-shaped bent portion for differentiating the position of the third lens group 13 in the direction parallel with the main guide shaft between the side of the rotation axis and the side of the supporting portion, a stopper 31a (FIG. 15) and a light-shielding strip 31b are provided on the rotating end to project from the bent portion substantially toward the rotating end.

On the optical performance, in order to lengthen a focus length in the telephoto state, a position of the third lens group 13 in the telephoto state is in an extended position closer to the subject. However, a possible moving amount of the third frame 31 is determined by limitation of a length of the lens barrel in the collapsed state along the optical axis X. It is possible to maximize the focus length in the telephoto state by setting a position for retaining the third lens group by the third frame 31 in the closest position to the subject. However, if a position of the stopper 31a along the optical axis sets on the generally same position as the third lens group 13, a length of a third frame sub-guide shaft 33 is longer and a size of the lens barrel in the collapsible position becomes greater. Therefore, it is required that the stopper 31a is set on a side of a focusing position and the third frame 31 is formed into a shape having the crank-shaped bent portion.

Meanwhile, the third frame 31 may be formed from two parts and in this case, one is a member having the crank-shaped bent portion, the other is a member for retaining the third lens group 13. The two parts operates integrally by being fixed together.

Figure 14A:
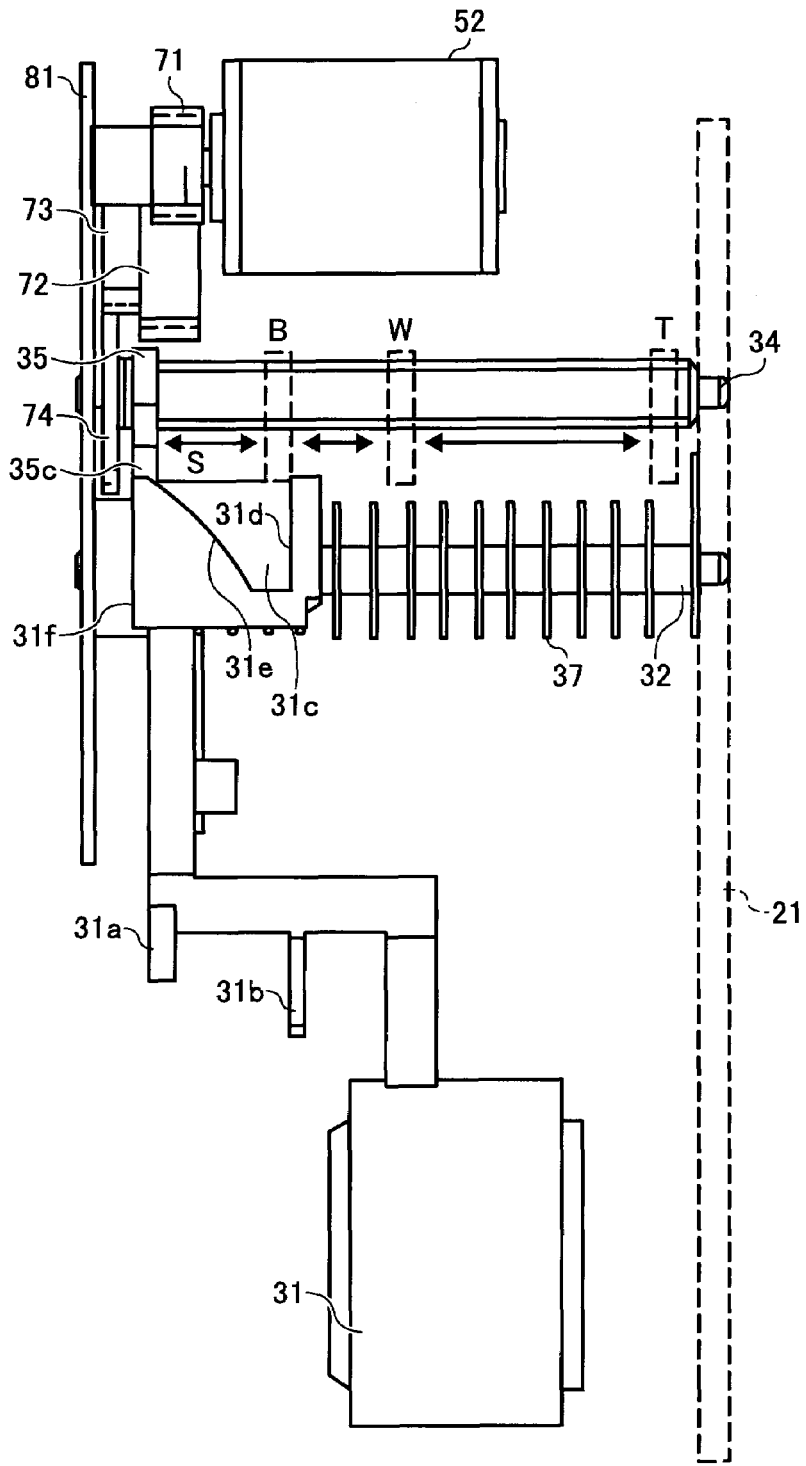
FIG. 14A is a side view showing a structure of the third frame and its drive system.
Figure 14B:
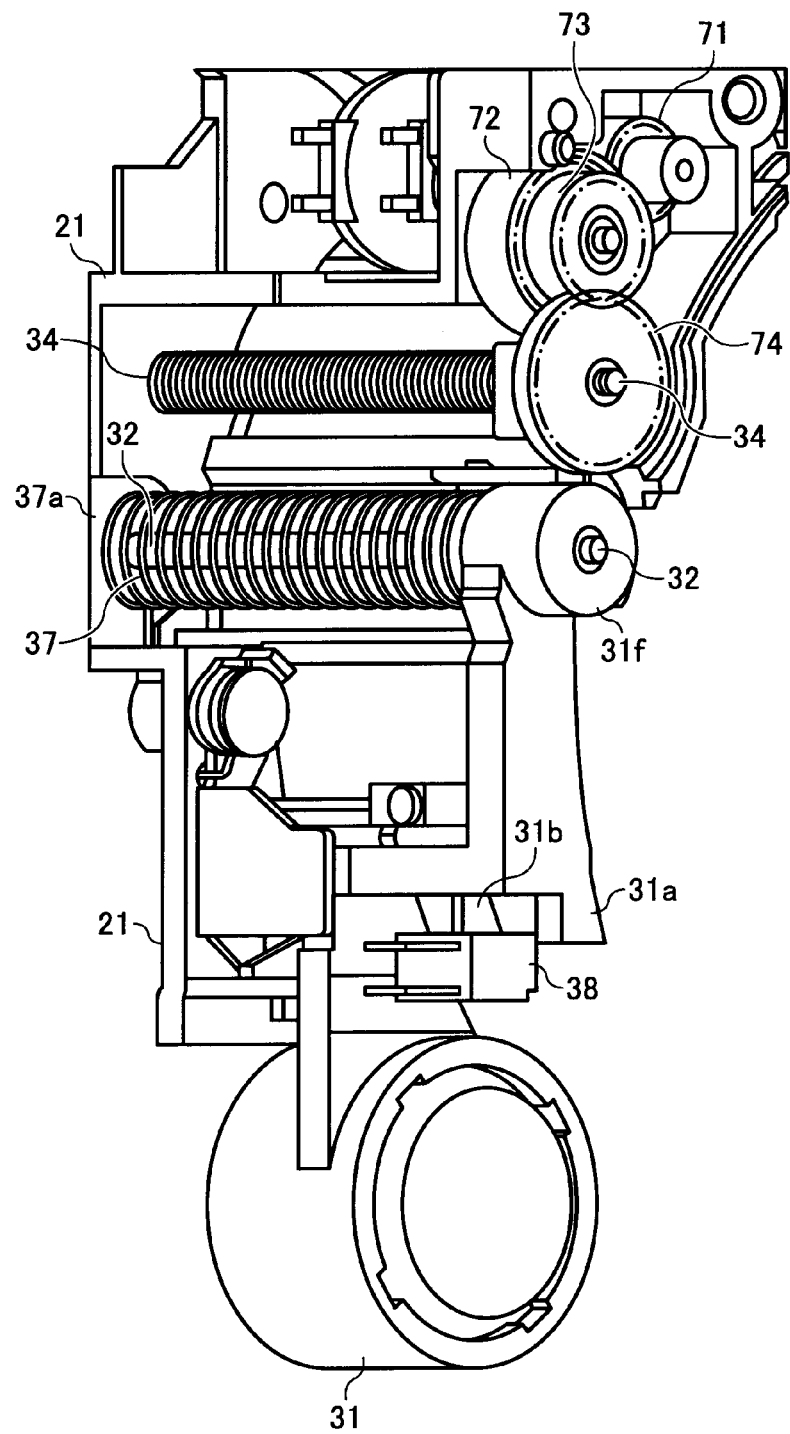
FIG. 14B is a schematic perspective view of FIG. 14A.
Figure 15:
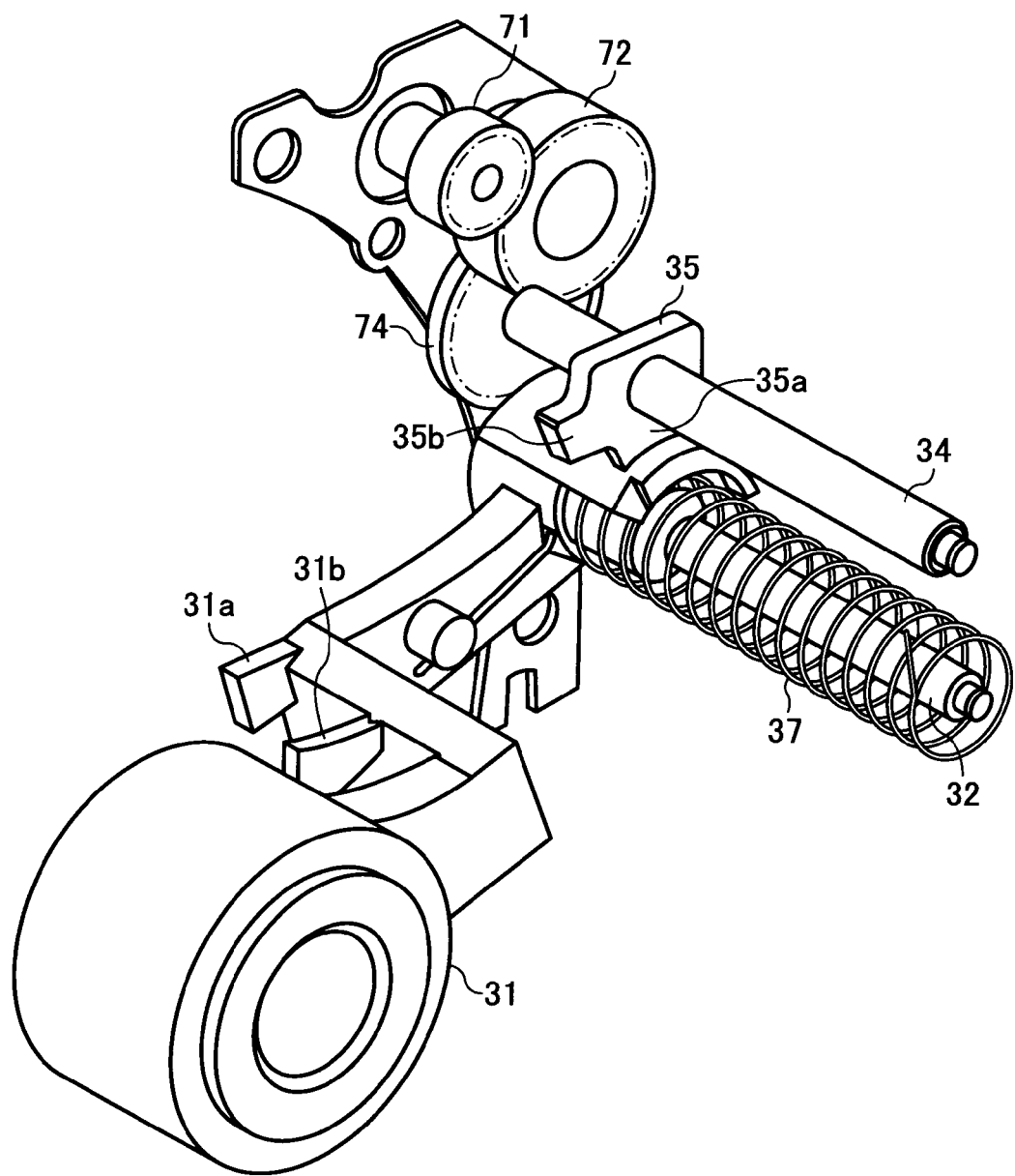
FIG. 15 is a perspective view showing the structure of the third frame and its drive system.

As shown in FIGS. 14A and 14B, a third frame female screw member 35 screwed on a third group lead screw 34 is positioned in the closest position to an image plane of the CCD in the retracted state in which the third frame 31 is retracted. In this state, a compression torsion spring 37 is charged or compressed fully so as to impart constantly a clockwise moment as viewed from the front of the lens barrel to the third frame 31.

A cylindrical outer peripheral surface of a supported part 31g provided on the main-guide shaft 32 for the third frame 31 is provided with a stepped portion 31c, and a cam portion 31e disposed inside the stepped portion 31c and formed from an inclined surface, as shown in FIG. 14A.

From this state, when a third frame drive motor 52 is rotated clockwise as viewed from the front of the lens barrel, the third group lead screw 34 is rotated clockwise through a gear mechanism including gears 71 to 74, and the third frame female screw member 35 moves toward the subject along the optical axis X. At this time, the third frame 31 is rotated clockwise by a moment force of the compression torsion spring 37, the cam portion 31e engages with a first abutting portion 35a provided on the third frame female screw member 35.

Thereafter, when the third frame female screw member 35 is moved in the closest position to the subject, the light-shielding strip 31b of the third frame 31 is moved to a position out of a third frame photo-interrupter 38 as a device for detecting a position of the third lens group 13, thereby the third frame photo-interrupter 38 generates a reference signal in a range from L or a low level to H or a high level. Accordingly, a position of the third lens group 13 is controlled by pulse count based on the reference signal from the third frame photo-interrupter 38.

Figure 16A:
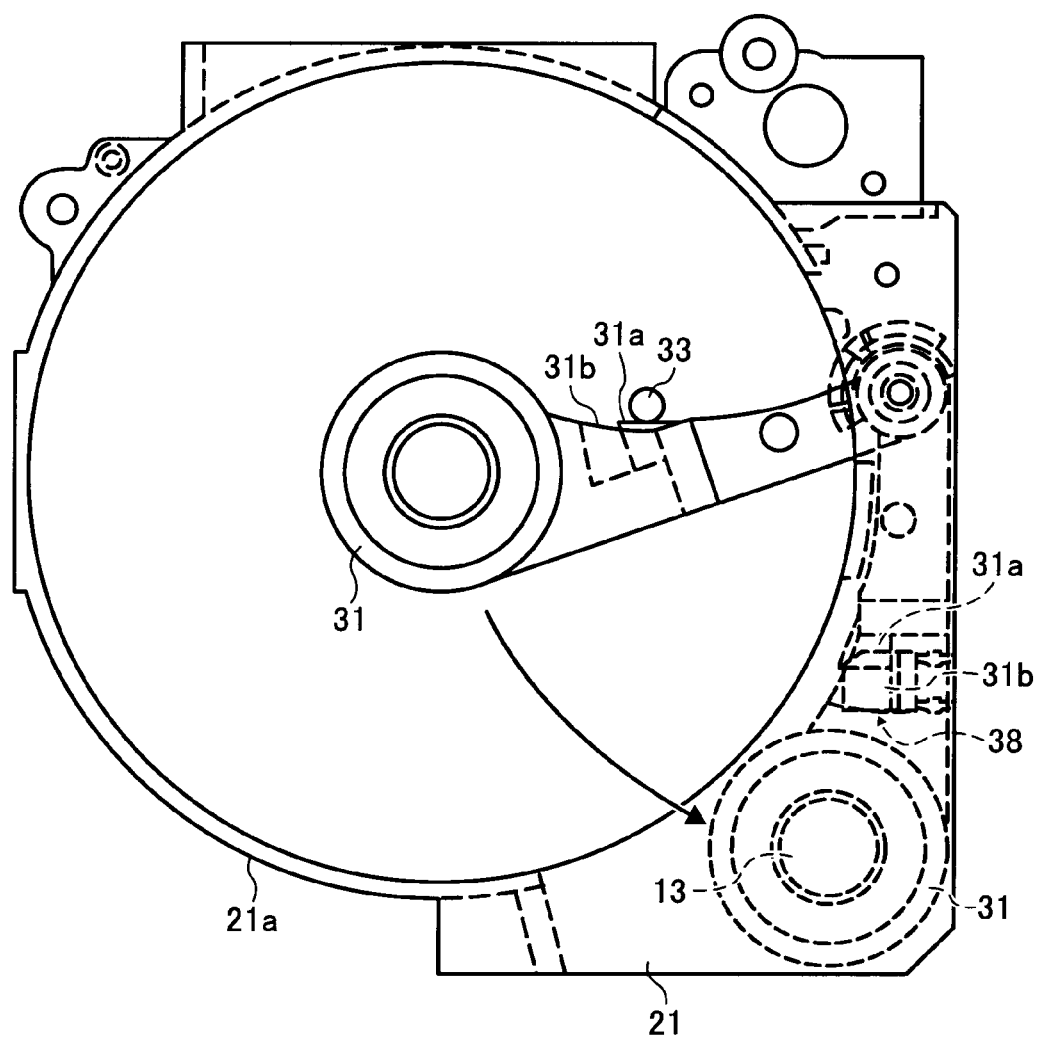
FIG. 16A is a back view of the third frame portion for explaining operation of the third frame, as viewed from the imaging plane.
Figure 16B:
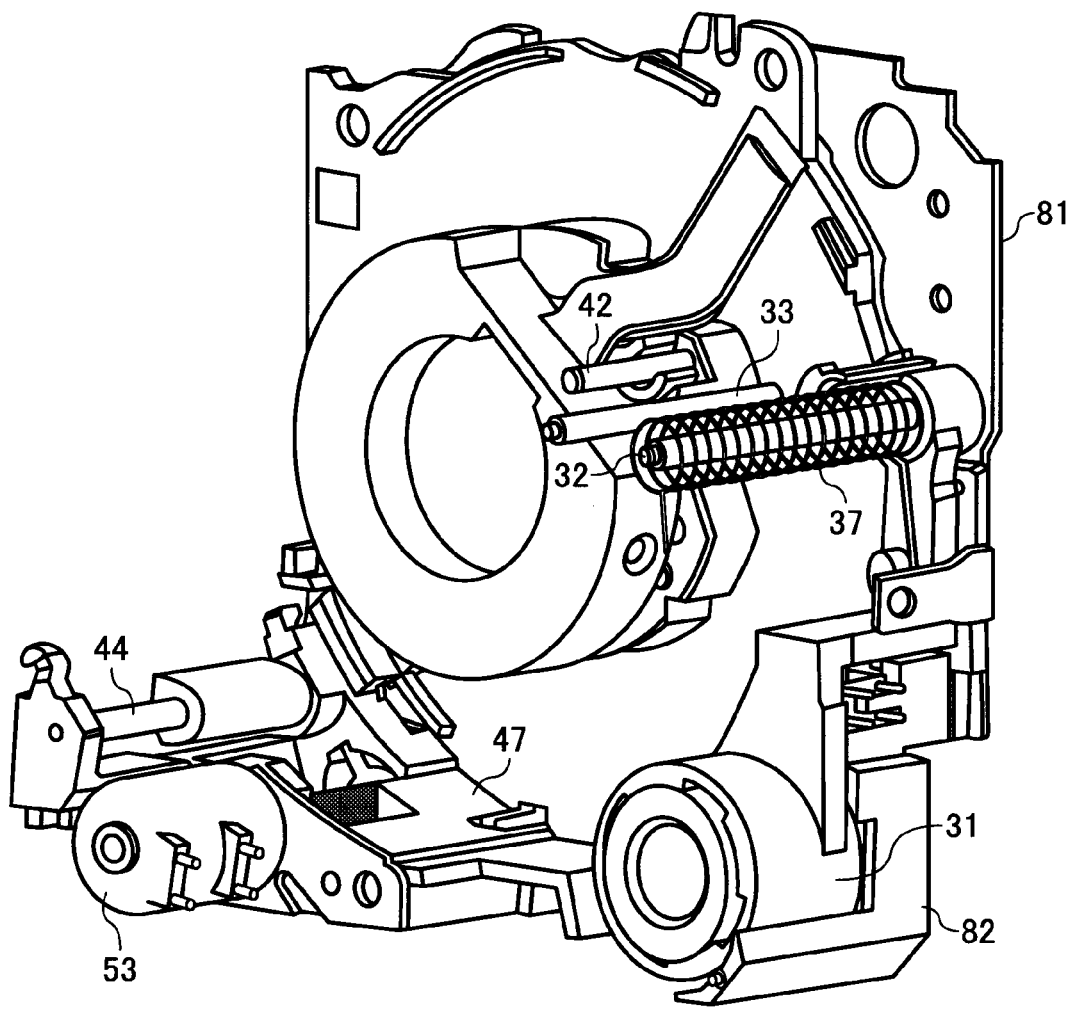
FIG. 16B is a schematic perspective view of a shutter as a main part.

From this state, when the third frame female screw member 35 is moved to a retract-initiating position B of the third frame 31, as shown in FIG. 14A, the third frame 31 further rotates clockwise, the stopper 31a comes into abutment with the third frame sub-guide shaft 33 as shown in FIGS. 8 and 16A, as a result, a position of the third frame 31 on the optical axis is determined. Consequently, approach operation of the third lens group 13 to the optical axis is completed. In the retract-initiating position B, the third frame 31 is movable toward the retracted position S.

Meanwhile, the light-shielding strip 31b shields the third frame photo-interrupter 38 shown in FIG. 16A so that it is possible to confirm that the third frame 31 is in the retract-initiating position B. When the third frame female screw member 35 is moved to the retract-initiating position B shown in FIG. 14A, the first abutting portion 35a of the third frame female screw member 35 contacts with a front engaging portion 31d of the stepped portion 31c of the third frame 31. Again, the stepped portion 31c of the third frame 31 has the cam portion 31e and the front engaging portion 31d which forms a planner surface generally perpendicular to the third group main guide shaft 32.

The third frame 31 is constantly biased to move to a direction transverse to the optical axis, that is to say, from the retracted position to the optical axis and a direction along the optical axis, that is to say, from the subject to a retainer plate 81 beside the image plane by the compression torsion spring 37 provided on the third group main-guide shaft 32.

In addition, a portion of the fixed frame 21 to which the compression torsion spring 37 contacts includes a step 37a which is formed as a concave portion for inserting one end of the compression torsion spring 37, as shown in FIG. 14B, to prevent the compression torsion spring from deviating out of a center of the third group min-guide shaft 32 considerably.

Next, when the third frame female screw member 35 is moved to a short focal length/wide angle position or wide angle position W shown in FIG. 14A, because the first abutting portion 35a of the third frame female screw member 35 presses the front engaging portion 31d, the third frame 31 is movable to the wide angle position along the optical axis X toward the subject.

Moreover, while the third frame female screw member 35 is disposed between the retract-initiating position B and a telephoto position T, as shown in FIGS. 14A and 14B, because the third frame 31 is constantly pressed along the optical axis toward the image plane by the compression torsion spring 37, all spaces generated among the third group lead screw 34, the third frame female screw member 35 and the retainer plate 81 are directed to the image plane, the third frame 31 can secure a positional accuracy in the direction of the optical axis.

The third frame female screw member 35 is screwed on the third group lead screw 34 disposed substantially in parallel with the optical axis. The third frame female screw member 35 includes a rotation-preventing projection 35b in addition to the first abutting portion 35a, which engages with the above-described front engaging portion 31d or the cam portion 31c of the third frame 31.

The rotation-preventing projection 35b is fitted slidably into a guide groove formed on the cylindrical part of the fixed frame 21 in parallel with the optical axis as a rotation-preventing device for preventing the third frame female screw member 35 from rotating along with the rotation of the third lead screw 34. In other words, the third frame female screw member 35 is moved in the back and forth direction along the optical axis by the rotation of the third lead screw 34, because the third frame female screw member 35 is prevented from rotating by the rotation-preventing projection 35b fitting into the guide groove of the fixed frame 21.

As shown in FIG. 14A in detail, when the third frame female screw member 35 is moved further toward the image plane (left side in the drawing) from the retract-initiating position B shown in FIG. 14A, the third frame female screw member 35 engages with the cam portion 31e of the stepped portion 31c the third lend group-retaining frame 31.

The third frame 31 comes into contact with the retainer plate 81 by a biasing force of the compression torsion spring 37 clockwise, the third frame 31 is rotated counterclockwise against the clockwise biasing force exerted by the compression torsion spring 37, therefore the third frame 31 can be retracted.

On the other hand, while the third frame female screw member 35 is moved from the telephoto position T through the wide angle position W to the retract-initiating position B by the reverse rotation or counterclockwise rotation of the third group lead screw 34, because the first abutting portion 35a of the third frame female screw member 35 engages with the front engaging portion 31d of the stepped portion 31c of the third frame 31, the third frame 31 moves gradually to direct from the subject to the image plane while maintaining a position on the optical axis limited by the third frame sub-guide shaft 33 by the biasing force toward the optical axis and the biasing force toward the image plane.

Meanwhile, when the third frame female screw member 35 reaches the retract-initiating position B, a base end surface 31f abuts with the retainer plate 81, the third frame female screw member 35 is disposed with an interval from the front engaging portion 31d and contacts with the cam portion 31e of the stepped portion 31c.

While the third frame female screw member 35 moves from the retract-initiating position B to the collapsed position S, the second abutting portion 35c of the third frame female screw member 35 comes into sliding contact with the cam portion 31e of the stepped portion 31c of the third frame 31 and rotates the third frame 31 against the rotational biasing force exerted by the compression torsion spring 37, whereby the third frame 31 moves from the position on the optical axis to the collapsed position S. The collapsed position S of the third frame 31 corresponds to a position at which it is moved toward the image plane by a predetermined pulse count number after the generation of the reference signal of the range from the H to the L generated from the third frame photo-interrupter 38. After the third frame 31 is moved to the collapsed position S, the first lens group 11, the second lens group 12, and the shutter/aperture unit 15 are moved to the collapsible or collapsed position.

In this example, before the third frame 31 is moved to the collapsed position S, a fourth frame 41 for retaining the fourth lens group 14 is first moved to the collapsed position. A first collapsed position of the fourth frame 41 corresponds to a position at which it is moved toward the image plane by a predetermined pulse count number after the generation of a storage reference signal of a range from the H to the L generated by a fourth group reference detector or fourth group photo-interrupter 47. After the fourth frame 41 reaches the first collapsed position, the stored operation of the third frame 31 is initiated.

That is to say, the third frame female screw member 35 moves toward the image plane by a predetermined pulse count number from the generation of the stored reference signal from the H to the L by the third frame photo-interrupter 38 (see FIG. 16A) and the stored operation of the third frame 31 is completed. After the completion of the stored operation of the third frame 31, the first rotary cylinder 22 and structural parts disposed inside the first rotary cylinder 22 and the first liner 23 and so on are stored before contacting with the third frame 31. This results in the storage of the first rotary cylinder 22 and so on without interfering with the third frame 31.

Positions of the first rotary cylinder 22 and so on can be set by a drive pulse count generated by a zoom count detector comprising a pinion gear attached directly to an output shaft of the zooming motor 51 and having an encoder structure and for example, a first and second frames photo-interrupter 51a disposed adjacent the pinion gear, for example.

Meanwhile, although the DC motor is used as the drive source for moving the first rotary cylinder 22 and the drive position of the first rotary cylinder 22 is detected by the detector comprising the encoder and the photo-interrupter, in the above-mentioned example, the similar function can be accomplished by substituting a pulse motor structure for the whole of the above-mentioned structure.

Figure 7:
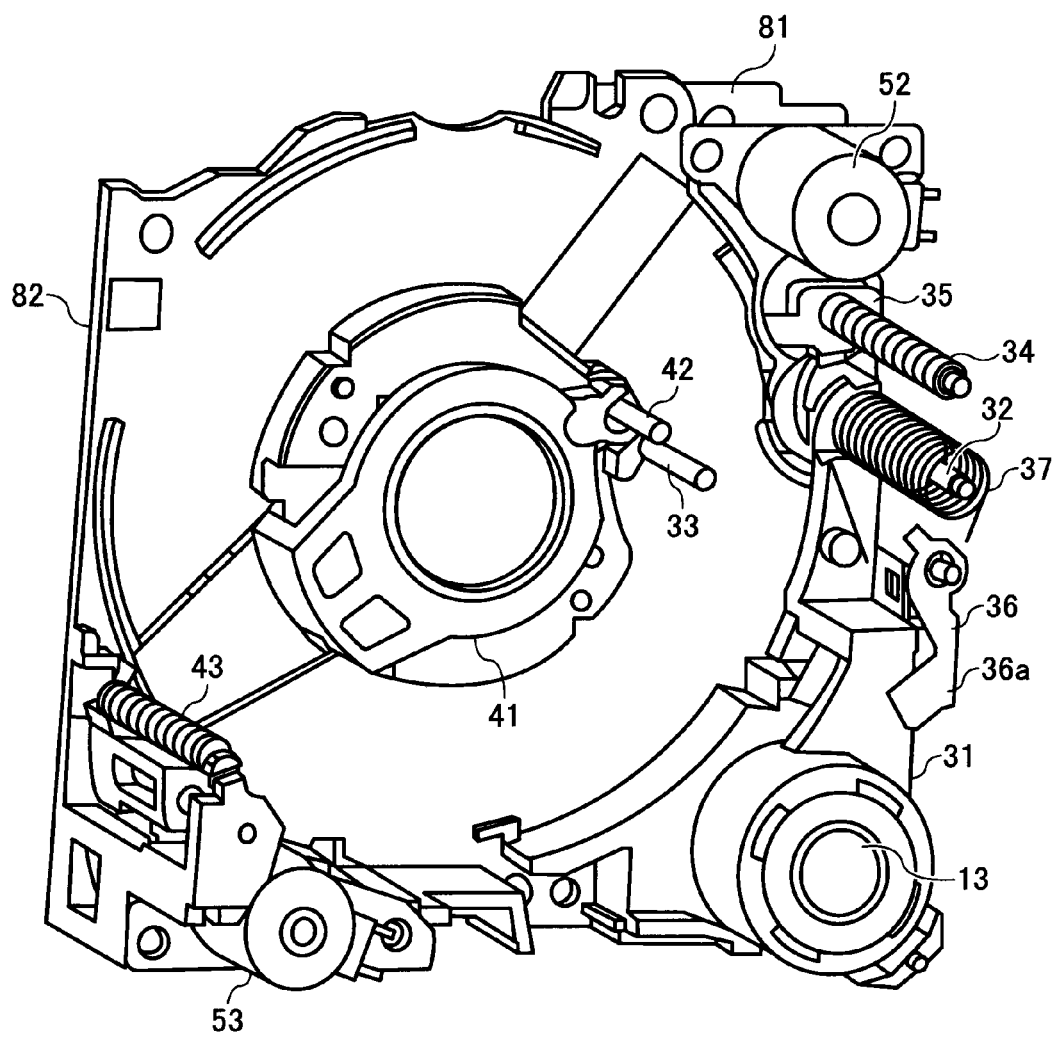
FIG. 7 is a perspective view of a layout of a third frame, an impact preventing strip, and a fourth frame in a state in which the lens groups are in a collapsed position, for explaining operations of the third frame which retains the third lens group and the impact preventing strip, as viewed from the subject in the optical axis direction.

To prevent the third frame 31 from collision with the other parts, an impact-preventing strip 36 is, as shown in particular in FIGS. 2 and 7, rotatably supported on the fixed frame 21 in the vicinity of the third group main-guide shaft 32 and includes a rotated portion provided at one end of the impact-preventing strip and an engaging projection 36a. The impact-preventing strip 36 is constantly biased to cause the engaging projection 36a to move toward the optical axis X by a spring or the like.

When the third frame 31 is positioned in the collapsed position, the impact-preventing strip 36 is pushed out by a rotating force of the third frame 31 against a biasing force of the spring, and is deviated outside the third frame 31 (see FIG. 2 and FIG. 7, specifically).

When the third frame 31 is rotated and positioned on the optical axis, the impact-preventing strip 36 is released from engagement with the third frame 31, and is rotated to cause the engaging projection 36a to be projected toward the optical axis X by the biasing force, thereby causing the engaging projection 36a to project from the inner surface of the fixed frame of the fixed frame 21. At this time, in addition to the first rotary cylinder 22 and the first liner 23, the second rotary cylinder 24, the second liner 25, the cam cylinder 26 and the lineally-moving cylinder 27 are all positioned on the subject side with respect to the projected position of the engaging projection 36a. Therefore, the engaging projection 36a is positioned to project inwardly of an outer peripheral edge of the base portion of each of the first rotary cylinder 22 and the first liner 23 (see FIG. 5, FIG. 6, and FIG. 8, specifically).

With such a structure, even if an operator rotates the first rotary cylinder 22 manually forcibly and moves it to the collapsed position, the impact-preventing strip 36 first contacts with the first rotary cylinder 22. Therefore, because the base portion of the first rotary cylinder 22 cannot be moved toward the image plane than the position of the impact-preventing strip 36 along the optical axis, the first rotary cylinder 22 is prevented from contacting with the third frame 31. Accordingly, it is possible to accomplish the prevention of breaking, damage or the like of the third frame 31 due to a strength external force.

In addition, the first rotary cylinder 22 can be first moved to the collapsed position after the third frame 31 is moved to the collapsed position correctly. Therefore, in a used or photographing state of the lens barrel, in which the movable cylinders such as the first rotary cylinder 22 and so on are extended, when a great pressure is exerted on a leading end of the lens barrel and so on by a drop of the lens barrel or the like, the engaging projection 36a of the impact-preventing strip 36 engages with the first rotary cylinder 22 and the first liner 23, and hence further retraction of the first rotary cylinder 22 and the first liner 23 (as well as the second rotary cylinder 24, the second liner 25, the cam cylinder 26, and the lineally-moving cylinder 27) toward the third lens group 13 is prevented, so that the third frame 31 and the third lens group 13 are prevented from being damaged.

The third group lead screw 34 is rotated in forward and reverse directions by a third frame drive motor 52. The rotation of the third frame drive motor 52 is transmitted to the third group lead screw 34 via gears 71, 72, 73, and 74 arranged in sequence.

Next, a drive structure of the fourth lens group 14 is explained with reference to FIGS. 7, 8, 20A and 20B.

Figure 20A:
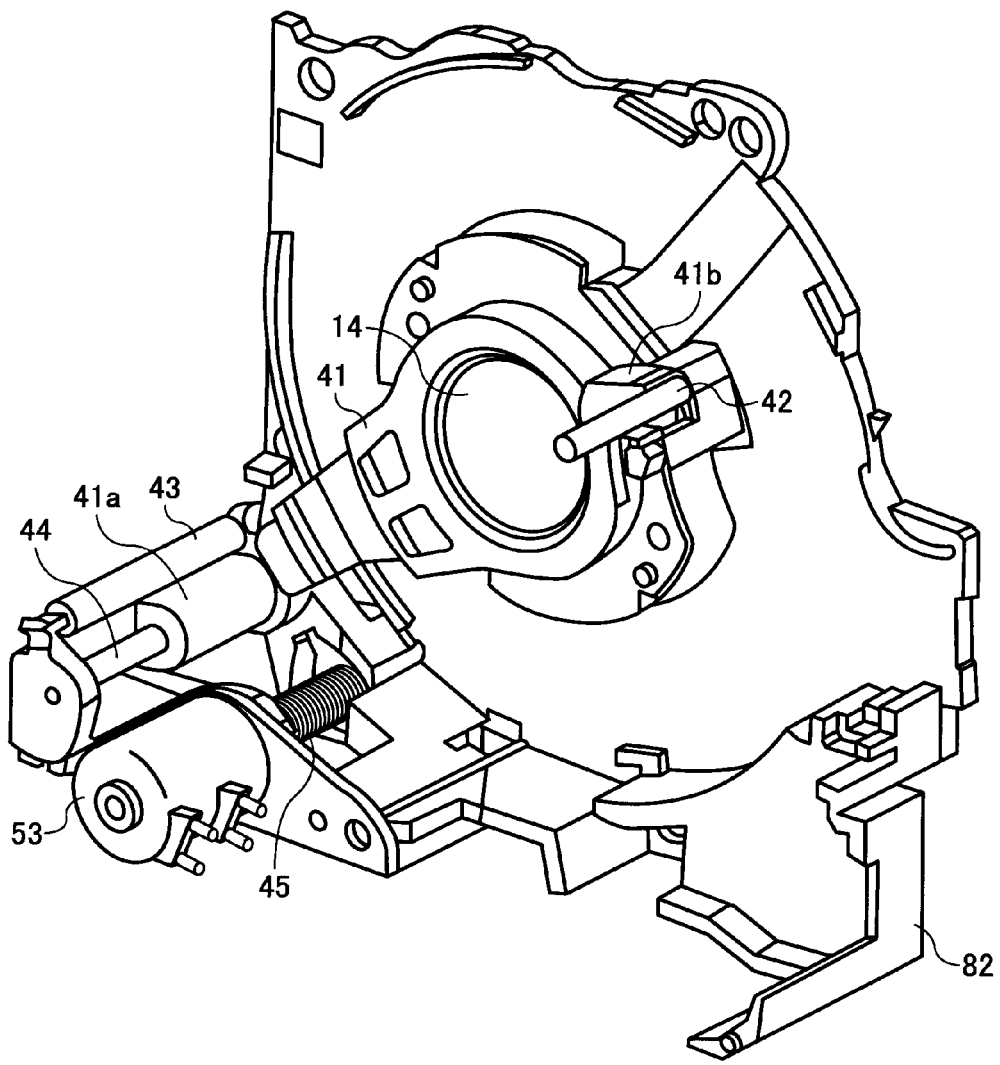
FIG. 20A is an exploded perspective view of a structure of a fourth lens retention frame and a drive operation system thereof.
Figure 20B:
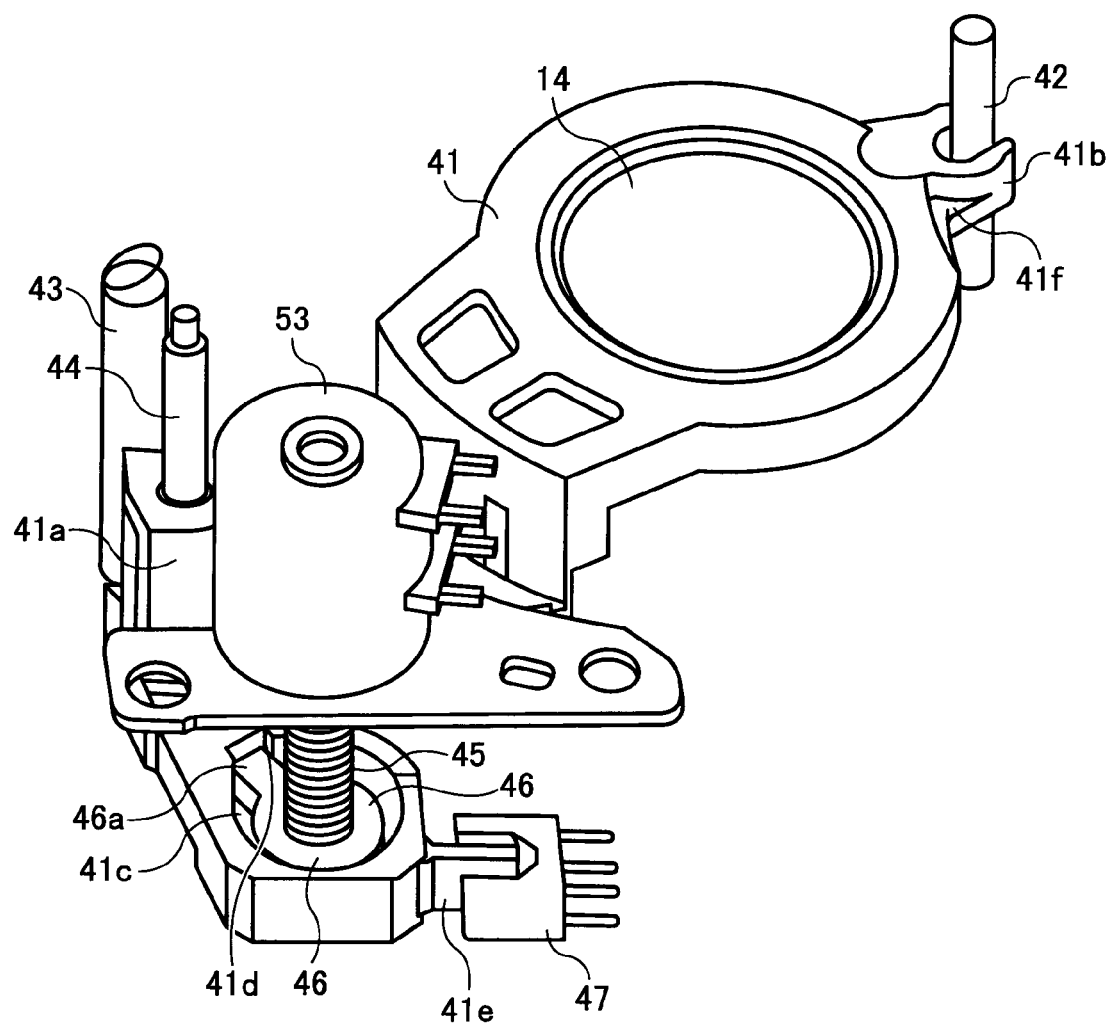
FIG. 20B is an exploded perspective view of the structure with one portion thereof omitted, as seen from a different angle.

The fourth lens group 14 used as a focusing lens for focusing the lens groups in the illustrated embodiment is retained by the fourth frame 41, as shown in FIGS. 20A and 20B. The fourth frame 41 includes a sleeve portion 41a in which the fourth frame main-guide shaft 44 disposed in parallel with the optical axis and fixed to a lens barrel base 82 is fitted, and a rotation-preventing portion 41b in which the fourth frame sub-guide shaft 42 disposed in parallel with the optical axis and fixed to the lens barrel base 82 is fitted, to limit the rotation of the fourth frame 41. With such a structure, the fourth frame 41 can be moved freely along the fourth frame main-guide shaft 44 or the optical axis. A fourth frame drive motor 53 comprising a stepping motor is used as a drive source for driving the fourth frame 41 in the illustrated embodiment. Provided on an output shaft of the fourth frame drive motor 53 is a fourth frame lead screw 45 which is threaded into a threaded hole provided in a fourth frame female screw member 46.

The fourth frame 41 has an opening for inserting the fourth frame female screw member 46. The opening has an engaging portion 41c for engaging with the fourth frame female screw member 46 in a perpendicular plane to the optical axis in a side of the image plane. The fourth frame 41 is always engaged with the fourth frame female screw member 46 by allowing the fourth frame 41 to bias to the subject by a fourth frame spring 43.

The fourth frame female screw member 46 has a radially projected protrusion 46a. The protrusion 46a is engaged in a bore 41d provided in one side of the opening for inserting the fourth frame female screw member 46 of the fourth frame 41 so that the rotation of the fourth frame female screw member 46 is stopped.

In this way, when the fourth frame drive motor 53 which is the stepping motor is driven, the fourth frame lead screw 45 rotates, the fourth frame female screw member 46 is moved in the forward and reverse directions along an axis of the fourth frame lead screw 45 or the optical axis X. Because the fourth frame 41 engages with the fourth frame female screw member 46, the fourth frame 41 is moved along the optical axis following to the movement of the fourth frame female screw member 46. In this case, although the fourth frame lead screw 45 is formed on the output shaft of the fourth frame drive motor 53, the fourth frame lead screw 45 may be rotated by constituting the fourth frame drive motor 53 and the fourth frame lead screw 45 separately and connecting them through gears or the like.

The fourth frame 41 is provided with a light-shielding piece 41e which shields an optical passage of a fourth group photo-interrupter 47 provided on the lens barrel base 82, the light-shielding piece 41e is capable of light-shielding or passing light through the optical passage of the fourth group photo-interrupter 47 in response to the movement of the fourth frame 41. In this case, the fourth frame 41 can be moved in a predetermined position by recognizing as a reference position a time at which the light-shielding pieces is set from the light-shielding state to the light-passing state, energizing a pulse waveform of any pulse number from the reference position, rotating the fourth frame drive motor 53.

Meanwhile, the fourth frame 41 has a concave portion 41f which is provided in an outer peripheral edge thereof and allows the light-shielding strip 31b of the third frame 31 as the photo-interrupter to move toward the optical axis to avoid the interference with the fourth frame 41, thereby the moved amount of the fourth frame 41 can be increased and a range capable of focusing can be enlarged. Moreover, as described above, there is a clearance between the fourth frame 41 and the fourth frame female screw member 46 in the direction of the optical axis, but the position in the direction of the optical axis of the fourth frame 41 can be controlled accurately by constantly biasing the fourth frame 41 toward the subject by the fourth frame spring 43.

The collapsed position of the first rotary cylinder 22, the first liner 23, the first lens group 11, the second lens group 12, and the shutter/aperture unit 15 is controlled based on the zoom position-reference signal generated by the zoom position detector comprising the photo-reflector and so on disposed in the fixed frame 21. That is to say, it is possible to complete the storing operation by moving them toward the image plane by the predetermined pulse count number of the drive pulse generated by the pinion gear acting as the encoder and the zoom count detector disposed adjacent to the pinion gear after the change of from the H to the L of the zoom position storage reference signal occurs.

In storing, the fourth frame 41 is positioned in the first collapsed position as described above, while, when the first rotary cylinder 22 is moved to the collapsed position, the most distal surface of the first rotary cylinder 22 or the first liner 23 contacts with the fourth frame 41 and presses the fourth frame 41 to move to the second collapsed position finally.

By such an operation, even if variations of the attached position of the fourth group photo-interrupter 47 in the direction of the optical axis occur, the fourth frame 41 can be moved to the collapsed position accurately without requiring a complicated adjustment. Such an operation can be accomplished for the reason that a length of the engaging space formed in the fourth frame 41, in the direction of the optical axis is larger than a thickness of the fourth frame female screw member 46.

The zooming motor 51 for moving the first lens group 11, the second lens group 12, and the shutter/aperture unit 15 is structured by the DC motor as described above in the illustrated embodiment, the third frame drive motor 52 for driving the third lens group 13 and the fourth frame drive motor 53 for driving the fourth lens group 14 are generally configured to use a pulse motor, for example, are driven in conjunction with each other in a software-like manner to achieve an appropriate zooming action performed mainly by the first to the third lens groups 11-13 and an appropriate focusing action performed mainly by the fourth lens group 14, for example.

Here, a drive control system for the lens groups constituting the lens barrel is described in detail.

Figure 21:
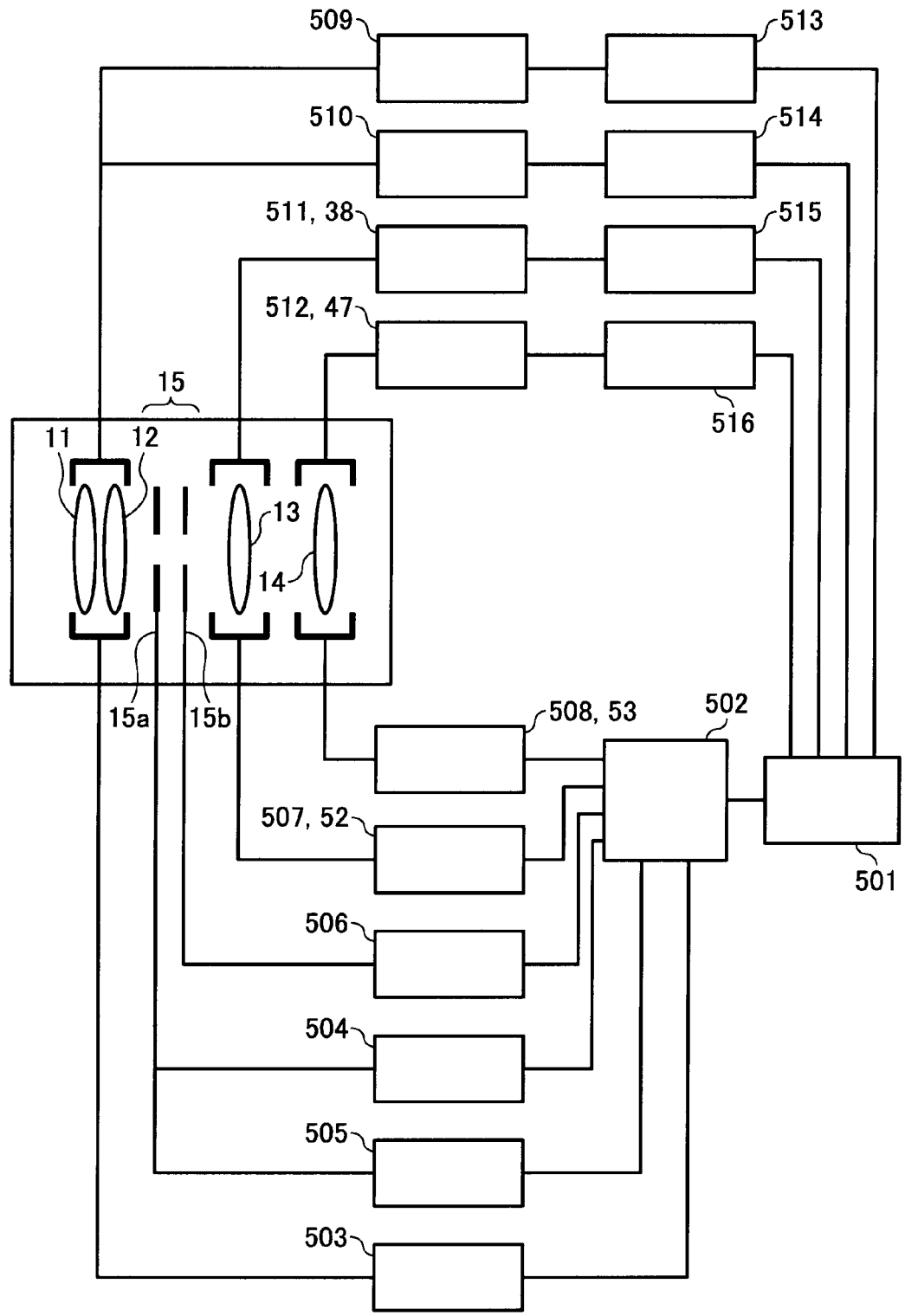
FIG. 21 is a block diagram showing a structure of a drive control system.

The drive control system is shown in FIG. 21. The drive control system includes a central processing unit (CPU) 501, a motor driver 502, a first and second frames DC motor 503, a first aperture motor 504, a second aperture motor 505, a shutter motor 506, a third frame pulse motor 507, a fourth frame pulse motor 508, a first and second frames photo-interrupter 509, a first and second frames photo-reflector 510, a third frame photo-interrupter 511, a fourth frame photo-interrupter 512, a first and second frames photo-interrupter drive circuit 513, a first and second frames photo-reflector drive circuit 514, a third frame photo-interrupter drive circuit 515, and a fourth frame photo-interrupter drive circuit 516.

The CPU gives a command such as an initial setting of the motor driver 502, the selection for a drive motor, the setting of a drive voltage, a direction for driving and so on to the motor driver 502. The motor driver 502 controls the motor system of the first and second frames DC motor 503, the first aperture motor 504, the second aperture motor 505, the shutter motor 506, the third frame pulse motor 507, the fourth frame pulse motor 508 and so on, in accordance with the command from the CPU 501.

The first and second frames DC motor 503 drives the first and second lens groups 11 and 12. As always, the first and second groups 11 and 12 are driven separately with respect to each other through a cam mechanism in response to the drive of the first and second frames DC motor 503. The first aperture motor 504 and the second aperture motor 505 are configured to drive an aperture of the shutter/aperture unit 15. The shutter motor 506 drives a shutter of the shutter/aperture unit 15. The third frame pulse motor 507 drives the third lens group 13. The fourth frame pulse motor 508 drives the fourth lens group 14.

The CPU 501 supplies a drive electricity to the first and second frames photo-interrupter 509, the first and second frames photo-reflector 510, the third frame photo-interrupter 511, and the fourth frame photo-interrupter 512 as a position-detecting device through the first and second frames photo-interrupter drive circuit 513, the first and second frames photo-reflector drive circuit 514, the third frame photo-interrupter drive circuit 515, and the fourth frame photo-interrupter drive circuit 516. The CPU 501 also acquires a positional information signal detected by the first and second frames photo-interrupter 509, the first and second frames photo-reflector 510, the third frame photo-interrupter 511, and the fourth frame photo-interrupter 512.

The first and second frames photo-interrupter drive circuit 513, the first and second frames photo-reflector drive circuit 514, the third frame photo-interrupter drive circuit 515, and the fourth frame photo-interrupter drive circuit 516 have a function to control suitably a level of a projecting current and an output signal of each of the first and second frames photo-interrupter 509, the first and second frames photo-reflector 510, the third frame photo-interrupter 511, and the fourth frame photo-interrupter 512.

The motor driver 502 receives a command from the CPU 501 and executes the command. The CPU sets a designated voltage to one or more selected motors of the first and second frames DC motor 503, the first aperture motor 504, the second aperture motor 505, the shutter motor 506, the third frame pulse motor 507, the fourth frame pulse motor 508, and controls them in accordance with a timing of drive command.

Here, a lens barrier 62 for protecting the lens barrel is described as follows.

Figure 3:
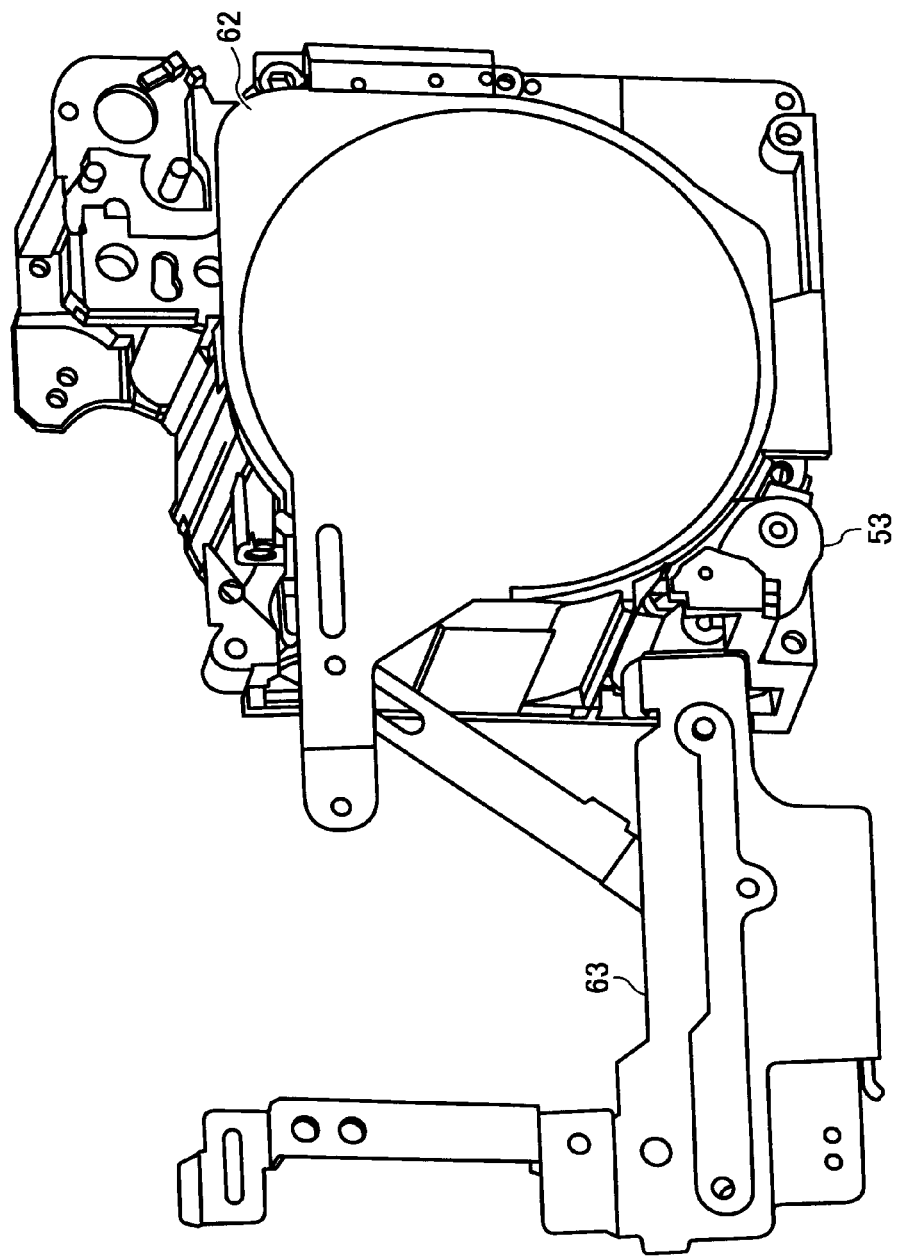
FIG. 3 is a schematic perspective view showing a structure of a main part of the optical system device including the lens barrel in which a lens barrier is closed, as viewed from the subject in the optical axis direction.
Figure 4:
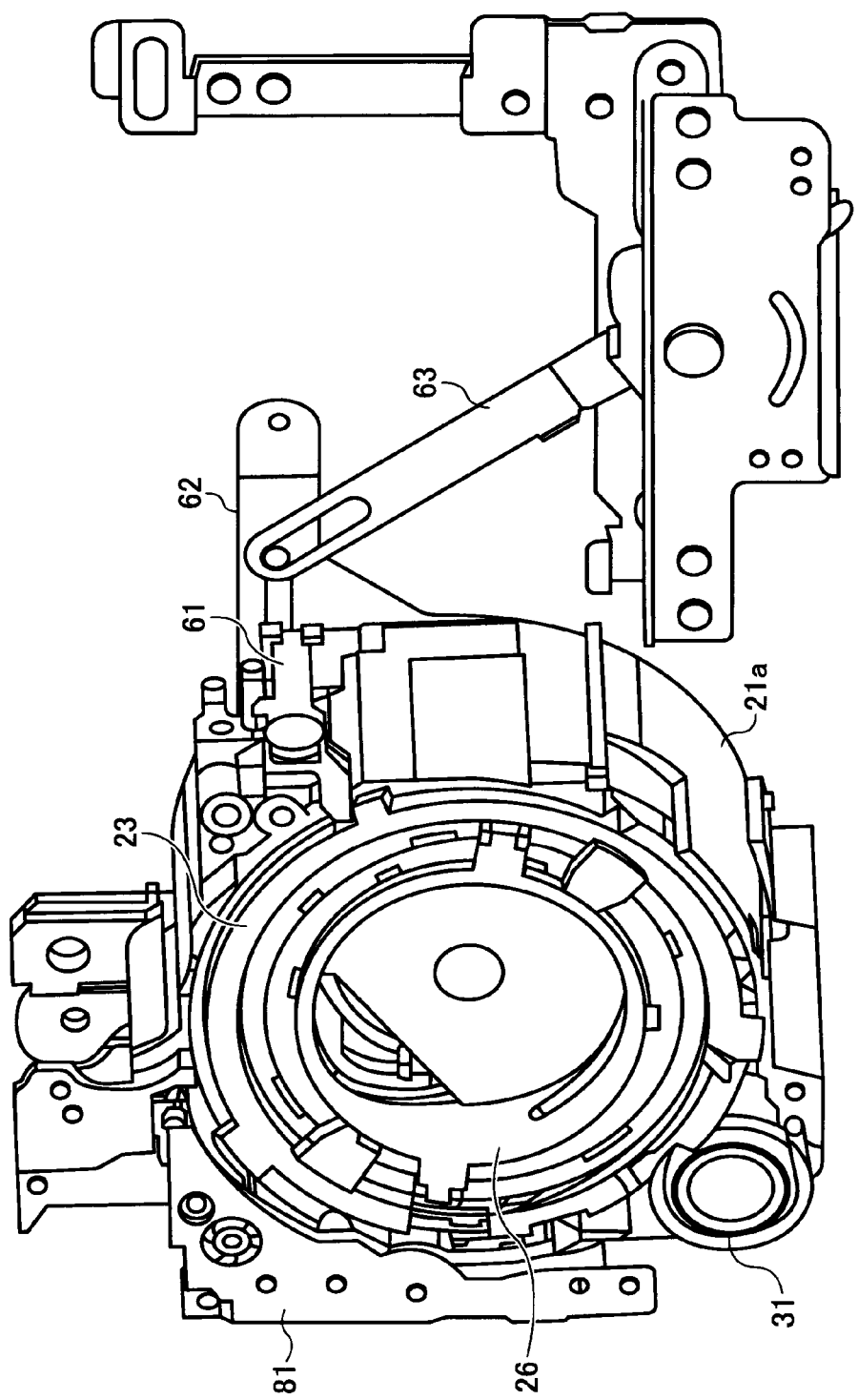
FIG. 4 is a schematic perspective view showing the structure of the main part of the lens barrel shown in FIG. 3, as viewed from the imaging plane.
Figure 5:
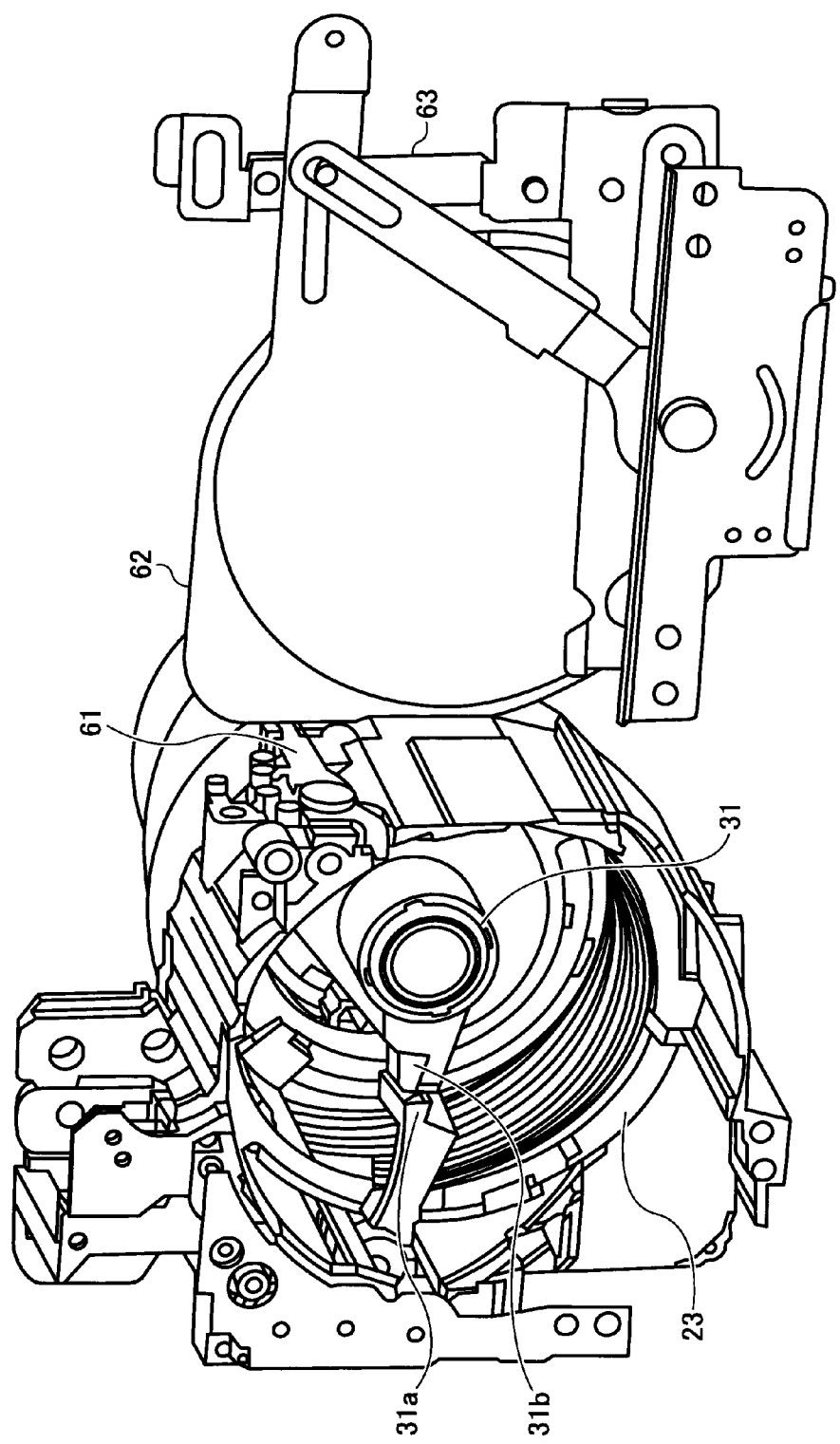
FIG. 5 is a schematic perspective view of the structure of the main part of the lens barrel in a state in which the lens barrier is opened in a photographing state with the lens groups extended, as viewed from the imaging plane.
Figure 6:
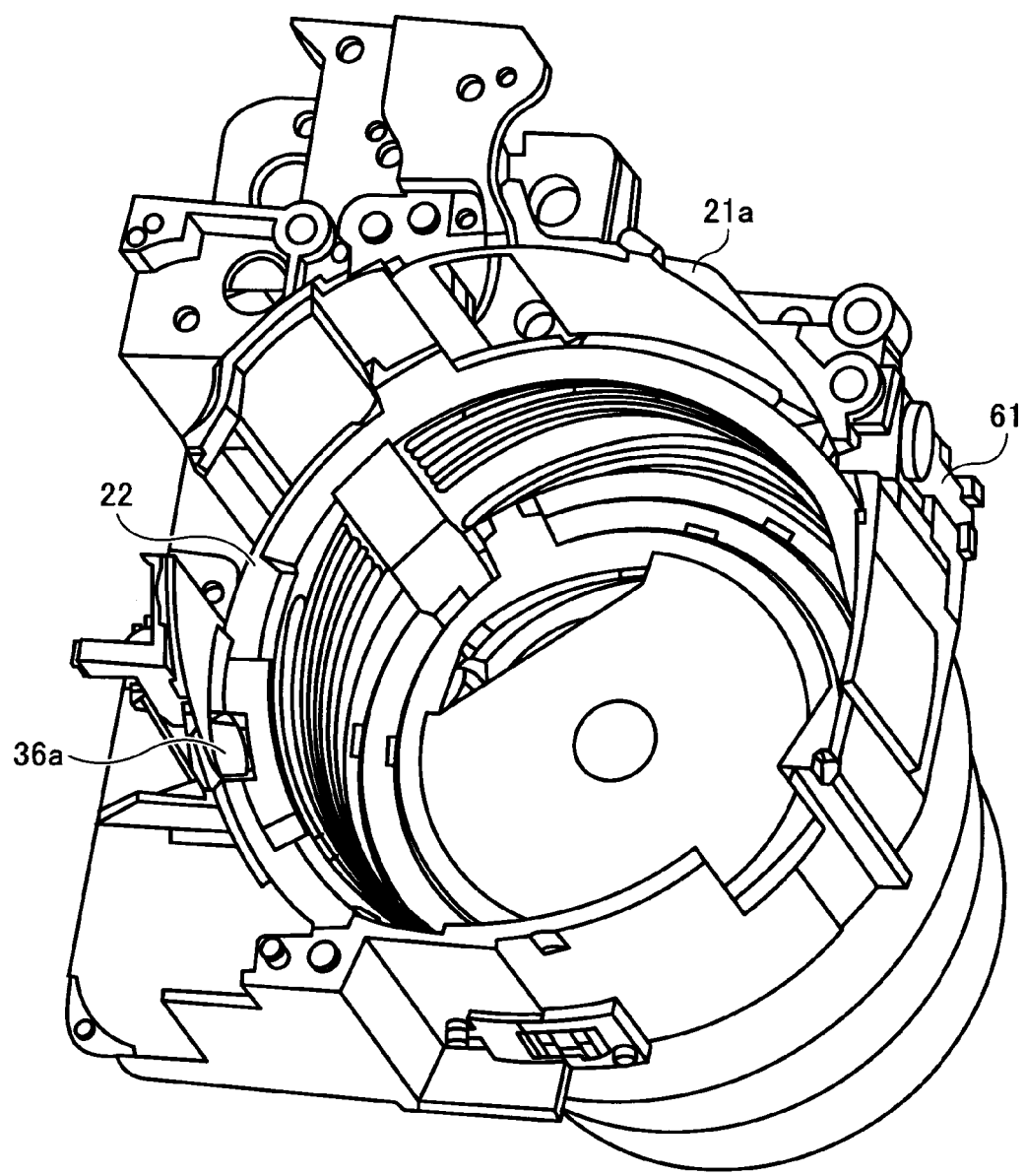
FIG. 6 is a perspective view of the structure of the main part of the lens barrel in the photographing state with the lens groups extended, as viewed from the imaging plane.

The lens barrier 62 shown in FIG. 3 to FIG. 5 is disposed to cover a side of the first lens group 11 facing the subject, in the stored state, and protects the lens group from contaminations or damages. The lens barrier 62 is moved in back and forth directions transverse to the optical axis by a barrier drive system 63. FIGS. 3 and 4 show a state in which the lens barrier 62 is closed, and FIG. 5 shows a state in which the lens barrier 62 is almost opened. The barrier drive system 63 drives the lens barrier 62 between the closed position (FIGS. 3 and 4) and the opened position (a position farther from the optical axis than the position shown in FIG. 5) through the operation of a barrier-operating element (see a barrier-operating element 301 in FIG. 17 A). The barrier drive system 63 has a function to bias the lens barrier 62 in a closing direction at the closed position and in an opening direction at the opened position.

Therefore, when driving the lens barrier 62 in the closed state toward the opening direction, the lens barrier 62 is moved to the opened state semi-automatically when the lens barrier 62 passes a predetermined position. Also, when an attempt is made to close the lens barrier 62 from the opened state, the lens barrier 62 is moved to the closed state semi-automatically when the lens barrier 62 passes a predetermined position. The position in the closed state is not necessarily required to be the same as the predetermined position in the opened state, rather, it is preferable that the lens barrier has a certain degree of hysteresis characteristics in the movement to accomplish a smooth operation of the lens barrier 62.

A barrier control strip 61 is provided on a side of the fixed frame 21 in the direction of opening the lens barrier 62 so as to be capable of sliding in a direction along the optical axis, and is biased toward the subject by a spring or the like as needed. In the stored state, an engaging portion of the barrier control strip 61 which is formed into a bent shape engages with base edge surfaces of the first rotary cylinder 22 and the first liner 23 and is biased toward the image surface against a biasing force of the spring, and hence is not in contact with the lens barrier 62. In the used or photographing state, the lens barrier 62 is completely away from the respective lens groups and retaining frames thereof. In this state, engagement of the engaging portion of the barrier control strip 61 is released, and hence the barrier control strip 61 is biased toward the subject by the biasing force, and then, a barrier-intercepting portion at the distal end enters into a passage of the lens barrier 62.

In this state, when the lens barrier 62 is rapidly operated to move the lens barrel to the collapsed position, there is a possibility that the lens barrier 62 hits against the lens barrel. However, since the barrier-intercepting portion at the distal end of the barrier control strip 61 crosses the passage of the lens barrier 62 to prevent the lens barrier 62 from entering into a moving passage of the lens barrel. When the respective lens groups are stored and the stored state is completed, the base edge surfaces of the first rotary cylinder 22 and the first liner 23 engage with the engaging portion of the barrier control strip 61, which is formed into the bent shape, to energize the engaging portion toward the image surface against the biasing force. Therefore, the lens barrier 62 can be moved to the front portion of the lens barrel, and hence the lens barrier 62 is correctly set to the closed position. In this manner, the interference between the lens barrier 62 and the lens cylinders retaining the lens groups can be effectively prevented.

<Actuation Sequence>

Figure 22B:
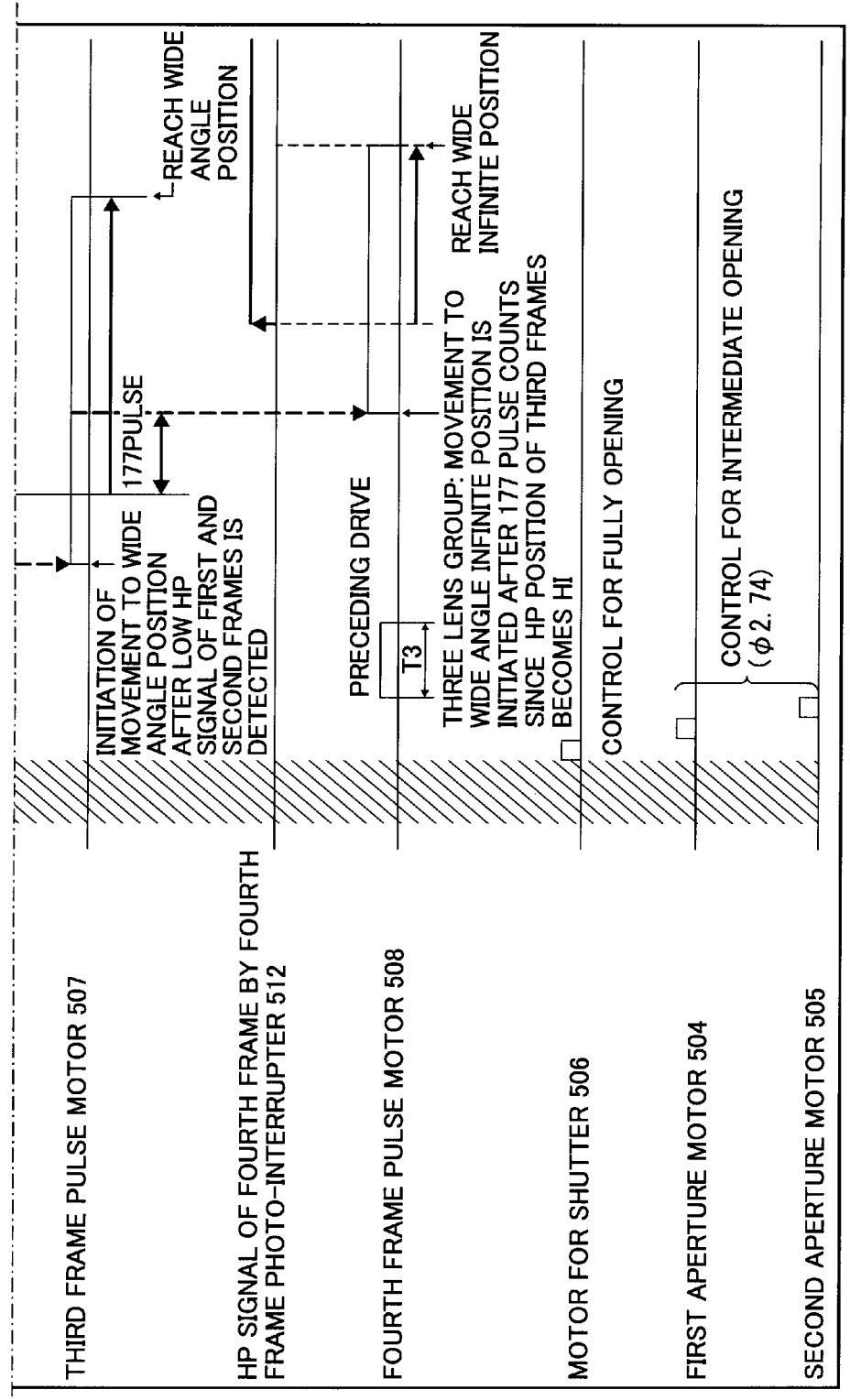
FIG. 22 is a timing chart showing a sequence at the time of opening a barrier in an actuation sequence.

An actuation sequence of the above-mentioned drive control system is explained with reference to FIG. 22.

By opening the lens barrier 62, a barrier switch signal from a barrier switch (not shown) changes from the H to the L and an initial setting of the lens barrel is initiated. Meanwhile, the barrier switch is operated by opening mechanically the lens barrier 62 with an operating lever or the like (not shown), while the lens barrier may be opened by operation of the barrier switch. Executing the initial setting causes the initialization of the motor driver 502 for driving the motor system, and the initialization of the first and second frames photo-interrupter 509, the first and second frames photo-reflector 510, the third frame photo-interrupter 511, and the fourth frame photo-interrupter 512, as the position detecting device for a position through the first and second frames photo-interrupter drive circuit 513, the first and second frames photo-reflector drive circuit 514, the third frame photo-interrupter drive circuit 515, and the fourth frame photo-interrupter drive circuit 516.

In the case that detected results by the first and second frames photo-interrupter 509, the third frame photo-interrupter 511, and the fourth frame photo-interrupter 512 indicate the collapsed position, the first and second frames DC motor 503 is adapted to drive to the wide angle position. A driven amount of the first and second frames DC motor 503 is detected by the first and second frames photo-interrupter 509 for detecting the moving amount of the first and second lens groups. The moving amount is detected by counting edge portions of the pulse signal (PI signal) by the first and second frames photo-interrupter 509. A period for actuating right after the first and second frames DC motor 503 is actuated is set, during which, the drive voltage is lower than a constant voltage in order to prevent an incoming current by the DC motor. After the actuation period is completed, the drive voltage is increased to a stationary voltage.

A period for monitoring the barrier switch or barrier SW right after the initiation of the actuation of the first and second frames DC motor 503 is set and a state of the barrier switch signal is monitored by the CPU 501. During monitoring period, if the barrier switch signal indicates the opening state of the lens barrier, the shutter is set in the full opening by the shutter motor 50 for driving the shutter. Then, the aperture is set in an intermediately restricted state by the first and second aperture motors 504 and 505.

In this example, although the aperture is set in the intermediately restricted state, it may be set in an opened state or fully opened state.

Next, the fourth lens group 14 is previously driven through the fourth pulse motor 508. By achieving the previous drive of the fourth lens group 14, the total time from the initiation of the drive of the first and second lens groups to the completion of the drive of the final fourth lens group 14 can be reduced. Moreover, it is possible to greaten a torque when driving and prevent the interference of the fourth lens group with the other parts by setting a pulse rate of the fourth frame pulse motor 508 in the previous drive thereof lately than that in the normal driving state.

Meanwhile, the driven amount of the fourth lens group by the fourth frame pulse motor 508 is set so that the third and fourth lens groups interfere with respect to each other.

When the previous drive of the fourth lens group 14 is completed, the waiting for detecting reference position by the first and second frames photo-reflector 510 is set. A place where the reference position signal changes from the H to the L becomes the reference position or HP position of the first and second lens groups 11 and 12. When the reference position or HP position of the first and second lens groups 11 and 12 is detected, positional information of the first and second lens groups 11 and 12 is reset. The movement of the first and second lens groups is controlled by counting the pulse-like signal (PI signal) by the first and second frames photo-interrupter 509 based on the positional information to acquire the moved amount of the first and second lens groups until the wide angle position. The wide angle position is previously set, but it can be changed by storing it in a nonvolatile memory and rewriting it.

A specified pulse period before reaching the wide angle position is a stop controlling period, overrun in reaching the wide angle position can be reduced by lowering the drive voltage in accordance with residual pulse numbers to the wide angle position. If the first and second lens groups reach the wide angle position by counting the PI signal by the first and second frames photo-interrupter 509, a braking control is made in order to stop the first and second lens groups. An amount of overrun during the braking period is counted so that the final position of the first and second lens groups 11 and 12 is decided.

Moreover, when the reference position or HP position of the first and second lens groups 11 and 12 is detected, the drive of the third frame pulse motor 507 in the direction of wide angle position is initiated to control the third lens group 13 with the first and second lens groups 11 and 12. The driving time of the third lens group 13 can be reduced by setting the pulse rate in driving the third group pulse motor highly or rapidly than that in the normal drive.

The third lens group 13 is waited for detecting the reference position by the third frame photo-interrupter 511. A place where the reference position signal or HP signal by the third frame photo-interrupter 511 changes from the L to the H becomes the reference position or HP position of the third lens group 13. When the reference position or HP position is detected, positional information of the third lens group 13 is reset. The third lens group 13 is pulse-driven by the third frame pulse motor 507 based on the positional information to obtain the moved amount of the third lens group 13 to the wide angle position. The wide angle position is previously set, but it can be changed by storing it in a nonvolatile memory such as an EEPROM or the like and rewriting it.

In addition, the final stopping position of the third lens group 13 becomes a position in consideration of overrun of the first and second lens groups 11 and 12. That is to say, because the stopping position of the first and second lens groups 11 and 12 is the wide angle position plus overrun amount, the stopping position of the third lens group 13 is also the wide angle position plus α in consideration of overrun of the first and second lens groups 11 and 12. A value of the α is obtained by a linear calculation depending on pulse numbers between the zooming positions of the first and second lens groups 11 and 12, the overrun amount and a pulse number between the zooming positions of the third lens group 13. The zooming position is one of sections divided into 16 equally between the wide angle position and the telephoto position (between W and T).

If the drive of the first and second lens groups 11 and 12 is completed, the reference position or HP position of the third lens group 13 is detected, and the third lens group 13 is driven more than the specified pulse number, the drive of the fourth frame pulse motor 508 in the direction of a wide angle infinite position is initiated. If the drive of the first and second lens groups 11 and 12 is not completed, or the third lens group 13 is not driven more than the specified pulse from the reference position, the drive of the first and second lens groups 11 and 12 is completed, and a standby state is set until the third lens group 13 is driven more than the specified pulse from the reference position. When the drive of the first and second lens groups 11 and 12 are not completed and the fourth frame pulse motor 508 is driven, the three motors are driven simultaneously to increase current consumption. Therefore, in the example, only the third and fourth lens groups are driven simultaneously. Moreover, when the fourth lens group 14 is driven before the third lens group 13 reaches the position more than the specified pulse number, the interference between the third and fourth lens groups 13 and 14 occurs. Therefore, the drive of the fourth lens group 14 is initiated after the third lens group 13 is driven more than the specified pulse number.

The fourth lens group 14 is waited for detecting the reference position by the fourth frame photo-interrupter 512. In addition, current consumption can be reduced by setting the drive voltage of the fourth frame pulse motor 508 to be lower than that of the normal drive. A place where the reference position signal or HP signal by the fourth frame photo-interrupter 512 changes from the L to the H becomes the reference position or HP position of the fourth lens group 14. When the reference position or HP position of the fourth lens group is detected, positional information of the fourth lens group 14 is reset. The fourth lens group 14 is pulse-driven by the fourth frame pulse motor 508 based on the positional information to obtain the moved amount of the fourth lens group 14 to the wide angle position. The wide angle position is previously set, but it can be changed by storing it in a nonvolatile memory such as an EEPROM or the like and rewriting it.

In the embodiment, as described above and shown in a timing chart of FIG. 22, the current consumption can be reduced by limiting the simultaneously driven motors to two motors, and a time of actuating the motors can be shortened by the optimum drive of the motors.

Figure 23:
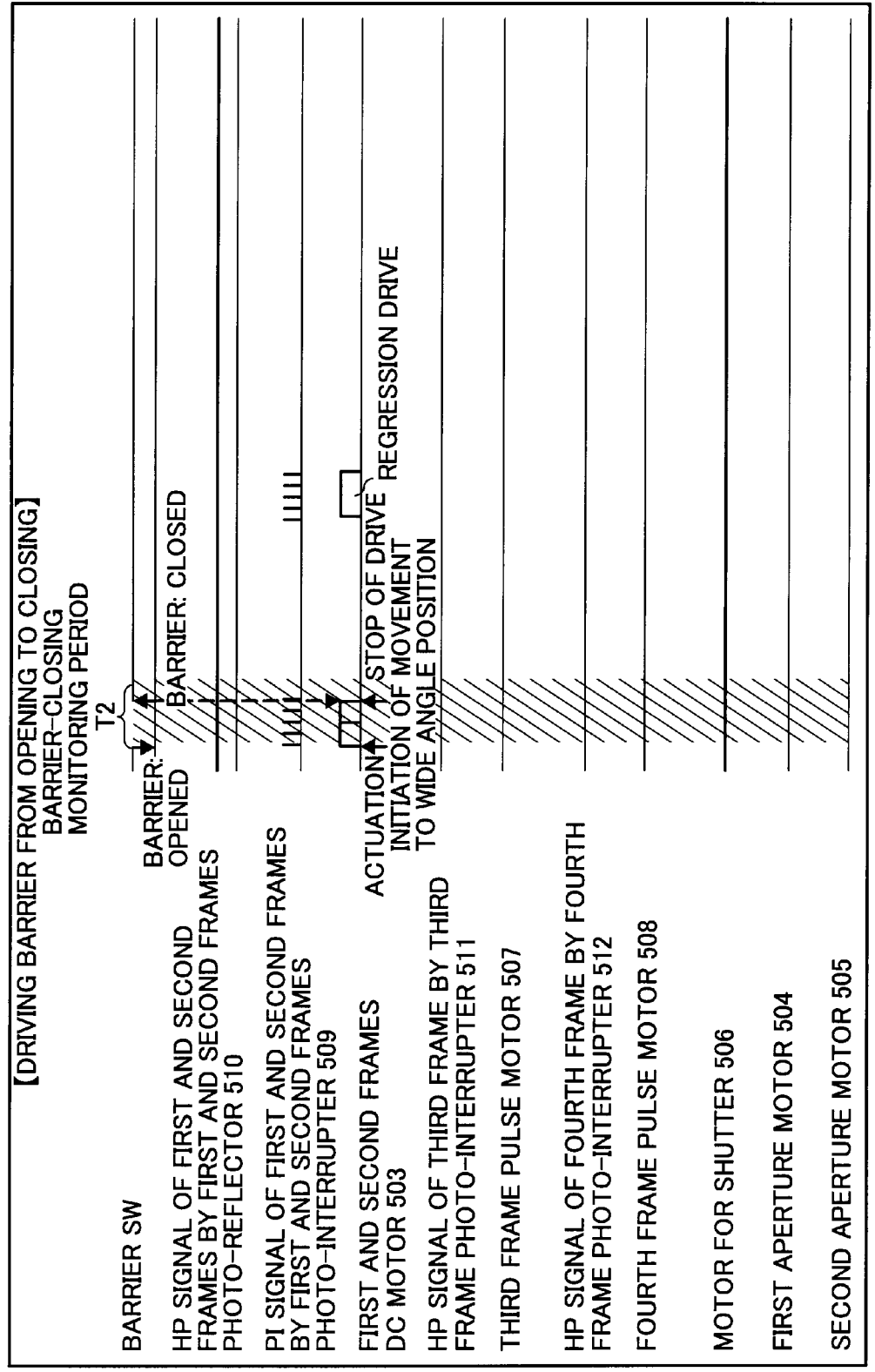
FIG. 23 is a timing chart showing a sequence from the open barrier to the closed barrier in the actuation sequence.

Next, a case in which the barrier switch signal is changed in a closed state during a period for monitoring the barrier switch right after the actuation of the first and second frames DC motor 503 is initiated is explained with reference to FIG. 23. If the barrier switch signal is changed from the opened state to the closed state during the period, the drive of the first and second frames DC motor 503 is stopped.

Thereafter, the drive of the first and second frames DC motor 503 is initiated by a moved amount in the direction of the collapsed position or the specified pulse number. In this case, the drive voltage is lower and breaking and damage are prevented from generating even if operating parts of the lens barrier impact with switch first and second lens groups and so on in the end of a collapsed position. By such a control, the first and second lens groups are prevented from interfering with the lens barrier.

[Reset Sequence]

Moreover, if the detected result of the first and second photo-reflector 510 is not the collapsed position (reference position HP, signal L), the detected result of the third frame photo-interrupter 511 is not the collapsed position (reference position HP, signal H), or the detected result of the fourth frame photo-interrupter 512 is not the collapsed position (reference position HP, signal H), the reset sequence drive is executed.

Figure 24B:
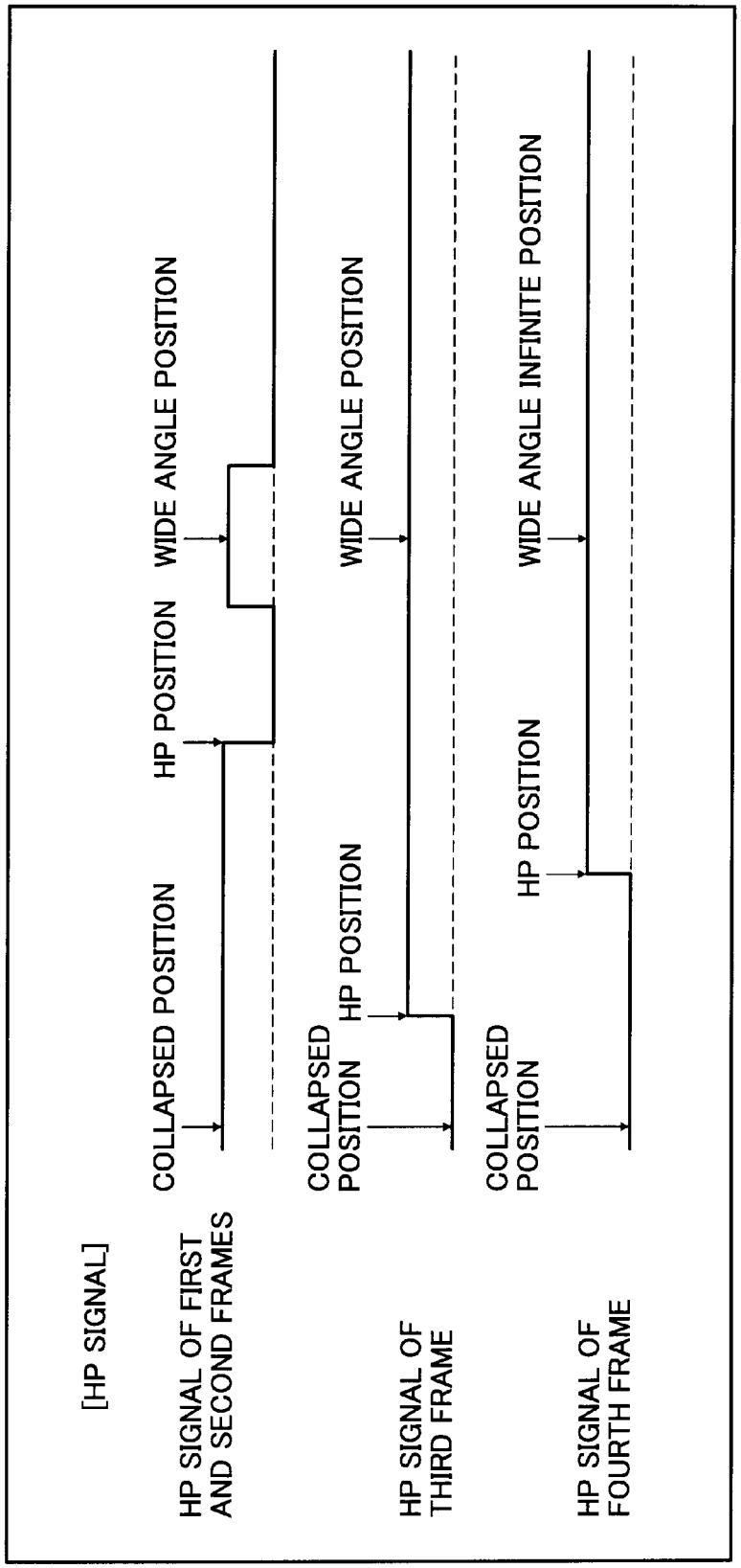
FIG. 24 A is a table showing a reset sequence.
Figure 25A:
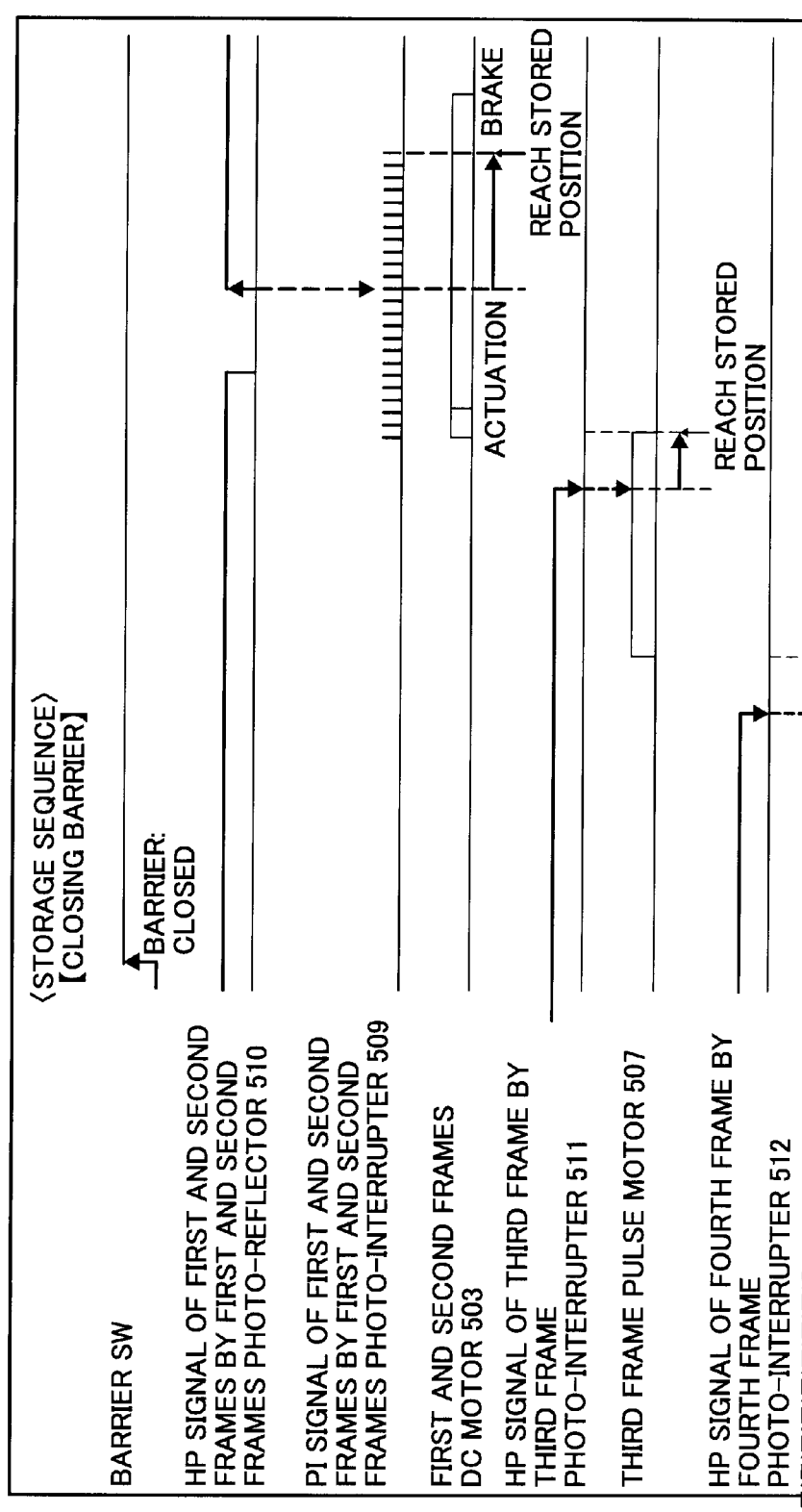
FIG. 25 is a timing chart showing a retraction sequence when the barrier is closed.
Figure 25B:
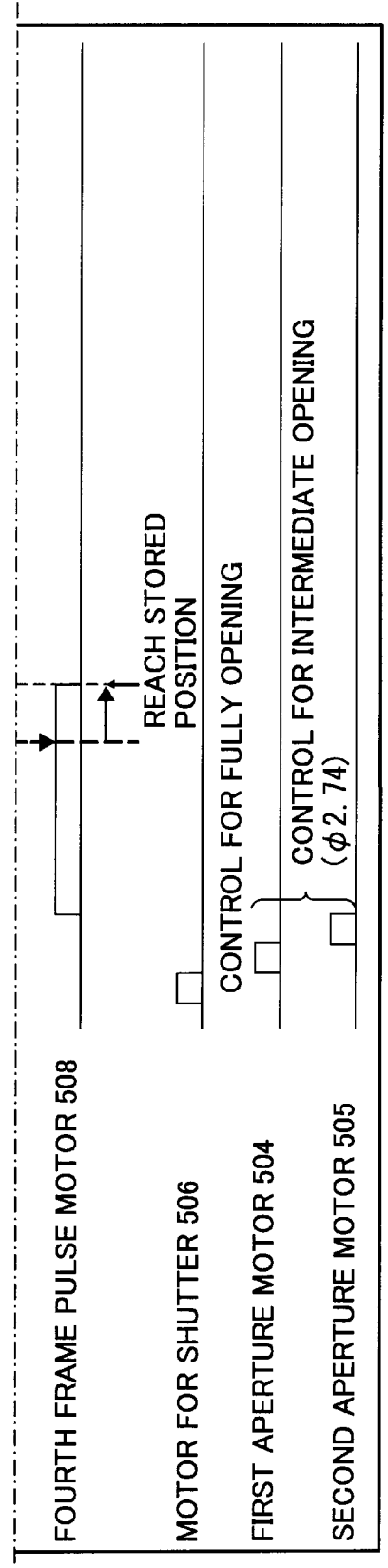

The reset sequence is described referring to FIGS. 24A and 24B as follows.

<With Respect to First and Second Group HP Signal=H, Third Group HP Signal=L, Fourth Group HP Signal=L>

First, as the reset operation of the first and second lens groups 11 and 12, the reference position or HP position of the first and second lens groups is detected, and the first and second lens groups are moved to the wide angle position (first and second groups: Reset). Next, as the storing operation of the fourth lens group 14, the reference position or HP position of the fourth lens group 14 is detected, and the fourth lens group is moved to the collapsed position (fourth group: storage).

Subsequently, as the reset operation of the third lens group 13, the reference position or HP position of the third lens group 13 is detected, and the third lens group is moved to the wide angle position (third group: Reset).

Finally, as the reset operation of the fourth lens group 14, the reference position or HP position of the fourth lens group 14 is detected, and the fourth lens group is moved to the wide angular infinite position (fourth group: Reset).

<With Respect to First and Second Group HP Signal=H, Third Group HP Signal=L, Fourth Group HP Signal=H>

First, as the retiring operation of the first and second lens groups 11 and 12, the first and second lens groups are driven in the direction of the telephoto and pulse-driven by the specified pulse after the lowering of the reference signal is detected (first and groups; retire). Next, as the storing operation of the fourth lens group 14, the reference position or HP position of the fourth lens group 14 is detected, and the fourth lens group is moved to the collapsed position (fourth group: storage). Subsequently, as the reset operation of the first and second lens groups 11 and 12, the reference position or HP position of the first and second lens groups 11 and 12 is detected, and the first and second lens groups are moved to the wide angle position (first and second groups: Reset).

Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With Respect to First and Second Group HP Signal=H, Third Group HP Signal=H, Fourth Group HP Signal=L, First and Second Group HP Signal=H, Third Group HP Signal=H, Fourth Group HP Signal=H>

First, as the retiring operation of the first and second lens groups 11 and 12, the first and second lens groups are driven in the direction of the telephoto and pulse-driven by the specified pulse after the lowering of the reference signal is detected (first and groups; retire). Next, as the storing operation of the fourth lens group 14, the reference position or HP position of the fourth lens group 14 is detected, and the fourth lens group is moved to the collapsed position (fourth group: storage). If the reference position or HP position of the fourth lens group 14 can be detected, as the storing operation of the third lens group, the reference position or HP position of the third lens group 13 is detected, and the third lens group is moved to the collapsed position (third group: storage). If the reference position or HP position of the fourth lens group 14 cannot be detected, because it is considered that the fourth lens group is interfered with the third lens group 13, the storing operation of the third lens group 13 is previously carried out (third group: storage).

If the storing operation of the third lens group 13 is completed, and then the storing operation of the fourth lens group 14 is carried out (fourth group: storage). If the HP position is not detected at the time of operating the storage of the third lens group 13, because it is considered that the third lens group 13 is interfered with the fourth lens group 14, as the retiring operation of the third lens group 13, the third lens group 13 is driven by the specified pulse count in the direction of the telephoto (third group: retire). Thereafter, the storing operation (fourth group: storage) of the fourth lens group 14 and the storing operation (third group: storage) of the third lens group 13 are carried out.

Subsequently, as the reset operation of the first and second lens groups 11 and 12, the reference position or HP position of the first and second lens groups 11 and 12 is detected, and the first and second lens groups are moved to the wide angle position (first and second groups: Reset). Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With Respect to First and Second Group HP Signal=L, Third Group HP Signal=L, Fourth Group HP Signal=L, First and Second Group HP Signal=L, Third Group HP Signal=L, Fourth Group HP Signal=H>

First, as the storing operation of the fourth lens group 14, the reference position or HP position of the fourth lens group 14 is detected, and the fourth lens group is moved to the collapsed position (fourth group: storage). Next, as the storing operation of the third lens group 13, the reference position or HP position of the third lens group 13 is detected, and the third lens group is moved to the collapsed position (third group: storage). Next, as the reset operation of the first and second lens groups 11 and 12, the reference position or HP position of the first and second lens groups is detected, and the first and second lens groups are moved to the wide angle position (first and second groups: Reset). Subsequently, as the reset operation of the third lens group 13, the reference position or HP position of the third lens group 13 is detected, and the third lens group is moved to the wide angle position (third group: Reset). Finally, as the reset operation of the fourth lens group 14, the reference position or HP position of the fourth lens group 14 is detected, and the fourth lens group is moved to the wide angular infinite position (fourth group: Reset).

<With Respect to First and Second Group HP Signal=L, Third Group HP Signal=H, Fourth Group HP Signal=L, First and Second Group HP Signal=L, Third Group HP Signal=H, Fourth Group HP Signal=H>

First, as the storing operation of the fourth lens group 14, the reference position or HP position of the fourth lens group 14 is detected, and the fourth lens group is moved to the collapsed position (fourth group: storage). If the reference position or HP position of the fourth lens group 14 can be detected, as the storing operation of the third lens group 13, the reference position or HP position of the third lens group 13 is detected, and the third lens group is moved to the collapsed position (third group: storage).

If the reference position or HP position of the fourth lens group 14 cannot be detected, because it is considered that the fourth lens group is interfered with the third lens group 13, the storing operation of the third lens group 13 is previously carried out (third group: storage). If the storing operation of the third lens group 13 is completed, and then the storing operation of the fourth lens group 14 is carried out (fourth group: storage). If the HP position is not detected at the time of operating the storage of the third lens group 13, because it is considered that the third lens group 13 is interfered with the fourth lens group 14, as the retiring operation of the third lens group 13, the third lens group 13 is driven by the specified pulse count in the direction of the telephoto (third group: retire).

Thereafter, the storing operation (fourth group: storage) of the fourth lens group 14 and the storing operation (third group: storage) of the third lens group 13 are carried out. Subsequently, as the reset operation of the first and second lens groups 11 and 12, the reference position or HP position of the first and second lens groups 11 and 12 is detected, and the first and second lens groups are moved to the wide angle position (first and second groups: Reset). Next, as the reset operation of the third lens group 13, the reference position or HP position of the third lens group 13 is detected, and the third lens group is moved to the wide angle position (third group: Reset). Finally, as the reset operation of the fourth lens group 14, the reference position or HP signal of the fourth lens group 14 is detected, and the fourth lens group is moved to the wide angular infinite position (fourth group: Reset).

[Storing Sequence]

The barrier switch signal changes from L to H by closing the lens barrier 62 to initiate the storing operation. Meanwhile, the barrier switch may be operated by mechanically closing the lens barrier 62 by means of an operating lever or the like, or the lens barrier 62 may be closed by operation of the barrier switch.

The shutter of the shutter/aperture unit 15 is set in the fully closed state through the full closing control of the shutter by the shutter motor 506. Next, the aperture of the shutter/aperture unit 15 is set in the intermediately restricted state through the intermediate restricting control of the aperture by the first and second aperture driving motors 504 and 505. Subsequently, the storing drive of the fourth lens group 14 is achieved through the fourth frame pulse motor 508. The standby for detecting the reference position of the fourth frame pulse motor 508 by the fourth frame photo-interrupter 512 is set after the drive of the fourth frame pulse motor 508 to the collapsed position is initiated.

The fourth frame pulse motor 508 is pulse-driven by a moved amount to the collapsed position from a place where the reference positional signal or HP signal by the fourth frame photo-interrupter 512 changes from H to L to the collapsed position. The moved amount to the collapsed position is previously set, but the moved amount can be changed by storing it in a nonvolatile memory such as an EEPROM or the like and rewriting it.

Next, the drive of storing the third lens group 13 is executed through the third frame pulse motor 507. The third lens group 13 is waited for detecting the reference position by the third frame photo-interrupter 511 by initiating the drive of the third frame pulse motor 507 in the direction of the collapsed position.

The third lens group 13 is pulse-driven by the moved amount to the collapsed position from the place where the reference position signal or HP signal by the third frame photo-interrupter 511 changes from H to L to the collapsed position. Although the moved amount to the collapsed position is set previously, the moved amount can be changed by storing it in a nonvolatile memory such as an EEPROM or the like and rewriting it.

The drive pulse rate of the third frame pulse motor 507 between the reference position and the collapsed position is lower than the drive pulse rate until the reference position. In this way, a smooth pulse drive can be accomplished by changing the pulse rate in accordance with an area in which a torque is necessary.

Next, the drive of storing the first and second lens groups 11 and 12 is executed through the first and second frames DC motor 503. The first and second lens groups are waited for detecting the reference position by the first and second frames photo-reflector 510 by initiating the drive of the first and second frames DC motor 503 in the direction of the collapsed position.

The control for the moved amount of the first and second lens groups 11 and 12 is achieved by counting the pulse-like signal or PI signal by the first and second frames photo-interrupter 509 to acquire the moved amount to the collapsed position from the place where the reference position signal or HP signal by the first and second frames photo-reflector 510 changes from L to H to the collapsed position. Although the moved amount to the collapsed position is set previously, the moved amount can be configured to be changed by storing it in a nonvolatile memory such as an EEPROM or the like and rewriting it.

In the drive for storing the first and second lens groups 11 and 12, if the first and second lens groups 11 and 12 reach the collapsed position by counting the PI signal by the first and second frames photo-interrupter 509 without dropping the voltage of the first and second frames DC motor 503 before stopping it, a breaking control is achieved in order to stop the drive of the first and second lens groups 11 and 12. This is reason the first and second group DC motor is not stopped at the middle of drive due to the dropping of voltage.

[Changing Magnification Sequence]

Figure 26B:
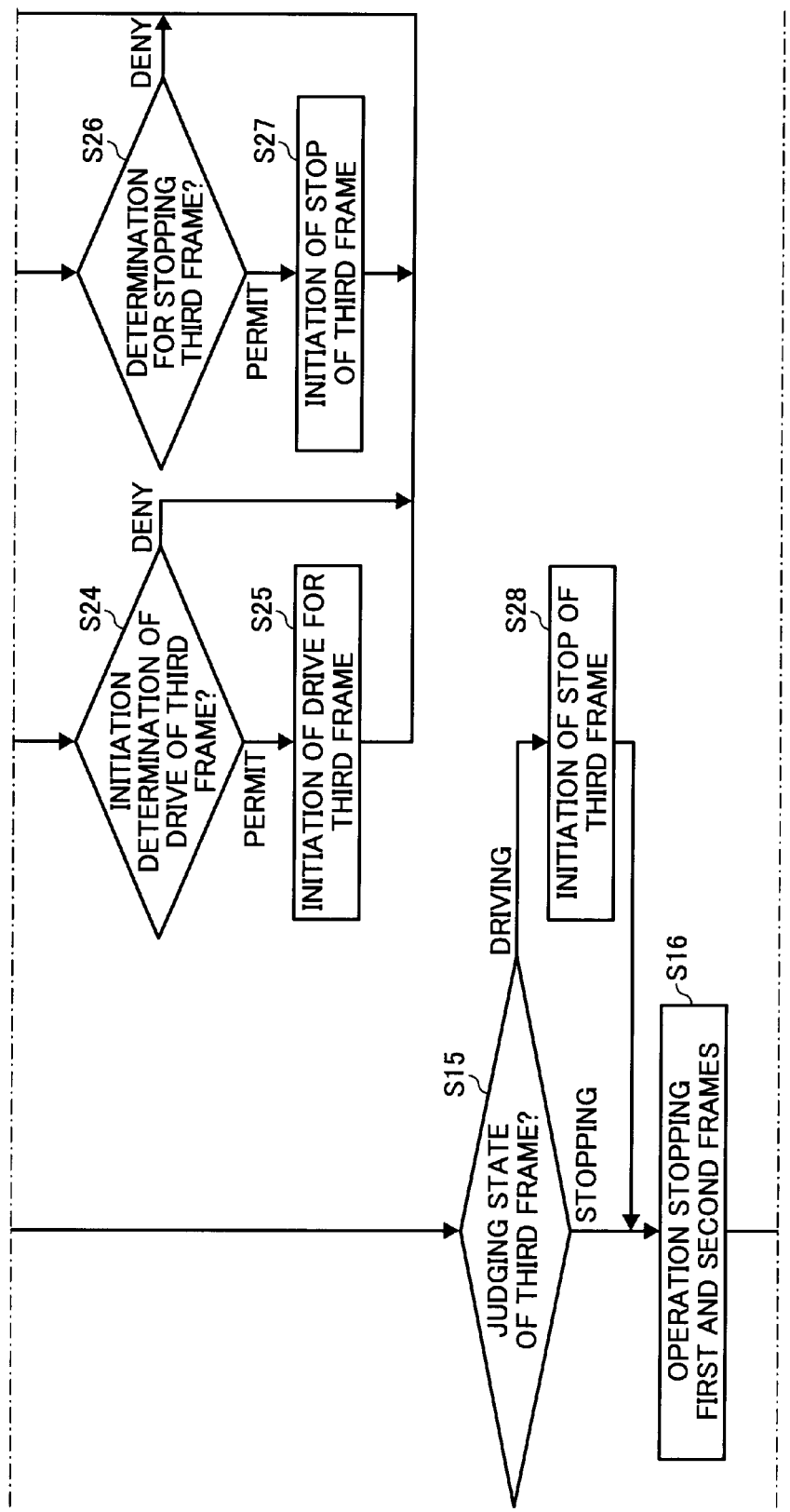
FIG. 26 is a flow chart showing a zoom sequence.
Figure 26C:
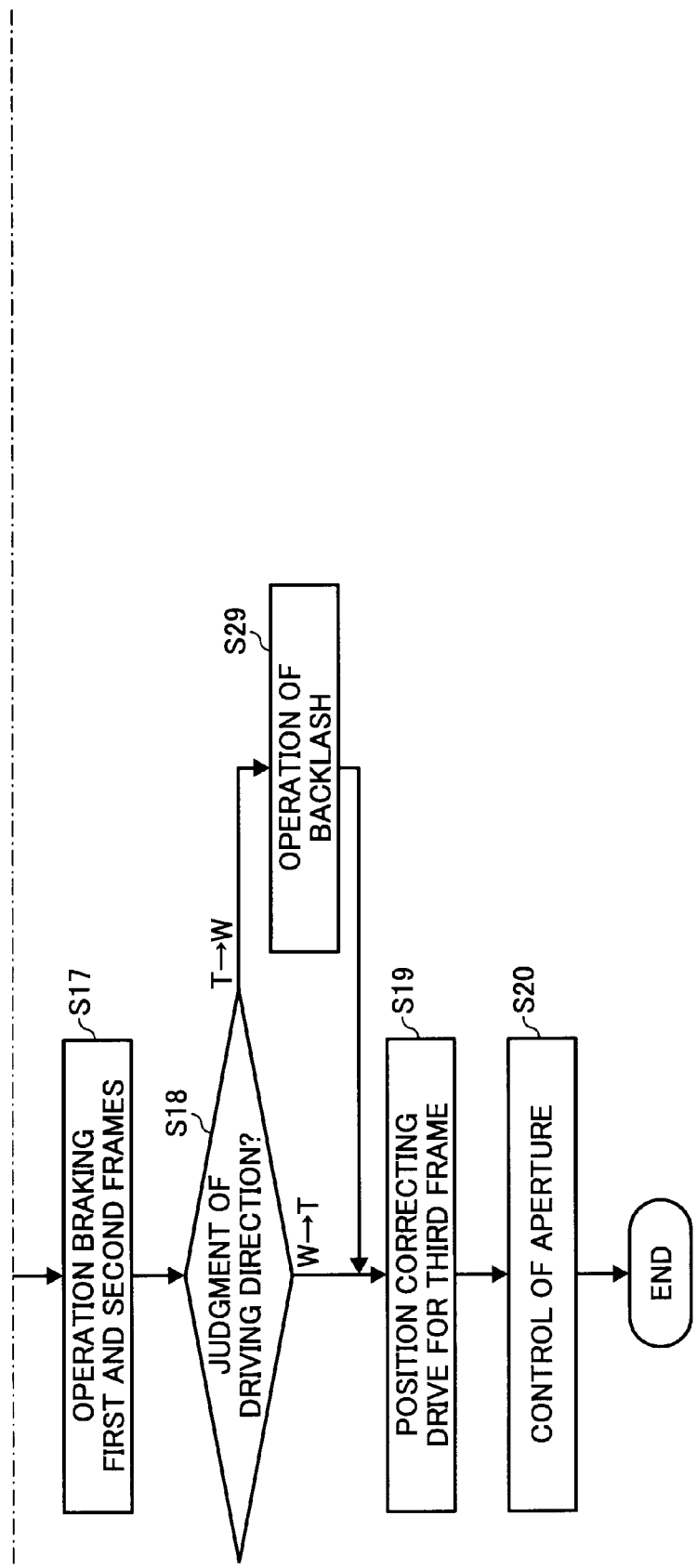

A sequence for operating a changing magnification is described with reference to a flow chart shown in FIG. 26.

When a changing magnification process is initiated by operating a zoom lever, zoom button or the like, whether it is necessary to retire the fourth lens group 14 is determined (step S11). It is determined in the step S11 that the retire process for the fourth lens group is required if the fourth lens group 14 is disposed in a nearer position than a predetermined position in the changing magnification process from the telephoto to the wide angle. Next, a direction of drive of the changing magnification is determined (step S12). If it is the changing magnification from the wide angle to the telephoto, the drive of the first and second lens groups 11 and 12 is initiated by operating the first and second frames DC motor 503 (step S13).

Next, whether the first and second lens groups 11 and 12 are stopped is determined (step S14). It is determined in the step S14 that the first and second lens groups 11 and 12 are stopped in a case satisfying either one of conditions in which if a zoom driving switch operated by changing magnification manipulation through the zoom lever or zoom button or the like becomes off, if the first and second lens groups reach a position in front of a predetermined amount from the telephoto position in the drive from the wide angle to the telephoto, and if the first and second lens groups reach a position in front of a predetermined amount from the wide angle position in the drive from the telephoto to the wide angle.

If the first and second lens groups 11 and 12 are stopped, whether the third lens group 13 is driving is determined (step S15), if the third lens group 13 is stopping, the stopping operation of the first and second lens groups 11 and 12 is executed (step S116) and the breaking operation of the first and second lens groups 11 and 12 is executed (step S17). Subsequently, the driving direction of the changing magnification is determined (step S18), if it is the changing magnification from the wide angle to the telephoto, drive for correcting a position of the third lens group 13 is achieved (step S119), the drive of the aperture is executed (step S20), and the process is completed and returned from the step S20 to a process waiting state.

In the step S11, if it is determined that the retire process of the fourth lens group 14 is required, the retire process of the fourth lens group 14 is executed (step S21), and the process is shifted from the step S21 to the step S12. In the step S12, if it is determined the changing magnification driving direction is the changing magnification from the telephoto to the wide angle, the retire process of the third lens group 13 is executed (step S22), the process is shifted from the step S22 to the step S14.

In the step S14, if it is determined that the first and second lens groups 11 and 12 continue to drive without stopping them, whether the third lens group 13 is driving is determined (step S23), if the third lens group 13 is stopping, whether the drive of the third lens group 13 is initiated is determined (step S24).

It is determined in the step S 24 that the drive of the third lens group 13 is permitted in a case satisfying one of conditions in which if the first and second lens groups 11 and 12 are driven more than the specified driven amount after the initiation of the drive of the first and second lens groups, if the position of the third lens group 13 is away a predetermined amount or more from the position of the first and second lens groups 11 and 12 when the first and second lens groups pass a predetermined zooming point in the driving state that the third lens group 13 is re-driven from the wide angle to the telephoto, and if the position of the third lens group 13 is approaching a predetermined amount or more to the position of the first and second lens groups 11 and 12 when the first and second lens groups pass a predetermined zooming point in the driving state that the third lens group 13 is re-driven from the telephoto to the wide angle.

In the step S24, if the drive of the third lens group 13 is permitted, the drive of the third lens group is initiated (step S25), the process is returned from the step S25 to the step S14. In the step S 24, if the drive of the third lens group 13 is not permitted, the process is returned from the step S24 to the step S14 directly.

In the step S23, if it is determined that the third lens group 13 is driving, whether the drive of the third lens group 13 is stopped is determined (step S 26). It is determined in the step S 26 that the third lens group 13 is permitted in a case satisfying one of conditions in which if the position of the third lens group 13 approaches a predetermined amount or more to the position of the first and second lens groups 11 and 12 in the drive from the wide angle to the telephoto, and if the position of the third lens group 13 is away a predetermined or more from the position of the first and second lens groups 11 and 12 in the drive from the telephoto to the wide angle.

In the step S26, if the stop of the third lens group 13 is permitted, the stop of the third lens group is initiated (step S27), the process is returned from the step S27 to the step S14. In the step S26, if the stop of the third lens group 13 is not permitted, the process is returned the step S26 to the step S14 directly.

In the step S15, if it is determined that the third lens group 13 is driving, the stop of the third lens group 13 is initiated (step S 28), the process is shifted from the step S28 to the step S16. In the step S18, if it is determined that the changing magnification driving direction is the changing magnification from the telephoto to the wide angle, a backlash operation is executed (step S29), the process is shifted from the step S29 to the step S119.

Next, a changing magnification operation depending on the flow chart is explained every the direction of changing magnification in detail.

[From Wide Angle to Telephoto]

Figure 27:
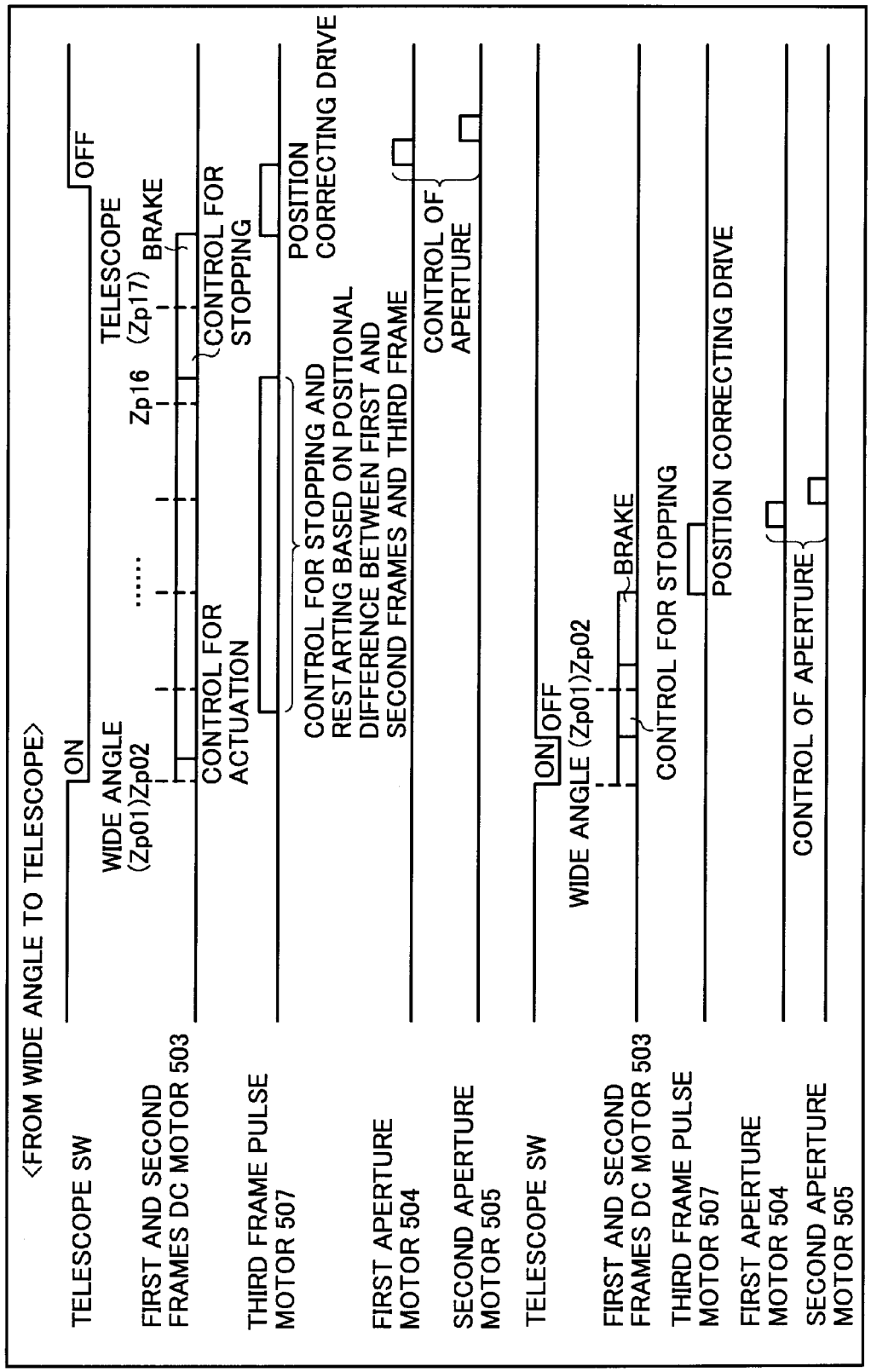
FIG. 27 is a timing chart showing a zoom sequence when the zoom is adjusted from a wide angle position to a telephoto position.

First, a changing magnification operation from the wide angle to the telephoto is explained referring to the timing chart shown in FIG. 27.

By pressing down the zoom button, which is in a telephoto mode, the telephoto switch signal changes from H to L, a variable sequence to the telephoto direction is initiated. Initially, a retire determination of the fourth lens group 14 is executed (step S11).

As described above, in the retire determination of the fourth lens group 14, the fourth lens group is retired only if the following conditions are satisfied simultaneously (And).

(1) Changing magnification drive from telephoto to the wide angle.

(2) The fourth lens group 14 is positioned in a nearer position to the subject or drawing out position away from a predetermined position or retired threshold position.

However, because the above-mentioned conditions are not satisfied in the drive from the wide angle to the telephoto, the fourth lens group 14 is not retired.

Next, the driving direction, whether the third lens group 13 is retired is determined (step S12). In the case of the changing magnification drive from the wide angle to the telephoto, the retiring drive of the third lens group 13 is not required. The drive of the first and second lens groups 11 and 12 is initiated through the first and second frames DC motor 503 (step S13).

In an actuating period right after the initiation of actuation of the first and second frames DC motor 503, the drive voltage is set to be lower than the stationary voltage in order to prevent an incoming current by the first and second group DC motor. After the actuating period is lapsed, the drive voltage is increased to the stationary voltage. The drive voltage between the wide angle and the telephoto is set to be lower than that between the collapsed position and wide angle position. This is reason a higher speed is required between the stored and wide angle positions, hence a higher voltage is set and a suitable voltage setting is made between the wide angle and the telephoto to allow the first and second frames DC motor 503 to stop at a desired position by operation of the zoom button.

The control of the moved amount of the first and second lens groups 11 and 12 is achieved by counting the pulse-like signal or PI signal by the first and second frames photo-interrupter 509. The zooming points each of which is a control reference position are set in 17 points in which a distance between the wide angle and the telephoto is divided into 16 equally.

Next, whether the first and second lens groups 11 and 12 are stopped is determined (step S14). In the determination for stopping the drive of the first and second lens groups 11 and 12, if either one of the following conditions is satisfied (OR), a stopping process is executed.

(1) A telephoto zooming drive switch operated by the changing magnification operation through the zoom lever or zoom button or the like is turned off, in other words, changed from L to H.

(2) The first and second lens groups reach a position in front of the telephoto position when driving from the wide angle to the telephoto.

During the first and second lens groups 11 and 12 continue to drive, the determination of driving initiation/driving stop of the third lens group 13 is executed in response to the status (during driving or stopping) of the third lens group 13 (step S23). If the third lens group 13 is stopping, the determination of drive initiation of the third lens group 13 is executed (step S24), if the initiation is permitted, the drive of the third lens group 13 is initiated. In the step S24, the drive of the third lens group 13 is initiated if either one of the following conditions is satisfied.

(1) The first and second lens groups 11 and 12 are driven the specified driven amount or more after the initiation of the drive of the first and second lens groups.

(2) During the third lens group 13 is re-driving in the drive from the wide angle to the telephoto, the position of the third lens group 13 is away by a predetermined amount from the position of the first and second lens groups 11 and 12 when the first and second lens groups 11 and 12 pass a predetermined zooming point.

Moreover, if the third lens group is driving, whether the third lens group 13 is stopped is determined (step S26), if the stop is permitted, the drive of the third lens group 13 is stopped. In the determination whether the third lens group 13 is stopped, the third lens group 13 is stopped if the following condition is satisfied.

The position of the third lens group 13 is positioned close than the predetermine amount to the position of the first and second lens groups 11 and 12 in the drive from the wide angle to the telephoto.

That is to say, the first and second lens group 11 and 12 are actuated, if the driven amount of the first and second lens groups 11 and 12 becomes the specified pulse or more, the drive of the third lens group 13 is initiated. During simultaneous drive of the first, second and third lens groups, if the position of the third lens group 13 approaches by the predetermined amount to the position of the first and second lens groups 11 and 12, the drive of the third lens group 13 is stopped. Thereafter, the first and second lens groups 11 and 12 are away from the third lens group 13, if they are away from the third lens group 13 by a predetermined amount, the drive of the third lens group 13 is re-started.

The drive and stop of the third lens group 13 are repeated in response to a positional relationship among the first and second lens groups 11 and 12, and the third lens group 13. Thereby, it is possible to achieve the changing magnification drive while maintaining a distance among the first, second, and third lens groups 11, 12 and 13.

When actuating these lens groups, the influence of the incoming current can be avoided by initiating the drive of the third lens group 13 after the drive of the specified amount or more is carried out, therefore the current consumption is reduced.

If the telephoto switch signal changes from L to H before the initiation of the initial drive of the third lens group 13, the stop of the first and second lens groups 11 and 12 is controlled without the simultaneous drive of the third lens group 13 therewith. If the first and second lens groups 11 and 12 are stopped after the stop of them is determined, if the third lens group 13 is driving, the stop operation of the third lens group 13 is initiated. The stop of the first and second lens groups 11 and 12 is also initiated. During the stop operation of the first and second lens groups 11 and 12, a lower speed control period is set, and the drive voltage of the first and second frames DC motor 503 is lowered depending on a residual pulse number to a target position.

Thereby, the overrun amount of the first and second lens groups when reaching the target position is decreased. If the first and second lens groups reach the target position by counting the PI signal by the first and second frames photo-interrupter 509, a breaking operation is executed in order to stop the drive of the first and second lens groups 11 and 12. A final position of the first and second lens groups 11 and 12 is decided by further counting the overrun amount during the period of breaking.

After the first and second lens groups 11 and 12 are stopped, a correction drive for the position of the third lens group 13 is executed. This is configured to compute the stopping position of the third lens group 13 corresponding to the final stopping position of the first and second lens groups 11 and 12 and drive the third lens group 13 to the stopping position. A target stopping position of the third lens group 13 corresponding to the stopping position of the first and second lens groups 11 and 12 is interpolatively computed from the positional information of the first and second lens groups every the zooming point and the positional information of the third lens group 13 every the zooming point. Thereafter, the drive of the aperture is achieved to set a position of the aperture corresponding to the stopped zooming position of the third lens group 13 (step S20).

[From the Telephoto to the Wide Angle]

Next, a changing magnification operation from the telephoto to the wide angle is described with reference to the timing chart shown in FIG. 28.

By pressing down the zoom button, which is in a wide angular mode, the wide angular switch signal changes from H to L, a variable sequence with respect to the wide angular direction is initiated. Initially, a retire determination of the fourth lens group 14 is executed (step S11).

As described above, in the retire determination of the fourth lens group 14, the fourth lens group is retired only if the following conditions are satisfied simultaneously (And).

(1) Changing magnification drive from telephoto to the wide angle.

(2) The fourth lens group 14 is positioned in a closer position to the subject or drawing out position away from a predetermined position or retired threshold position.

If the position of the fourth lens group 14 is in the nearer position than the predetermined position when driving from the telephoto to the wide angle. The retired amount is set to a range in which the third lens group 13 does not interfere with the fourth lens group 14 in the variable operation of the third lens group 13.

Next, the third lens group 13 is retired. In order to prevent the interference of the third lens group with the first and second lens groups 11 and 12 depending on the drive of the first and second lens groups 11 and 12, the third lens group 13 is driven previously by the specified amount. The drive of the first and second lens groups 11 and 12 is then initiated through the first and second frames DC motor 503.

As described above, in the actuating period right after the initiation of actuation of the first and second frames DC motor 503, the drive voltage is set to be lower than the stationary voltage in order to prevent the incoming current by the first and second group DC motor. After the actuating period is lapsed, the drive voltage is increased to the stationary voltage.

The control of the moved amount of the first and second lens groups 11 and 12 is achieved by counting the pulse-like signal or PI signal by the first and second frames photo-interrupter 509. As described above, the zooming points each of which is a control reference position are set in 17 points in which a distance between the wide angle and the telephoto is divided into 16 equally.

In the determination for stopping the drive of the first and second lens groups 11 and 12, if either one of the following conditions is satisfied (OR), the stopping process is executed, as described above.

(1) A telephoto zooming drive switch operated by the changing magnification operation through the zoom lever or zoom button or the like is turned off, in other words, changed from L to H.

(2) The first and second lens groups 11 and 12 reach a position in front of the telephoto position when driving from the telephoto to the wide angle.

During the first and second lens groups 11 and 12 continue to drive, the determination of driving initiation/driving stop of the third lens group 13 is executed in response to the status (during driving or stopping) of the third lens group 13. If the third lens group 13 is stopping, the determination for the initiation of drive of the third lens group 13 is executed, if the initiation is permitted, the drive of the third lens group 13 is initiated. In the determination for initiating the drive of the third lens group 13, the drive of the third lens group 13 is initiated if either one of the following conditions is satisfied.

(1) The first and second lens groups 11 and 12 are driven the specified driven amount or more after the initiation of the drive of the first and second lens groups 11 and 12.

(2) During the third lens group 13 is re-driving in the drive from the telephoto to the wide angle, the position of the third lens group 13 approaches by a predetermined amount to the position of the first and second lens groups 11 and 12 when the first and second lens groups 11 and 12 pass a predetermined zooming point.

Moreover, if the third lens group 13 is driving, the determination for stopping the drive of the third lens group 13 is executed, if the stop is permitted, the drive of the third lens group 13 is stopped. In the determination whether the third lens group 13 is stopped, the third lens group 13 is stopped if the following condition is satisfied.

The position of the third lens group 13 is away the predetermine amount or more from the position of the first and second lens groups 11 and 12 in the drive from the telephoto to the wide angle.

That is to say, the first and second lens group 11 and 12 are actuated, if the driven amount of the first and second lens groups 11 and 12 becomes the specified amount or more, the drive of the third lens group 13 is initiated. During simultaneous drive of the first, second and third lens groups 11, 12 and 13, if the position of the third lens group 13 is away the predetermined amount from the position of the first and second lens groups 11 and 12, the drive of the third lens group 13 is stopped. Thereafter, the first and second lens groups 11 and 12 approach to the third lens group 13, if they approach to the third lens group 13 the specified amount or more, the drive of the third lens group 13 is re-started.

The drive and stop of the third lens group 13 are repeated in response to a positional relationship among the first and second lens groups 11 and 12, and the third lens group 13. Thereby, it is possible to achieve the changing magnification drive while maintaining a distance among the first, second, and third lens groups 11, 12, and 13.

In actuating these lens groups, the influence of the incoming current of the first and second frames DC motor 503 can be avoided by initiating the drive of the third lens group 13 after the specified pulse or more is counted, therefore the current consumption is reduced.

When the third lens group 13 is driven to the wide angular direction, during the drive of the first and second lens groups 11 and 12, basically a control for eliminating a backlash in the movement of the third lens group 13 is required when it is stopped, but the control is not carried out during the changing magnification operation to accomplish a smooth movement of the third lens group.

If the wide angular switch signal changes from L to H before the initiation of the initial drive of the third lens group 13, the stop of the first and second lens groups 11 and 12 is controlled without the simultaneous drive of the third lens group 13 therewith. If the first and second lens groups 11 and 12 are stopped after the stop of them is determined, if the third lens group 13 is driving, the stop operation of the third lens group 13 is initiated. The stop of the first and second lens groups 11 and 12 is also initiated. During the stop operation of the first and second lens groups 11 and 12, a lower speed control period is set, and the drive voltage of the first and second frames DC motor 503 is lowered depending on a residual pulse number to a target position.

Thereby, the overrun amount of the first and second lens groups when reaching the target position is decreased. If the first and second lens groups reach the target position by counting the PI signal by the first and second frames photo-interrupter 509, a breaking operation is executed in order to stop the drive of the first and second lens groups 11 and 12. A final position of the first and second lens groups 11 and 12 is decided by further counting the overrun amount during the period of breaking.

Furthermore, a control for eliminating a backlash of the first and second lens groups 11 and 12 is executed in the movement from the telephoto to the wide angle thereof.

After the first and second lens groups 11 and 12 are stopped, a correction drive for the position of the third lens group 13 is executed. This is configured to compute the stopping position of the third lens group 13 corresponding to the final stopping position of the first and second lens groups 11 and 12 and drive the third lens group 13 to the stopping position. A target stopping position of the third lens group 13 corresponding to the stopping position of the first and second lens groups 11 and 12 is interpolatively computed from the positional information of the first and second lens groups every the zooming point and the positional information of the third lens group 13 every the zooming point. In the drive in the wide angular direction of the third lens group 13, the control for eliminating the backlash of the third lens group 13 is executed after it is stopped. Thereafter, the drive of the aperture is achieved so that the aperture is disposed in a position corresponding to the stopped zooming position of the third lens group 13.

In this example, the drive voltage of the first and second frames DC motor 503 when it is driven in the wide angular direction is set to be higher than that in the telephoto direction in the changing magnification operation between the wide angle and the telephoto. The pulse rate of the third frame pulse motor 507 in the wide angular direction is set to be faster than that in the telephoto direction. An intermittent control for the third lens group 13 is accomplished based on the positional relationship among the first, second, and third lens groups 11, 12, and 13 in order to maintain the distance among the first, second, and third lens groups 11, 12, and 13. Therefore, the drive speed of the third lens group 13 is set to be the same as or faster than the drive speed of the first and second lens groups 11 and 12, in the movement in the telephoto direction.

Similarly, the drive speed of the third lens group 13 is set to be the same as or faster than the drive speed of the first and second lens groups 11 and 12, in the movement in the wide angular direction. With such a structure, the third lens group 13 is driven so that the third lens group 13 is not away a predetermined amount or more from the first and second lens groups 11 and 12 in the movement in the telephoto direction, and does not contact with the first and second lens groups 11 and 12 in the movement in the wide angular direction.

Moreover, although the driving re-start timing of the third lens group 13 is set at the time of passing the predetermined zooming point in this example, the timing may be set every the time of detecting the pulse-like signal or PI signal by the first and second frames photo-interrupter 509 generating in driving the first and second lens groups 11 and 12, or every a predetermined count number of the PI signal.

Thereby, it is possible to accomplish a further fine intermittent control of the third lens group 13 and improve accuracy of the distance among the first, second and third lens groups.

In the above-mentioned embodiments, the structure in which the third lens group 13 can be retracted out the lens cylinder unit transverse to the optical axis X has been described. In this structure, the retracted third lens group has the minimum outer diameter. When the third lens group having the minimum outer diameter is retracted, a projective size of the lens barrel in which the third lens group is retracted can be minimized efficiently, and the thickness of the lens barrel can be reduced.

Moreover, when the retracted lens is extended out of the fixed frame, a size of the device (lead screw and so on) for driving the retired lens group or the third lens group is minimized by taking a structure such that the retracted lens is not way from the imaging plane possibly.

Furthermore, the lens retaining frame of the third lens group 13 or the third lens group 13 itself is larger than the lens retaining frames of the other lens groups 11, 12, 14 or the other lens groups 11, 12, 14 in length along the optical axis X, in other words, thickness.

When the thickness of the third lens group 13 is larger than that of the other lens groups 11, 12, and 14, consequently, the thickness of the other lens groups decreases, therefore, the thickness of the lens barrel can be reduced when the lens barrel is in the collapsible position.

As a result, the thickness of the lens barrel or a size in the direction of the optical axis of the lens barrel is minimized.

Because the retract lens group or the third lens group 13 is disposed behind and adjacent the shutter having the aperture function, the diameter of the lens barrel is less, and the retraction of the third lens group is simplified without considering the interference of the shutter with the lens group unit and separating the position of the shutter from the lens cylinder unit, excessively.

Next, a structure of the plurality of lens groups is explained in further detail.

The first lens group 11 has a positive power, the second lens group 12 has a negative power, the third lens group 13 has a positive power, and the fourth lens group 14 has a positive power. A changing magnification operation is achieved by changing at least one of intervals between the first and second lens groups 11 and 12, between the second and third lens groups 12 and 13, and between the third and fourth lens groups 13 and 14. A focusing operation is achieved by moving the fourth lens group 14 along the optical axis X.

The shutter/aperture unit 15 is disposed between the second lens group 12 and the third lens group 13. In other words, the shutter having the function of the aperture is positioned in front of the third lens group 13. The four lens groups are provided in the lens cylinder unit. Because the third lens group having the minimum outer diameter is retracted out of the lens cylinder unit without separating from the image plane excessively, the retraction of the third lens group 13 can be accomplished with the minimum movement and the outer diameter of the lens barrel can be minimized. In addition, the thickness of the lens barrel is decreased by retraction of at least one lens group.

Furthermore, it is possible to provide a compact lens barrel having a high changing magnification ratio, 4 times or more.

Meanwhile, the lens groups may be structured from a first lens group having a positive power, a second lens group having a negative power, and a third lens group having a positive power, and the third lens group may be retracted.

Alternatively, the lens groups may be structured by a first lens group having a negative power, a second lens group having a positive power, and a third lens group having a positive power, and the second lens group or the third lens group may be retracted.

Each of the lens groups may be structured from one or more lenses, and the lens groups herein indicate integral one or more lenses. Therefore, all the lens groups may be structured by one lens, respectively.

Referring now to FIG. 17A to FIG. 19, a camera including an optical system device having the lens barrel according to the present invention as shown in the first embodiment will be described.

Although the lens barrel is applied to the camera here, the lens barrel is also used to a portable information terminal such as so-called PDA (Personal Data Assistant) or a mobile phone, having a camera function or functional part installed therein.

Many of such portable information terminals have the function and the structure substantially identical to the function and the structure of the camera, although the appearance is slightly different, and hence the optical system device including the lens barrel according to the present invention may be employed in such mobile information terminals. Further, the lens barrel according to the present invention may be applied to an imaging device such as a copying machine, a scanner or the like.

Figure 17A:
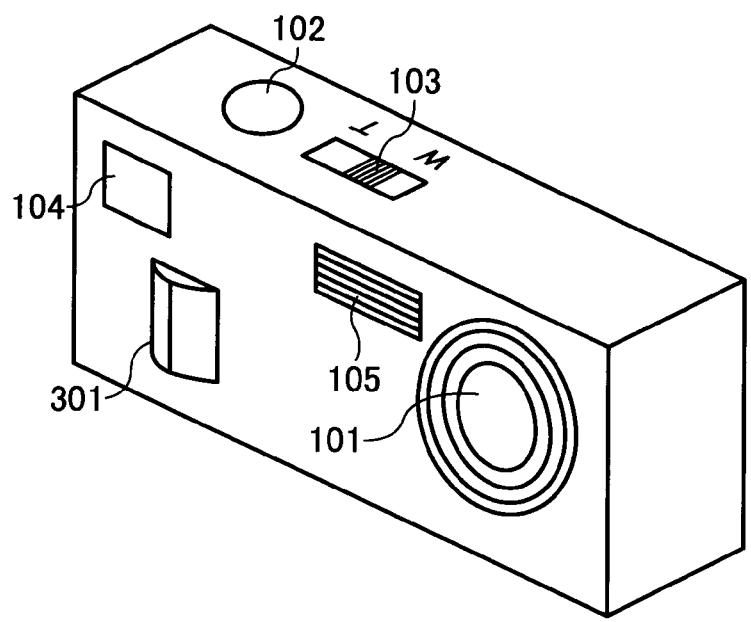
Figure 17B:
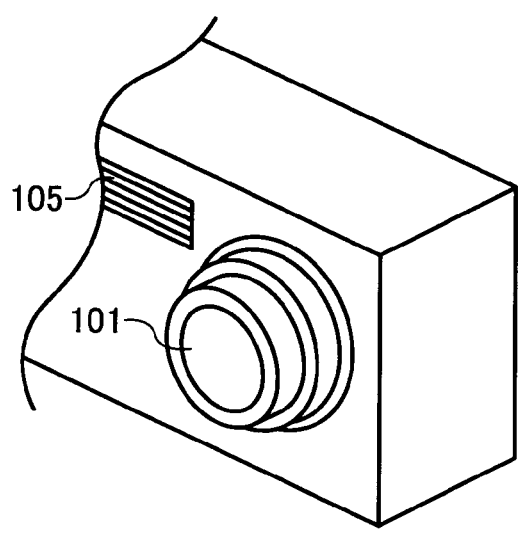
Figure 18:
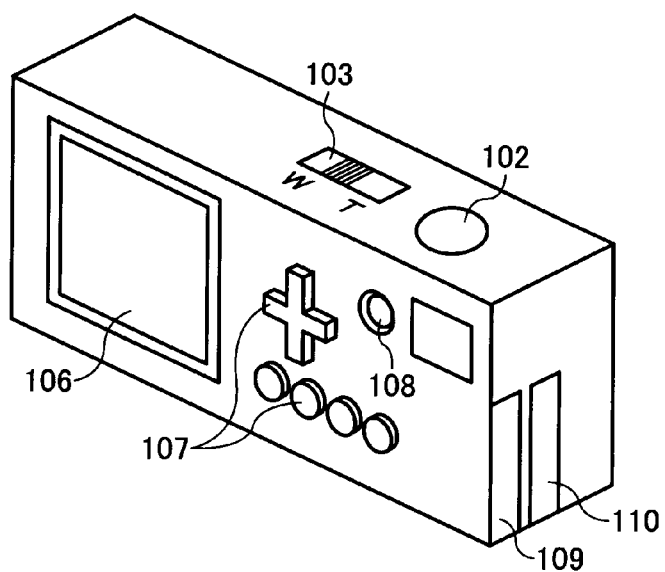
FIG. 18 is a perspective view schematically showing the exterior appearance and structure of the camera of FIGS. 17A and 17B as viewed from a user.

As shown in FIGS. 17A, 17B and 18, the camera includes an image pickup lens 101, a shutter button 102, a zoom lever 103, a finder 104, a strobe light 105, a liquid crystal display (=LCD) 106, an operating button 107, a power switch 108, a memory card slot 109, an expansion card slot 110, the barrier-operating element 301 and so on.

Figure 19:
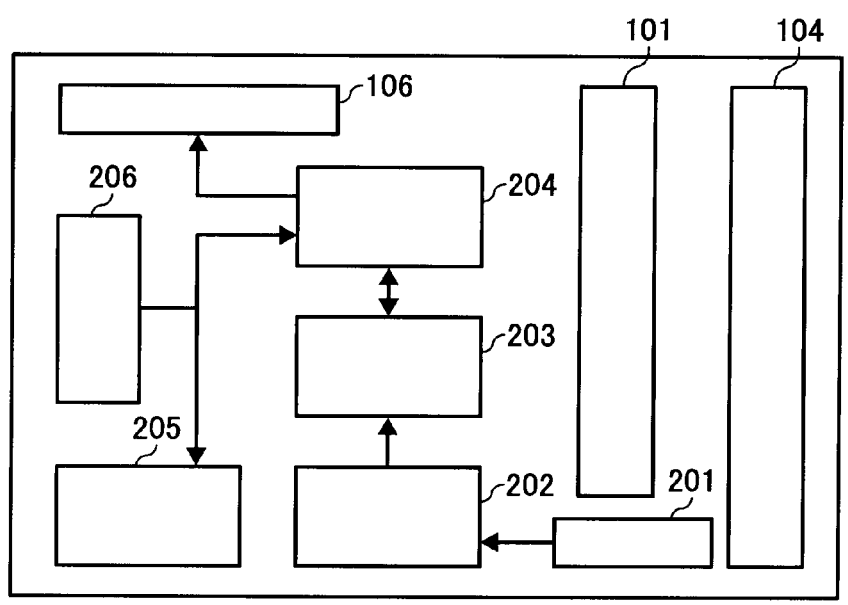
FIG. 19 is a block diagram schematically showing a functional structure of the camera of FIGS. 17A and 17B.

Furthermore, as shown in FIG. 19, the camera also includes a photodetector 201, a signal-processing unit 202, an image-processing unit 203, a central processing unit (CPU) 204, a semiconductor memory 205, and an expansion card 206. Although it is not shown clearly, electric power is supplied from a battery as an electric source to the above-mentioned parts to operate the parts.

The photodetector 201 serves as an area sensor such as a CCD (charge coupled device) image pickup element or the like to read an image of a subject to be photographed, that is, of an photographing subject, formed by the image pickup lens 101, which is a photographing optical system. As the image pickup lens 101, the optical system device including the lens barrel according to the present invention as described in the first embodiment is employed.

More specifically, the optical system device includes a plurality lens groups as optical elements and a telescopic cylinder unit retaining the lens groups, which constitute the lens barrel.

The lens barrel has a mechanism of retaining the respective lens groups in the lens cylinder such that the lens groups can be moved in response to the movement of the lens cylinder along the optical axis of the lens groups, similarly to the above-mentioned embodiment. The image pickup lens 101 to be integrated in the camera is generally integrated in the form of this optical system device.

An output from the photodetector 201 is processed by the signal-processing unit 202, which is controlled by the central processing unit 204, and is converted into digital image information. The image information digitized by the signal-processing unit 202 is subjected to a predetermined image processing in the image-processing unit 203 which is also controlled by the central processing unit 204, and then stored in the semiconductor memory 205 such as a non-volatile memory.

In this case, the semiconductor memory 205 may be a memory card inserted in the memory card slot 109, or may be a semiconductor memory integrated in a body of the camera. The liquid crystal display (=LCD) 106 may display the photographing image or may display the image stored in the semiconductor memory 205. An image stored in the semiconductor memory 205 can be transmitted to the outside of the camera via the expansion card 206 inserted in the expansion card slot 110. Meanwhile, the above-mentioned central processing unit (CPU) 501 shown in FIG. 21 to control the drive of the lens groups may be included in the central processing unit 204, otherwise structured by use of other micro-processor connecting with the unit 501.

The image pickup lens 101 is embedded within the camera body into a collapsed or stored state as shown in FIG. 17 A when being transported, and the lens barrier 62 is also into a closed state. When a user operates the barrier-operating element 301 and opens the lens barrier 62, the power is turned on and the lens barrel is moved from the closed position to an opened position and projected from the camera body as shown in FIG. 17 B, so that the photographing state is established. At this time, the image pickup lens 101 within the lens barrel is set so that the respective lens groups of the optical systems constituting a zoom lens are arranged, for example, at a short focal length wide angle position.

When the zoom lever 103 is operated, the arrangement of the respective lens groups in the optical system is changed through the movement of the lens groups along the optical axis, therefore, the zoom can be varied to the telephoto position.

Preferably, an optical system of the finder 104 is configured such that the zooming is varied in association with the change of the angle of field of the image pickup lens 101.

In many cases, focusing is achieved by half-pressing operation of the shutter button 102. The focusing with the zoom lens in the lens barrel according to the present invention is achieved mainly by moving the fourth lens group 14. When the shutter button 102 is further pressed to a completely pressed state, the photographing is achieved, and subsequently the processing as described above is performed.

In order to display the image stored in the semiconductor memory 205 on the liquid crystal display (=LCD) 106 or transmit the same to the outside of the camera via the expansion card 206, the operating button 107 is operated in a predetermined manner. The semiconductor memory 205 and the communication card 206 or the like are used by being inserted in a specific or multi-purpose slot such as the memory card slot 109 and the communication car slot 110.

When the image pickup lens 101 is in the stored state, the third lens group 13 is retracted out of the optical axis, and hence is stored in a line with the first lens group 11 and the second lens group 12 in a juxtaposed manner. Therefore, further reduction in thickness of the camera is achieved.

Generally, because a finder mechanism is disposed above of the lens barrel, therefore, certain camera operation is easy. Moreover, if the lens barrel includes a zoom changing magnification mechanism, because the finder mechanism also needs the zoom changing magnification mechanism, it is preferable that a drive source (DC motor, pulse motor or the like) for conducting the zoom changing magnification operation and a transmission mechanism (gear connecting mechanism or the like) for transferring a driving force of the drive source to the lens groups are disposed adjacent the finder mechanism. For example, if the finder mechanism is disposed on upper and left position of the lens barrel, the drive source and the transmission mechanism are disposed adjacent the upper and left position of the lens barrel to use a limited space effectively.

Next, the frame 31 for the retractable lens group or third lens group 13 is retracted, the retaining frame is stored below the lens barrel in consideration of the left space. The space is lower and right position or lower and left position of the lens barrel. In the embodiment, the space is disposed on the lower and right position of the lens barrel to store the retaining frame of the retracted third lens group. The above-mentioned storage part of the fixed lens cylinder is disposed at the position.

The drive source and the transmission mechanism for driving the lens groups are disposed at the lower and left position. As a result, a miniaturized lens barrel can be accomplished with effective use of fourth corners, the upper and left position, the upper and right position, the lower and right position, and the lower and left position of a usual circular lens barrel.

The above explains a detailed structure of the lens barrel according to the related art of the present invention.

Described below is an embodiment in accordance with the present invention.

The features of the present invention will be described with reference to FIG. 29A-FIG. 36

First, a structure of a third lens retention frame 31 is explained referring to FIGS. 29A-29C and FIGS. 30A-30E.

Figure 29A:
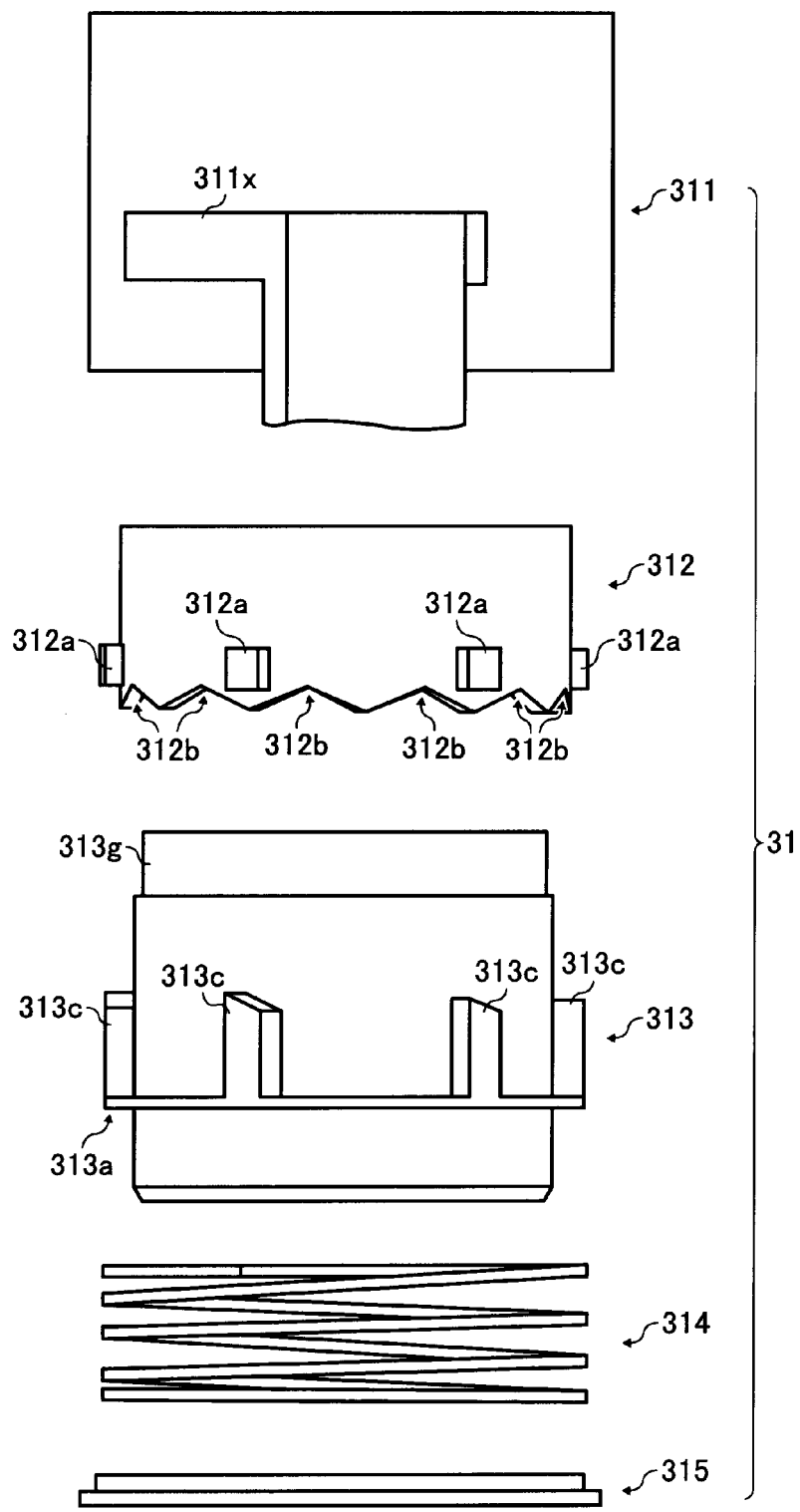
FIG. 29A is an exploded side view of a third lens retention frame in accordance with an embodiment of the invention.
Figure 29B:
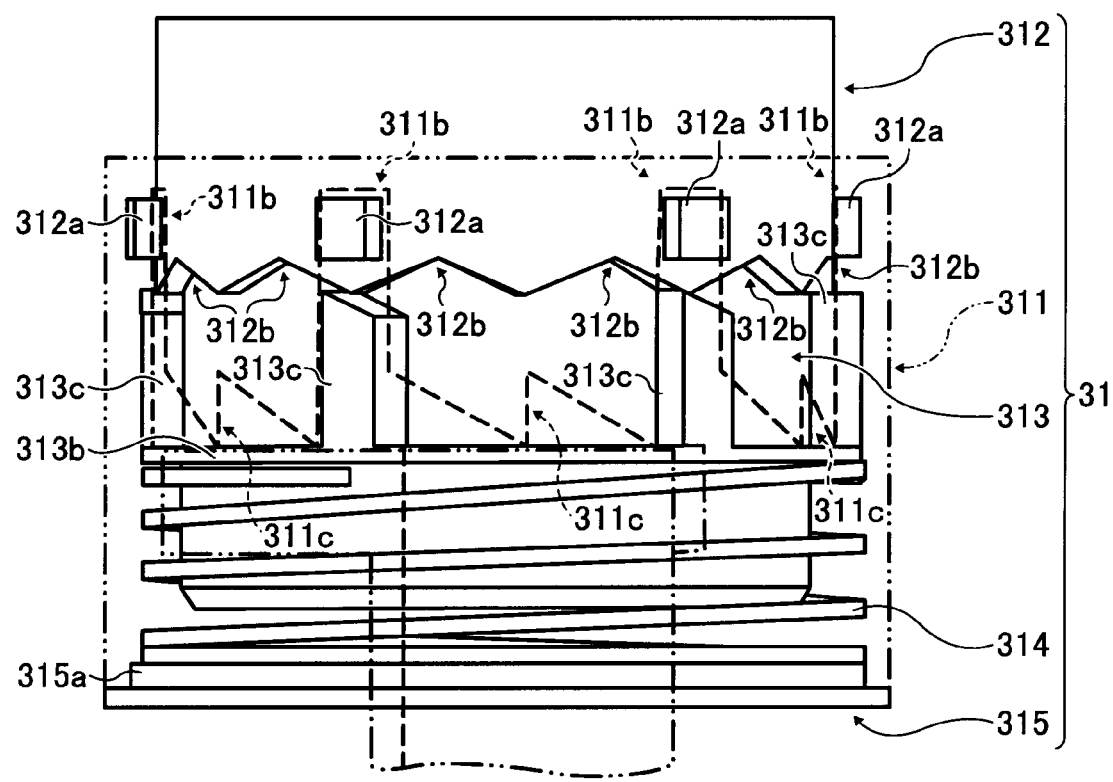
FIG. 29B is a side view of the third lens retention frame in accordance with the embodiment of the invention.

FIG. 29A is an exploded side view of the third lens retention frame 31, while FIG. 29B is a side view of the third lens retention frame 31.

In FIGS. 29A-29C and FIGS. 30A-30E, reference numeral 311 represents an outer frame; 312, a pusher; 313, a rotatable slider; 314, a spring; and 315, a stopper. Especially, FIG. 29B illustrates the outer frame 311 using two-point dotted lines, showing an inner structure of the third lens retention frame 31.

The third lens retention frame 31 of the embodiment includes the outer frame 311, the pusher 312, the rotatable slider 313, the spring 314 and the stopper 315.

Figure 29C:
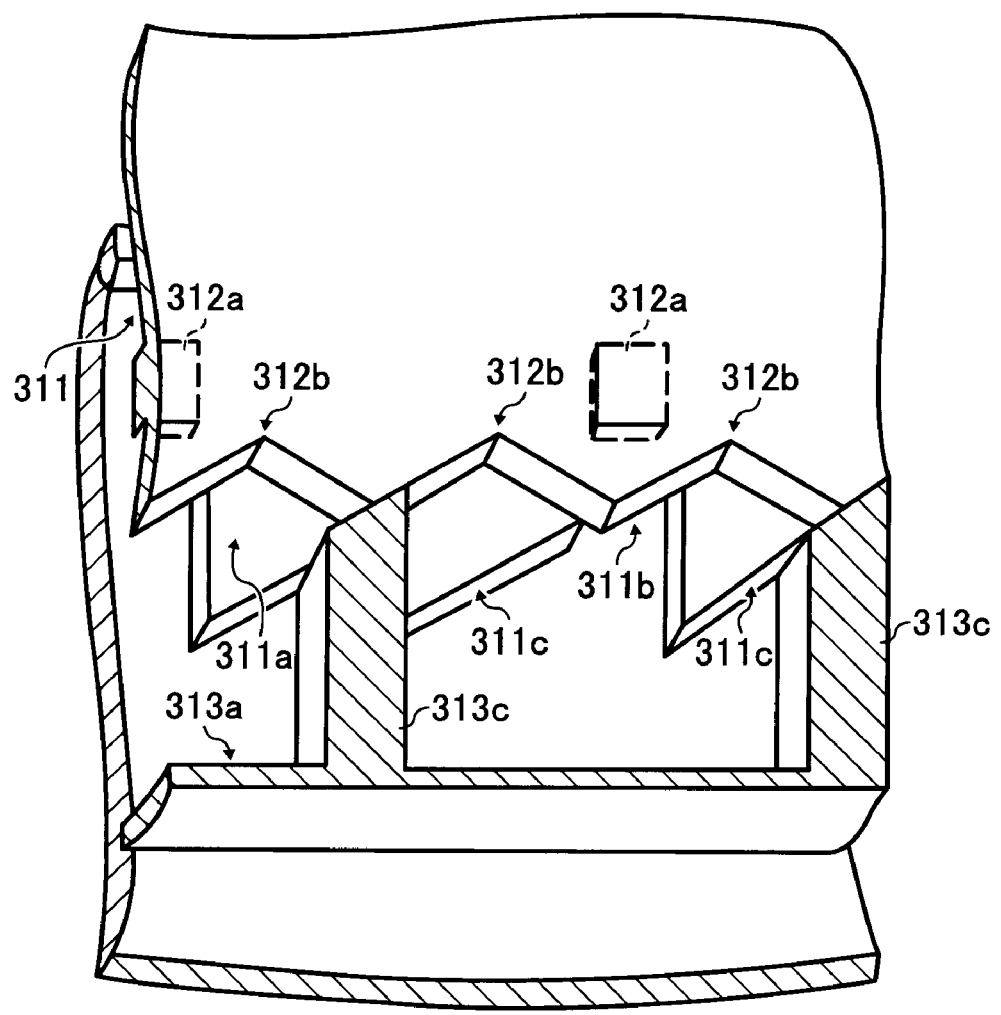
FIG. 29C is a partial perspective view of an engaged portion of an outer frame, a pusher, and a rotatable slider that constitute the third lens retention frame in accordance with the embodiment of the invention.

FIG. 29C is a partial perspective view of an engaged portion of the outer frame 311, the pusher 312, and the rotatable slider that constitute the third lens retention frame 31.

FIGS. 30A-30D are a two-face view of the outer frame 311, the pusher 312, the rotatable slider 313 and the stopper 315, respectively. With respect to FIGS. 30A and 30B, a part (a) is a side view and a part (b) is a front view seen from an image side in an optical axis direction. As for FIGS. 30C and 30D, a part (a) is a front view seen from a subject side in an optical axis direction and a part (b) is a side view.

Figure 30B:
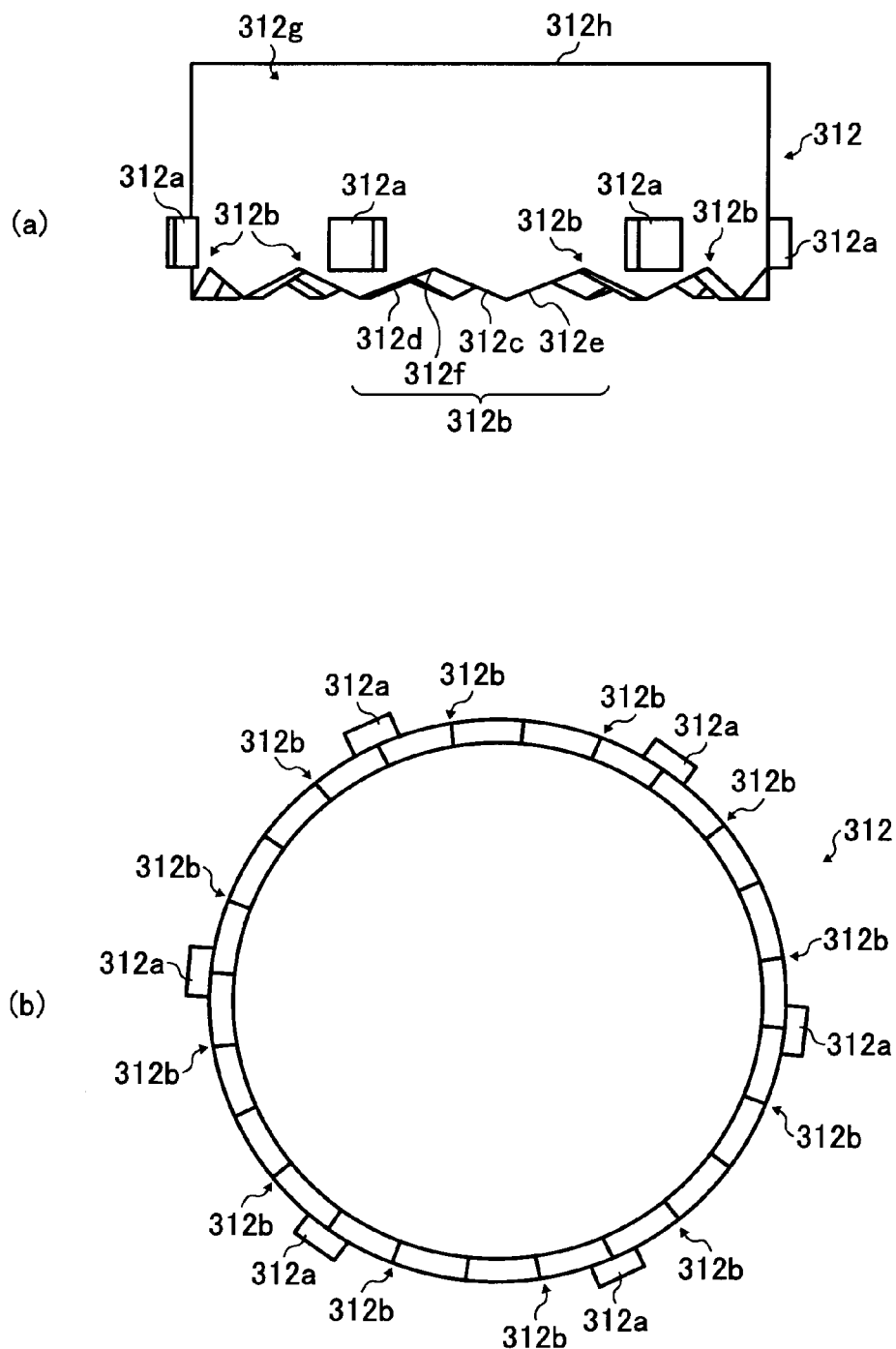
FIG. 30B is a two-face view of the pusher of the third lens retention frame in accordance with the embodiment of the invention.
Figure 30D:
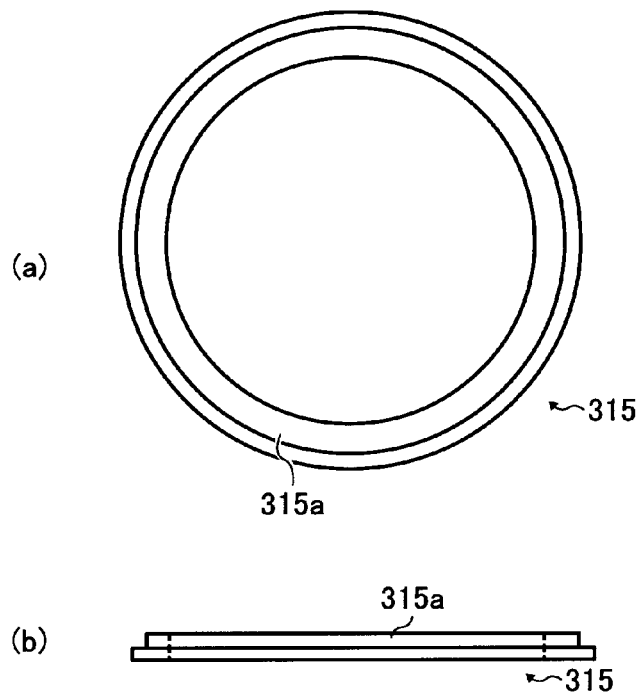
FIG. 30D is a two-face view of the stopper of the third lens retention frame in accordance with the embodiment of the invention.
Figure 30E:
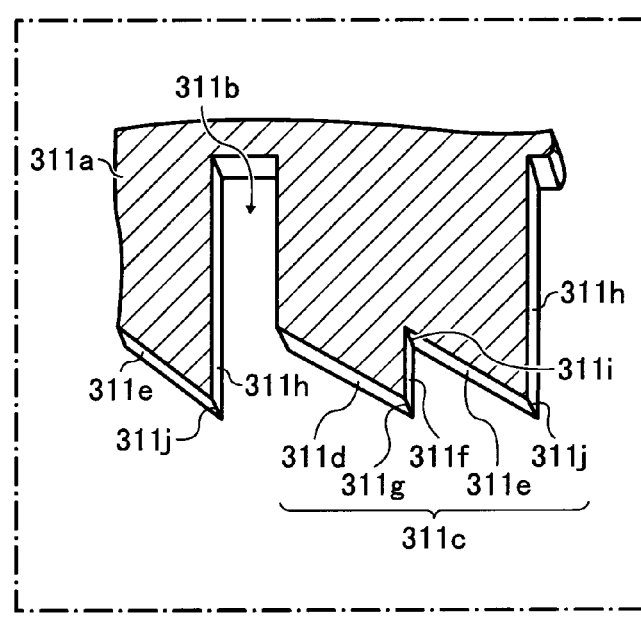
FIG. 30E is a partial perspective view of a guide portion formed on the outer frame of the third lens retention frame in accordance with the embodiment of the invention, and a partial sectional perspective view in which the portion A in (a) of FIG. 30A is cut off at an inner circumferential wall surface of the outer frame.

FIG. 30E is a partial perspective view of a guide portion 311a formed on the outer frame 311 of the third lens retention frame 31, which corresponds to a partial sectional view in which a portion A in the part (a) of FIG. 30A sectioned at a inner circumferential wall surface of the outer frame 311.

As shown in FIGS. 30A-30D, the outer frame 311, the pusher 312, the rotatable slider 313 are approximately of a cylinder, respectively, and the stopper ring 315 is approximately of a ring.

The outer circumference surface of the outer frame 311 includes an arm 311× for moving the third lens retention frame 31 between the retraction position and the position on the optical axis.

As shown in FIG. 29B, the pusher 312 is provided to be slidable on the inner circumference side of the outer frame 311, and moreover the rotatable slide 313 is provided to be slidable on the inner circumference side of the pusher 312.

As shown in FIG. 30A, a guide 311a is integrally formed directed inwardly in the radial direction on the inner circumference side of the outer frame 311. The guide 311 includes long comb-type fitting grooves 311b that are formed with an equal space therebetween in the optical axis direction.

As shown in FIG. 30E, when the outer frame 311 is seen from an image side in the optical axis direction, a face counter clockwise with respect to the comb-type fitting grooves 311b of the faces constituting the comb-type fitting grooves 311b is defined as a fitting groove stopper face 311h.

The end of the image side in the optical axis direction of the guide 311a includes contact portion 311c having a shape of sawtooth, formed circumferentially.

The end of the image side in the optical axis direction of the contact portion 311c includes contact surfaces 311d and 311e inclined with respect to the circumferential direction of the outer frame 311. A stopper surface 311f is provided along the optical axis direction between the contact surface 311d and the contact surface 311e.

Between the contact surface 311d and the stopper surface 311f, a protruding angle portion 311g is formed on the image side in the optical axis direction. Between the stopper surface 311f and the contact surface 311e, an indenting angle portion 311i is formed on the subject side in the optical axis direction. Between the contact surface 311e and the fitting groove stopper surface 311h, a protruding angle portion 311j is formed on the image side in the optical axis direction.

An end on the subject side in the optical axis direction of the outer frame 311 is defined a front end 311k.

As shown in FIG. 30B, a fitting protrusion 312a is provided for fitting the comb-type fitting groove 311b on the outer circumferential surface of the pusher 312. A fitting projection 312a fits in with the comb-like fitting groove 311b and moves along the comb-like fitting groove 311b, by which the pusher 312 can move to the optical axis direction with respect to the outer frame 311.

A contact portion 312b having a triangular wave shape is formed around the circumference at the end on the image side in the optical axis direction of the pusher 312.

The end on the image side in the optical axis direction of the contact portion 312b includes contact surfaces 312c and 312d inclined with respect to the circumference of the pusher 312. A protruding angle portion 312e on the image side in the optical axis direction and an indenting angle portion 312f on the subject side in the optical axis direction are formed between the contact surface 312c and the contact surface 312d.

The slope of the inclined plane of the contact surface 312c is the same as that of the contact surface 311d that belongs to the guide portion 311a of the outer frame 311. The slope of the inclined plane of the contact surface 312d is the inverse of that of the contact surface 312c.

The pitch of the triangular wave of the contact portion 312b is one half the interval between the two fitting protrusions 312a. The protruding angle portion 312e of the contact portion 312b is placed at a position deviated counterclockwise off an end position on the image side in the optical axis direction of a position in which the stopper surface 311f is formed, seen from the image side in the optical axis direction.

The end portion of the subject side in the optical axis direction of the pusher 312 is defined a front end portion 312g, and the end of the subject side in the optical axis direction of the pusher 312 is defined a front end 312h.

As shown in FIG. C, the outer circumference face of the rotatable slider 313 includes a guiding portion 311a of the outer frame and a guided portion 313a that engages with a contact portion 312b of the pusher 312. The guided portion 313a includes a stopper flange portion 313b, formed radially outward, and a comb-type fitting portion 313c, formed at regular intervals, extending to the subject side in the optical axis direction from the stopper flange portion 313b.

The comb-type fitting portion 313c is approximately rectangular. The interval between the comb-type fitting portions 313c is identical to that of the comb-type fitting grooves 311b that belongs to the guiding portion 311a of the outer frame 311.

The end on the subject side in the optical axis direction of the comb-type fitting portion 313c includes a contact surface 313d formed diagonally with respect to the circumferential direction of the rotatable slider 313. The slope of the contact surface 313d with respect to the circumferential direction is identical to that of the contact surface 312c that belongs to the contact surface 311d of the guiding portion 311a and the contact portion 312b of the pusher 312.

When the rotatable slider 313 is seen from the subject side in the optical axis direction, an end surface on the clockwise direction side of the comb-type fitting portion 313c is defined as a stopped surface 313e. The protruding angle portion 313f is formed between the stopped surface 313e and the contact surface 313d.

As described hereinbelow, when the stopped surface 313e is halted by the stopper surface 311f and the fitting groove stopper surface 311h owned by the guide portion 311a of the outer frame 311, the rotatable slider 313 is stopped rotating around the optical axis with respect to the outer frame 311.

As shown in FIG. 29C, the radial length of the comb-type fitting portion 313c is longer than the radial length of the guide portion 311a and the radial length of the contact portion 312b, so that the comb-type fitting portion 313c can simultaneously engage with both the guide portion 311a of the outer frame 311 and the contact portion 312b of the pusher 312.

An end on the subject side in the optical axis direction of the rotatable slider 313 is defined as a front end 313g. The third lens group 13 is fixed on the inner circumferential side of the front end 313g.

As shown in FIG. 30D, a ring-shaped fitting portion 315a is integrally formed on the stopper 315. The outer circumference surface of the fitting portion 315a fits in with the inner circumferential surface of the end on the image side in the optical axis direction of the outer frame 311. The stopper 315 is fixed at the outer frame 311.

As shown in FIG. 29B, the compressed spring 314 is inserted between the end on the image side in the optical axis direction of the stopper flange 313b that belongs to the guided portion 313a of the rotatable slider 313 and the end on the subject side in the optical axis direction of the fitting portion 315a of the stopper 315. The spring 314 always energizes the rotatable slider 313 toward the subject in the optical axis direction with respect to the outer frame 311.

The function of the retention frame 31 for the third lens will be described below.

Every time the pusher 312 is pressed toward the image in the optical axis direction with respect to the outer frame 311, the rotatable slider 313 to which the third lens group 13 is fixed moves forward to a position on the subject side in the optical axis direction with regard to the outer frame 311—protrusion state, and recedes backward to a position on the image side in the optical axis direction—retraction state, repeating the protrusion state and retraction state alternately. The retention frame 31 for the third lens in accordance with the embodiment of the invention includes a mechanism that alternately repeats the protrusion state and retraction state. This mechanism is called the "toggle movement mechanism" hereinbelow.

The toggle movement mechanism will be explained referring to FIGS. 31A-31F and FIGS. 32 and 32A-32F.

FIGS. 31A-31F are a side view, respectively, for illustrating a situation in which the third lens retention frame 31 in accordance with the embodiment is on a photographic optical axis and is moved most to the subject in the optical axis direction.

FIG. 32 is an exploded perspective view of FIG. 29C, and is drawn for convenience in referring to FIGS. 32A-32F.

FIGS. 32A-32F are a structural view of the circumferential wall of the rotatable slider 313 of the third lens retention frame 31, and are a partial, side development of the section intersected at the circumferential wall surface of the rotatable slider 313, seen from radially inward to radially outward.

FIGS. 32A-32F do not have reference signs for the details thereof to avoid complexity of the figures. However, since FIG. 32 has the reference signs for the details, please refer to them.

Figure 31B:
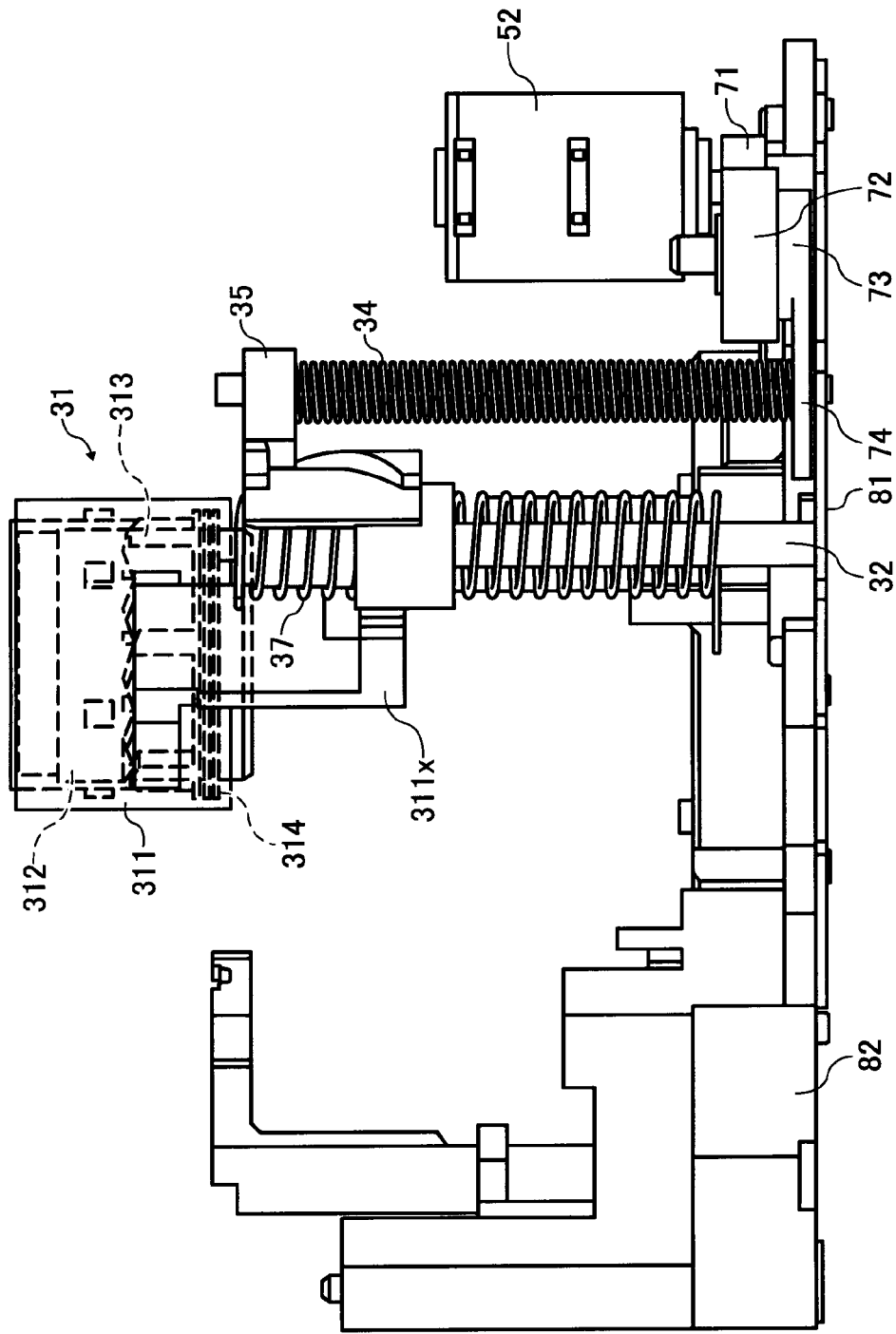
FIG. 31B is a side view of the third lens retention frame in which the pusher is pressed into the image side in the optical axis direction from the subject side in the optical axis direction, from the state shown in FIG. 31A.
Figure 32A:
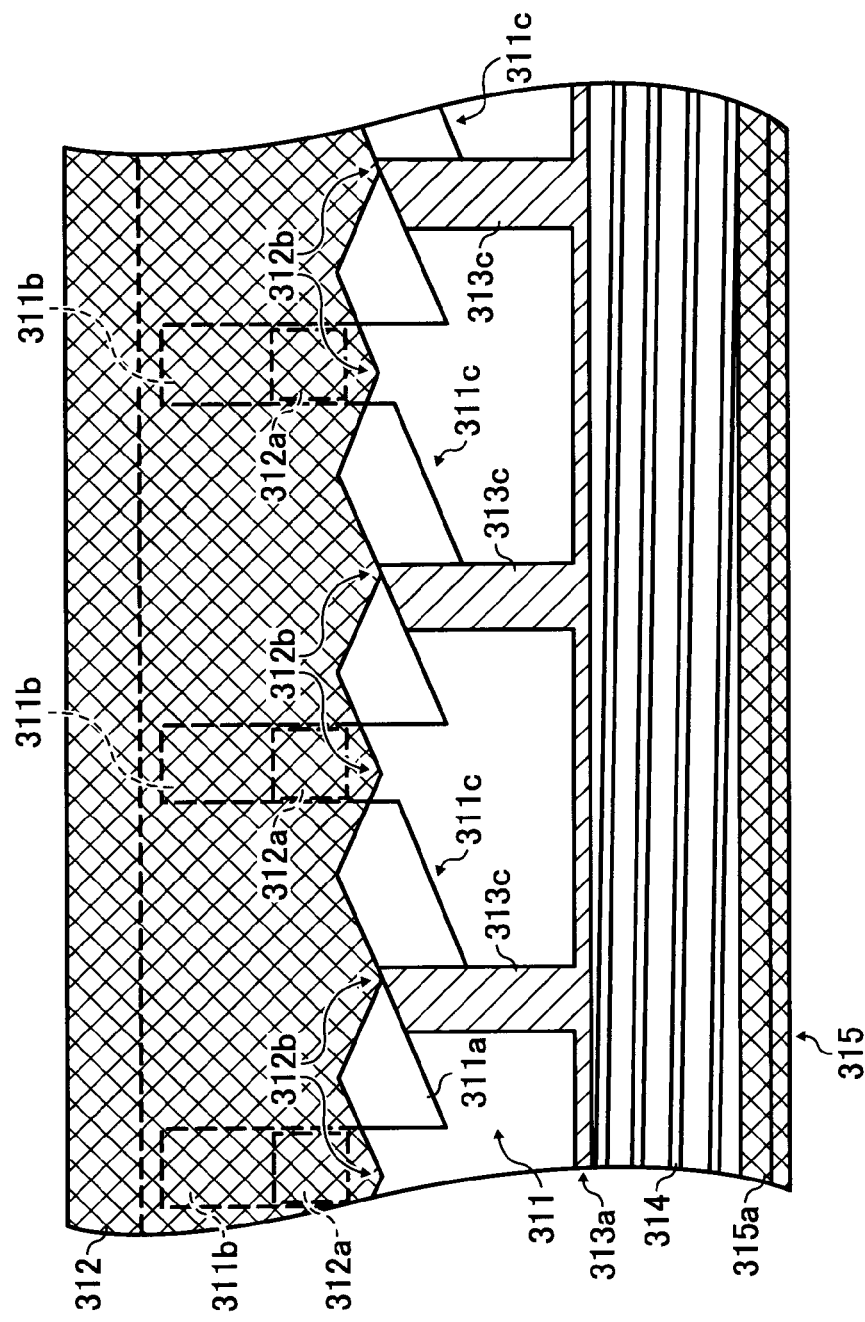
FIG. 32A is a structural view of the circumferential wall of the rotatable slider 313, in which the rotatable slider has moved backward to a position called a retraction state on the image side in the optical axis direction with regard to the outer frame.

FIGS. 31A and 32A illustrate a retraction state in which the rotatable slider 313, to which the third lens group 13 is fixed, is retracted to a position on the image side in the optical axis direction with respect to the outer frame 311.

As shown in FIGS. 31A and 32A, the rotatable slider 313 is always energized toward the subject side in the optical axis direction by a spring 314 with respect to the outer frame 311. The protruding angle portion 313$f$, which belongs to the comb-type fitting portion 313$c$ of the rotatable slider 313, fits in with the indenting angle portion 311$i$, which belongs to the guide portion 311$a$ of the outer frame 311. The rotatable slider 313 is locked with respect to the outer frame 311. At this time, the third lens group 13 is retracted at a receded position on the image side in the optical axis direction, which state corresponds to a "retraction state."

Next, when the front end 312$h$ of the pusher 312 is directed to the image side in the optical axis direction to be pressed by an external force, the pusher 312 moves to the image side in the optical axis direction with respect to the outer frame 311.

Under this situation, the contact surface 312$c$ adjacent to the protruding angle portion 312$e$ that belongs to the contact portion 312$b$ of the pusher 312 touches the contact surface 313$d$ that belongs to the guided portion 313$a$ of the rotatable slider 313. The contact surface 312$c$ presses the contact surface 313$d$ to the image side in the optical axis direction. The force that allows the contact surface 312$c$ to press the contact surface 313$d$ forces the rotatable slider 313 to move to the image side in the optical axis direction with respect to the outer frame 311.

Figure 32B:
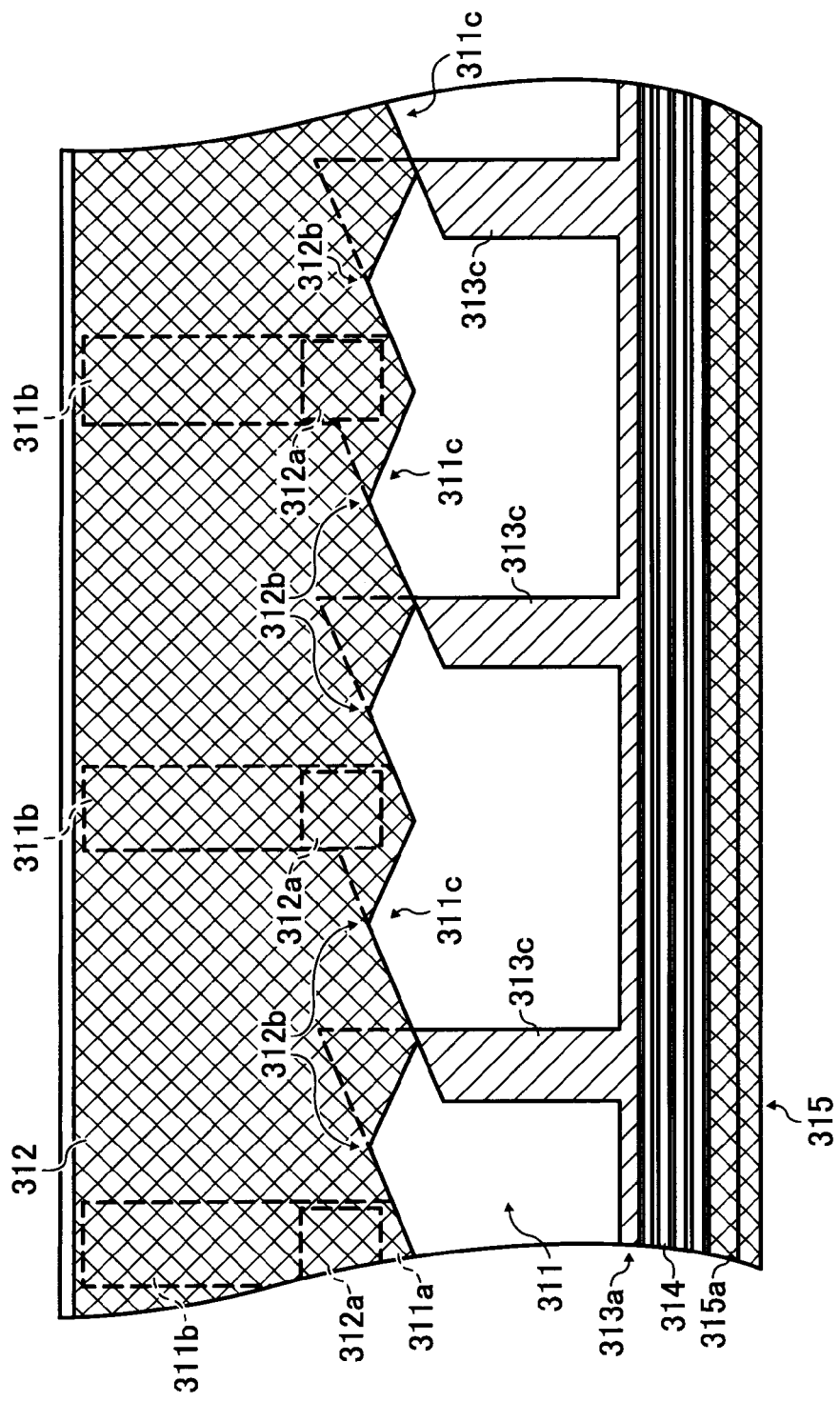
FIG. 32B is a structural view of the circumferential wall of the rotatable slider 313, in which the pusher is pressed into the image side in the optical axis direction from the subject side in the optical axis direction, from the state shown in FIG. 32A.

FIG. 31B and FIG. 32B illustrate a state in which the pusher 312 is pressed in to the image side in the optical axis direction by an external force from the state shown in FIG. 31A and FIG. 32A.

As shown in FIG. 31B and FIG. 32B, until the locked condition, which is engaged with the stopper surface 311$f$ the guide portion 311$a$ of the outer frame 311 owns and the stopped surface 313$e$ the comb-type fitting portion 313$c$ of the rotatable slider 313 owns, is released, the rotatable slider 313 moves to the image side in the optical axis direction with respect to the outer frame 311.

The contact surface 312$c$ the contact surface 312$b$ of the pusher 312 possesses and the contact surface 313$d$ the guided portion of 313$a$ of the rotatable slider 313 possesses are inclined with the same slope concerning the circumferential direction of the pusher 312 and the rotatable slider 313. Therefore, a rotational force for rotating the rotatable slider 313 through the guided portion 313$a$ is produced in the right direction in FIG. 32B, by a circumferential-direction component of a force by which the contact surface 312$c$ presses the contact surface 313$d$.

Figure 31C:
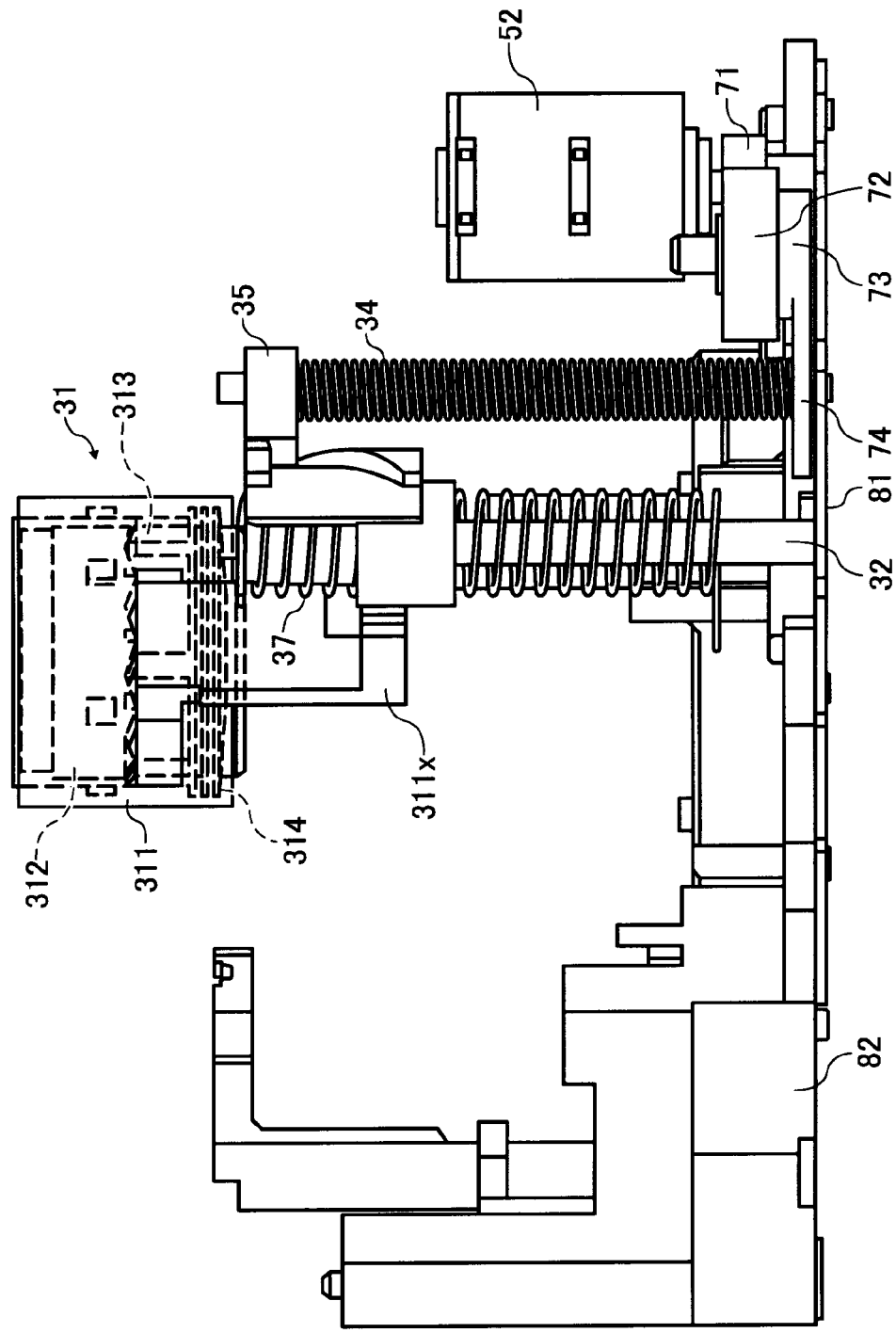
FIG. 31C is a side view of the third lens retention frame in which the rotatable slider is rotating by the spring with regard to the outer frame, showing the state immediately after the state of FIG. 31B.

FIG. 31C and FIG. 32C shows a state immediately after the state shown in FIG. 31B and FIG. 32B, representing a state in which the rotatable slider 313 is rotating regarding the outer frame 311 by a spring 314.

As shown in FIG. 31B and FIG. 32B, when the locked state is released that is caused by an engagement of the stopper surface 311$f$ and the stopped surface 313$e$, the rotatable slider 313 begins rotating by a rotational force in the right direction in FIG. 32C. The contact surface 313$d$ of the rotatable slider 313 moves to the right in FIG. 32C, touching the contact surface 312$c$ of the pusher 312 by the spring 314, and the rotatable slider 313 rotates clockwise around the optical axis, seen from the subject side of the in the optical axis direction.

When the comb-type fitting portion 313$c$ of the rotatable slider 313 reaches the comb-type fitting groove 311$b$ of the outer frame 311, the stopped surface 313$e$ of the comb-type fitting portion 313$c$ strikes the fitting groove stopper surface 311$h$ of the comb-type fitting groove 311$b$ and stops rotating. Simultaneously, the comb-type fitting portion 313$c$ fits in with the comb-type fitting groove 311$b$, and the rotatable slider 313 moves toward the subject side in the optical axis direction since it is pressed to the subject side in the optical axis direction by the spring 314.

Figure 31D:
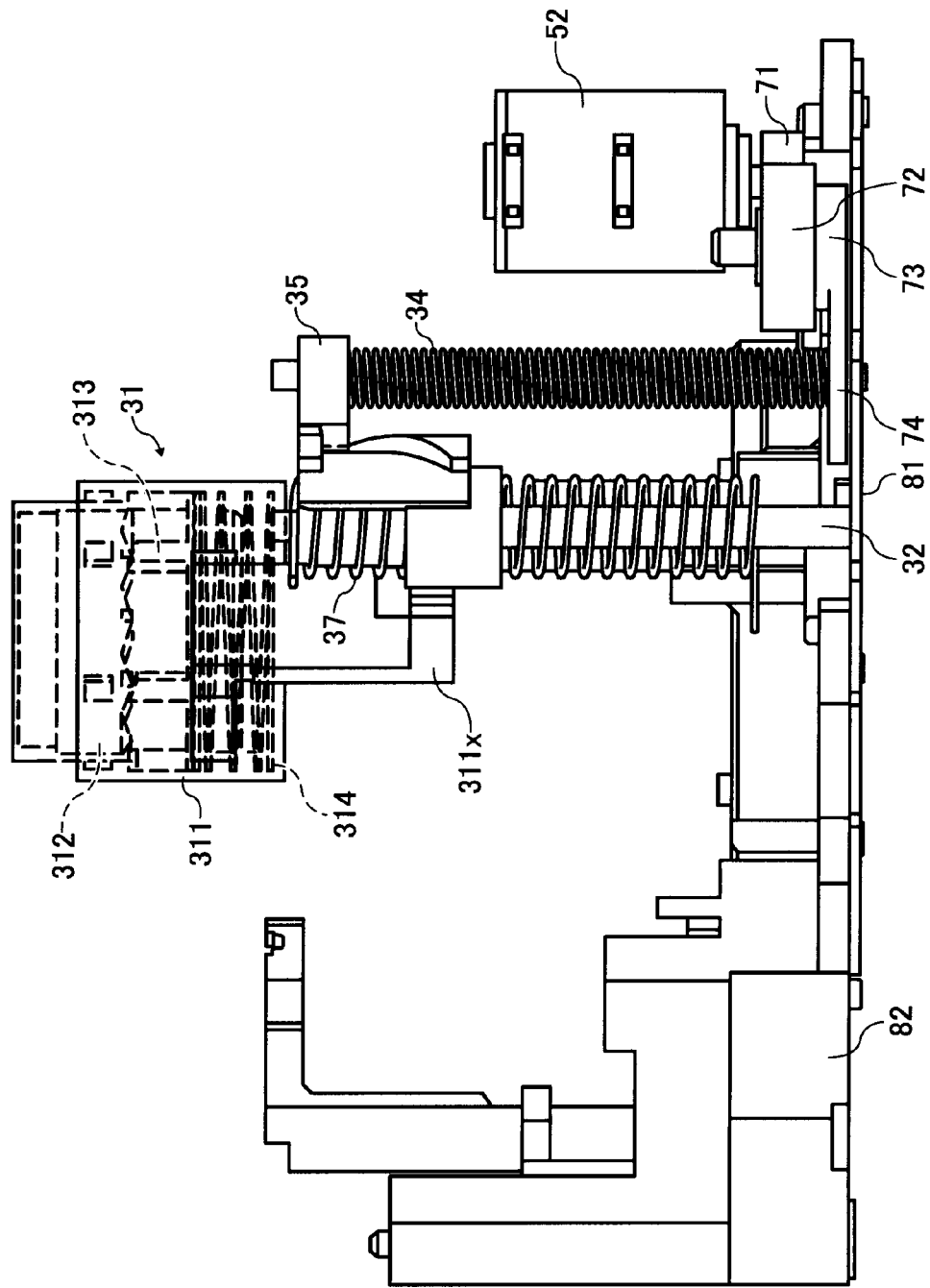
FIG. 31D is a side view of the third lens retention frame in which the rotatable slider has moved forward to a position called a protrusion state on the subject side in the optical axis direction with regard to the outer frame.
Figure 32D:
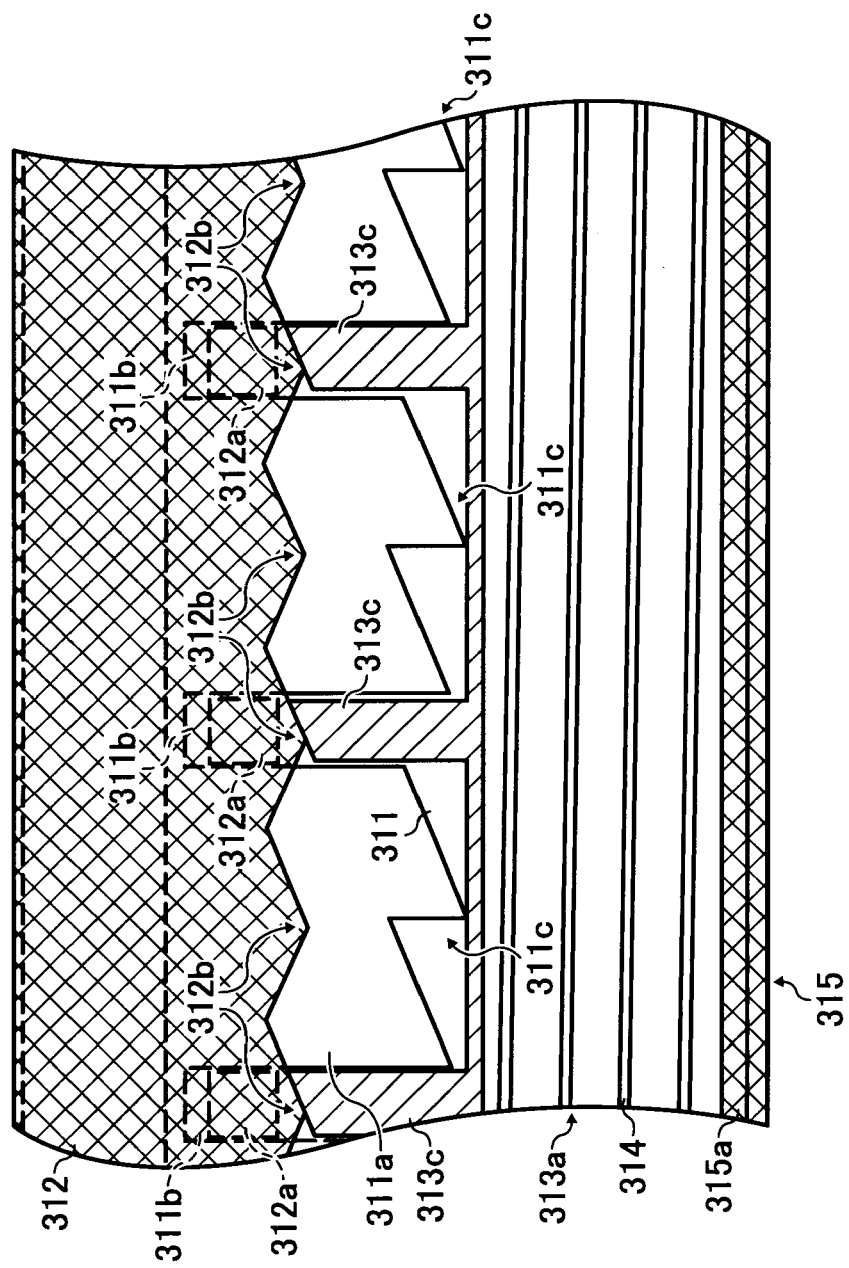
FIG. 32D is a structural view of the circumferential wall of the rotatable slider 313, in which the rotatable slider has moved forward to a position called a protrusion state on the subject side in the optical axis direction with regard to the outer frame.

FIG. 31D and FIG. 32D illustrate a protrusion state in which the rotatable slider 313, at which the third lens group 13 is fixed, has protruded to a forward position on the subject side in the optical axis direction in relation to the outer frame 311.

As shown in FIG. 31D and FIG. 32D, the rotatable slider 313 moves immediately till the stopper flange 313$b$ of the rotatable slider 313 hits the protruding angle portion 311$g$ that belongs to the guide portion 311$a$ of the outer frame 311, and stops after the hitting.

On this occasion, since the contact surface 313$d$ that belongs to the comb-type fitting portion 313$c$ of the rotatable slider 313 pushes up the contact surface 312$c$ close to the protruding angle portion 312$e$ that belongs to the contact portion 312$b$ of the pusher 312, toward the subject side in the optical axis direction, the pusher 312 moves toward the subject side in the optical axis direction with the rotatable slider 313. This allows the front end 313$g$ of the rotatable slider 313 and the front end 312$g$ of the pusher 312 to be protruded from the front end 311$k$ of the outer frame.

Because the third lens group 13 is fixed inside of the front end 313$g$ of the rotatable slider 313, the third lens group 13 is pushed forward to a position on the subject side in the optical axis direction. This state corresponds to the protrusion state.

Next, when the front end 312$h$ of the pusher 312 is pressed toward the image side in the optical axis direction by an external force, the pusher 312 moves toward the image side in the optical axis direction with regard to the outer frame 311.

Under the circumstances, the contact surface 312$c$ close to the protruding angle portion 312$e$ that the contact surface 312$b$ of the pusher 312 possesses touches the contact surface 313$d$ that the guided portion 313$a$ of the rotatable slider 313 possesses. The contact surface 312$c$ presses the contact surface 313$d$ to the image side in the optical axis direction. Owing to a force the contact surface 312$c$ presses the contact surface 313$d$, the rotatable slider 313 moves to the image side in the optical axis direction with respect to the outer frame 311.

Figure 31E:
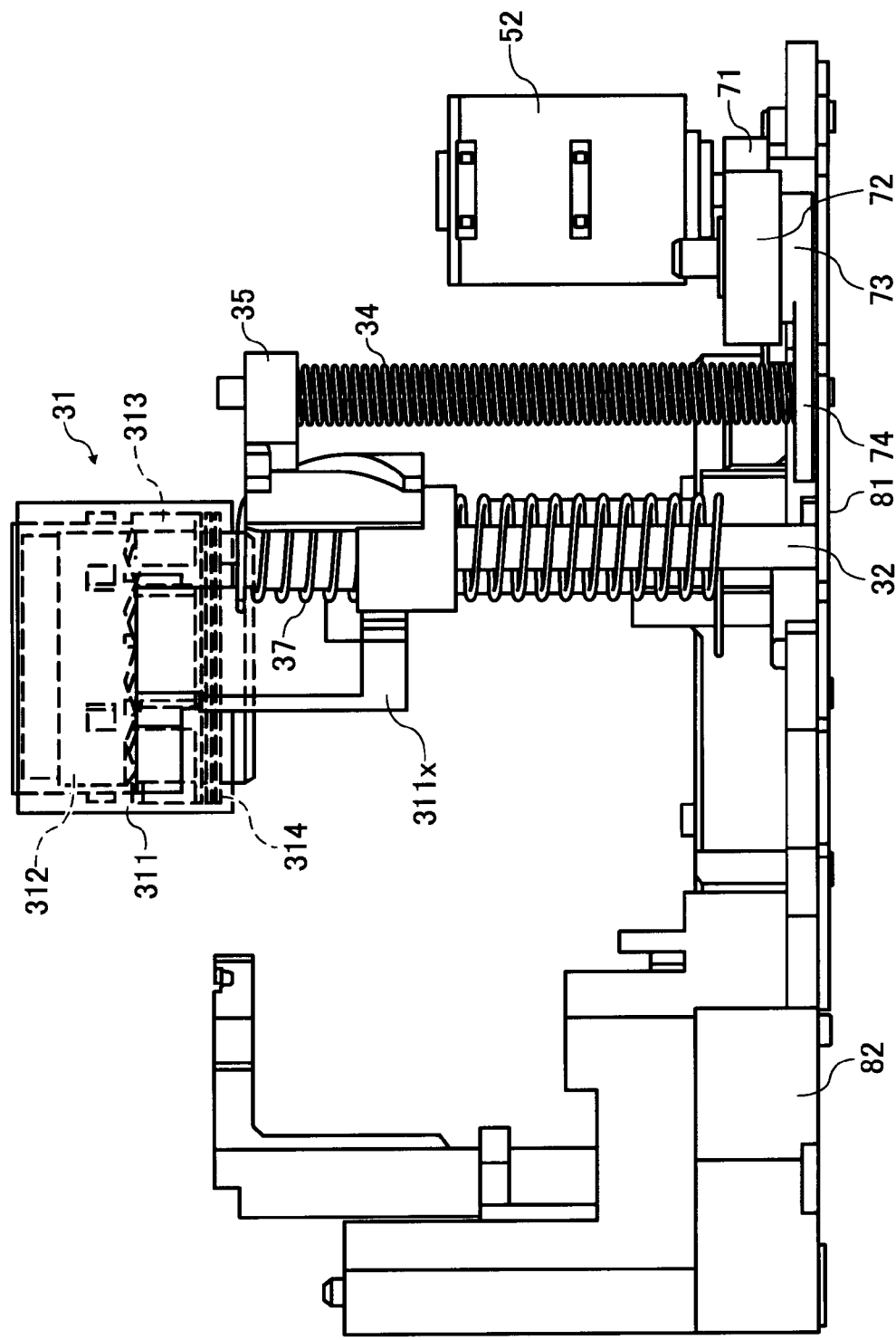
FIG. 31E is a side view of the third lens retention frame in which the pusher is pressed into the image side in the optical axis direction, from the state of FIG. 31D.
Figure 32E:
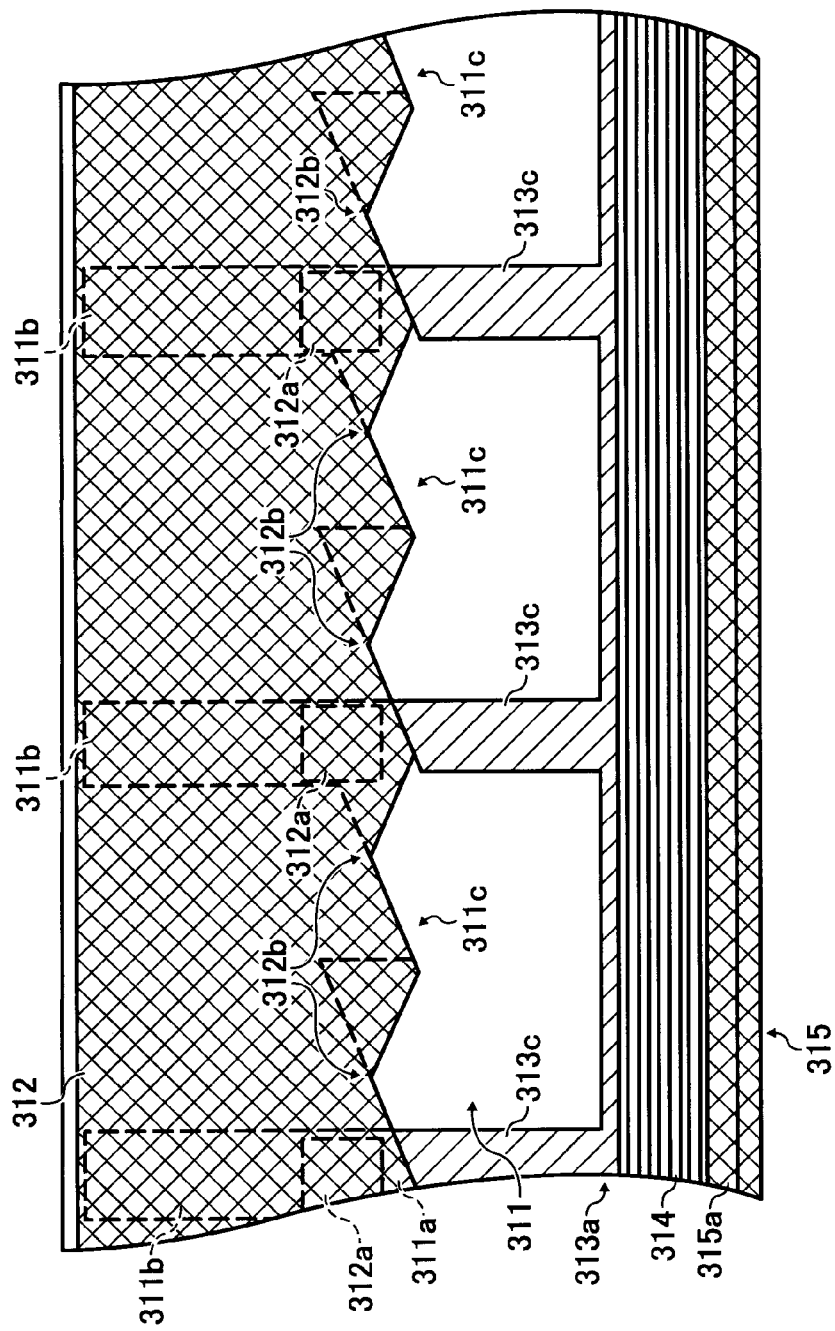
FIG. 32E is a structural view of the circumferential wall of the rotatable slider 313, in which the pusher is pressed into the image side in the optical axis direction, from the state shown in FIG. 32D.

FIG. 31E and FIG. 32E shows a state in which the pusher 312 is pressed in to the image side in the optical axis direction by an external force from a state shown in FIG. 31D and FIG. 32D.

As shown in FIG. 31E and FIG. 32E, until the locked state by the engagement with the stopper surface 311$h$ possessed by the guide portion 311$a$ of the outer frame 311 and the stopped surface 313$e$ possessed by the comb-type fitting portion 313$c$ of the rotatable slider 313 is released, the rotatable slider 313 moves to the image side in the optical axis direction with respect to the outer frame 311.

The contact surface 312$c$ that belongs to the contact surface 312$b$ of the pusher 312 and the contact surface 313$d$ that belongs to the guided portion 313$a$ of the rotatable slider 313 are inclined to have the same slope with respect to the circumferential direction of the pusher 312 and the rotatable slider 313. Therefore, because of the circumferential component of the force by which the contact surface 312c presses the contact surface 313d, a rotational force for rotating the rotatable slider 313 through the guided portion 313a is generated in the right direction in FIG. 32E.

FIG. 31F and FIG. 32F illustrate a state immediately after the state shown in FIG. 31E and FIG. 32E and represent a state in which the rotatable slider 313 is being rotated by a spring 314 with respect to the outer frame 311.

As shown in FIG. 31E and FIG. 32E, when the locked state is released that is caused by an engagement of the stopper surface 311f and the stopped surface 313h, the rotatable slider 313 begins rotating by a rotational force in the right direction in FIG. 32F. The contact surface 313d of the rotatable slider 313 moves to the right in FIG. 32 F, touching the contact surface 312c of the pusher 312 by the spring 314, and the rotatable slider 313 rotates clockwise around the optical axis, seen from the subject side of the in the optical axis direction.

When the protruding angle portion 313f that belongs to the comb-type fitting portion 313c of the rotatable slider 313 reaches the indenting angle portion 311i that belongs to the guide portion 311a of the outer frame 311, the stopped surface 313e of the comb-type fitting portion 313c strikes the stopper surface 311f of the comb-type fitting groove 311b and stops rotating. Simultaneously, the stopped surface 313e fits in with the indenting angle portion 311i that belongs to the guide portion 311a of the outer frame 311. The rotatable slider 313 return to the states shown in FIG. 31A and FIG. 32A in which it is locked with respect to the outer frame 311.

As shown in FIG. 31A and FIG. 32A, the third lens group 13 is retracted to a receded position on the image side in the optical axis direction, which corresponds to the retraction state.

According to the toggle operation mechanism as described above, every time the pusher 312 is pressed by an external force applied to the image side in the optical axis direction, the retraction state shown in FIG. 31A and FIG. 32A and the protrusion state shown in FIG. 31D and FIG. 32D can be switched alternately.

FIG. 33 a conceptual view of the lens barrel for explaining an operational method of the third lens retention frame 31 in accordance with the embodiment of the invention.

Figure 33A:
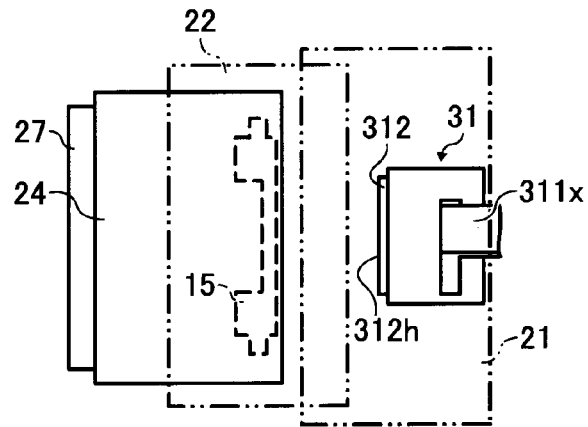

In order that the pusher 312 is pressed in to the image side in the optical axis direction from the subject side in the optical axis direction, with respect to the third lens retention frame 31 to put the third lens retention frame 31 of the retraction state into the protrusion state, for example, as shown in FIG. 33A, first, the third lens retention frame 31 is placed on the photographical optical axis.

Figure 33B:
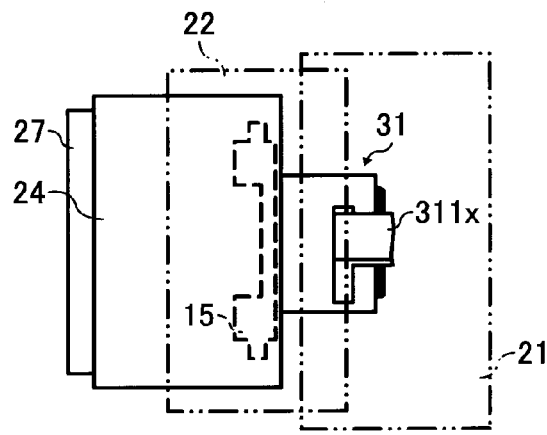

Then, as shown in FIG. 33B, the third lens retention frame 31 is moved forward to the subject side in the optical axis direction. The front end 312h of the pusher 312a, which protrudes toward the subject side in the optical axis direction of the third lens retention frame 31, is pressed against the end of the image side in the optical axis direction of the shutter surface owned by the shutter/aperture unit 15, by driving the third lens retention frame 31 toward the subject side in the optical axis direction.

Figure 33C:
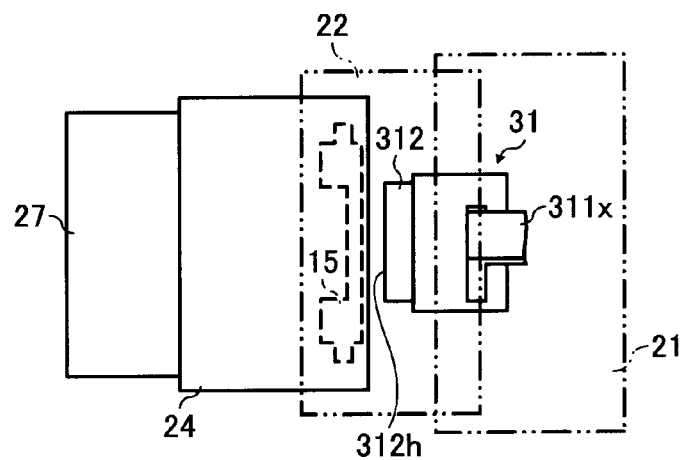

Next, as shown in FIG. 33C, when the second rotary cylinder 24 and the linearly-moving cylinder 27 are pushed forward toward the subject side in the optical axis direction, the shutter/aperture unit 15 are also pushed forward with the second rotary cylinder 24 to the subject side in the optical axis direction. Accordingly, the pressure by the shutter surface of the shutter/aperture unit 15 to the pusher 312 is released, which leads to a protrusion state in which the rotatable slider 313 is moved forward to the subject side in the optical axis direction with respect to the outer frame 311.

The first rotary cylinder 22, the second rotary cylinder 24, and the linear-moving cylinder constitute a movable lens cylinder. The movable lens cylinder is driven by a lens retention drive unit, which corresponds to, for example, the zoom motor 51.

Since the third lens group 13 is fixed at the rotatable slider 313, when the rotatable slider 313 becomes a protrusion state, the distance is made larger relatively compared with the retraction state, with respect to the fourth lens group 14 located closely on the image side in the optical axis direction than the third lens group 13. This constructs a lens system having a higher magnification.

So as to restore into the retraction state the third lens retention frame (also called "receding lens retention frame") 31 in the protrusion state, by pushing the pusher 312 to the image side in the optical axis direction from the subject side in the optical axis direction, relative to the third lens retention frame 31, the reverse procedures with regard to the above described procedure should be used.

As shown in FIG. 33C, the third lens retention frame 31 should be moved to the subject side in the optical axis direction, maintaining so.

As shown in FIG. 33B, the second rotary cylinder 24 and the linear-moving cylinder 27 are receded and collapsed from the state in which they are pushed to the subject side in the optical axis direction, and the shutter/aperture unit 15 is driven to the image side in the optical axis direction. By doing so, the front end 312 of the pusher 12, which protrudes to the subject side in the optical axis direction of the third lens retention frame 31, is halted, being pressed.

As shown in FIG. 33A, when the third lens retention frame 31 is moved to the image side in the optical axis direction on the photographic optical axis, the rotator slider 313 returns to the receded position on the image side in the optical axis direction, namely, the retraction state, with respect to the outer frame 311.

After this, recession from the photographic optical axis of the third lens retention frame 31 and collapse of the lens barrel are performed.

Although the figures does not show, there is another method described below. A lock release mechanism is provided that is identical to the pusher 312 on the image side in the optical axis direction of the third lens retention frame. The lock release mechanism is constructed to be activated by pressing the third lens retention frame from the image side in the optical axis direction. Receding the third lens retention frame toward the image side in the optical axis direction enables lock release by a protrusion provided on the image side in the optical axis direction rather than the third lens retention frame. Then, the third lens retention frame is exchanged from the retraction state to the protrusion state.

There is another method described below. The third lens retention frame 31 is disposed on the image side in the optical axis direction on the photographic optical axis to be fixed at a lens barrel base 82. For example, a camera user manually pushes the first lens group 11 in from the front, by which an external force by the user, who pushes in the first lens group 11 from the front, is transferred. A structure is provided that presses the front end 312h of the pusher 312 protruding from the third lens retention frame 31. By doing so, the third lens retention frame pusher 31c is pressed down.

Devices such as a digital camera, a portable information terminal and an image input apparatus, whose appearance is slightly different from that of cameras, have essentially identical structure and function to those of cameras. Digital cameras, portable information terminals and image input apparatus can adopt an optical system device including a movable lens cylinder in accordance with the invention.

The operation and advantage of the third lens retention frame 31 will be described below.

Figure 34:
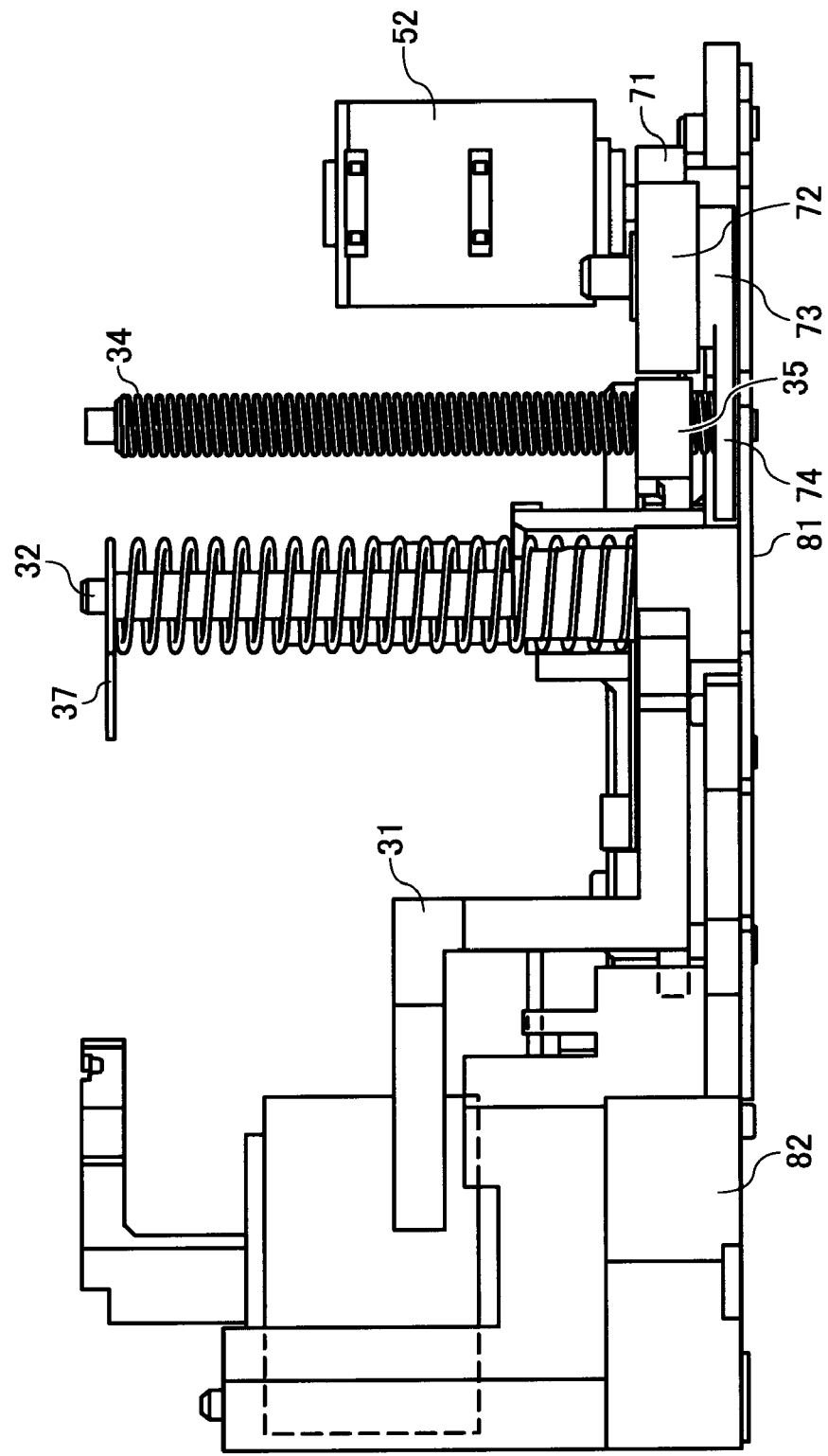
FIG. 34 is a side view of the third lens retention frame in the prior art whose retraction state is shown.
Figure 35:
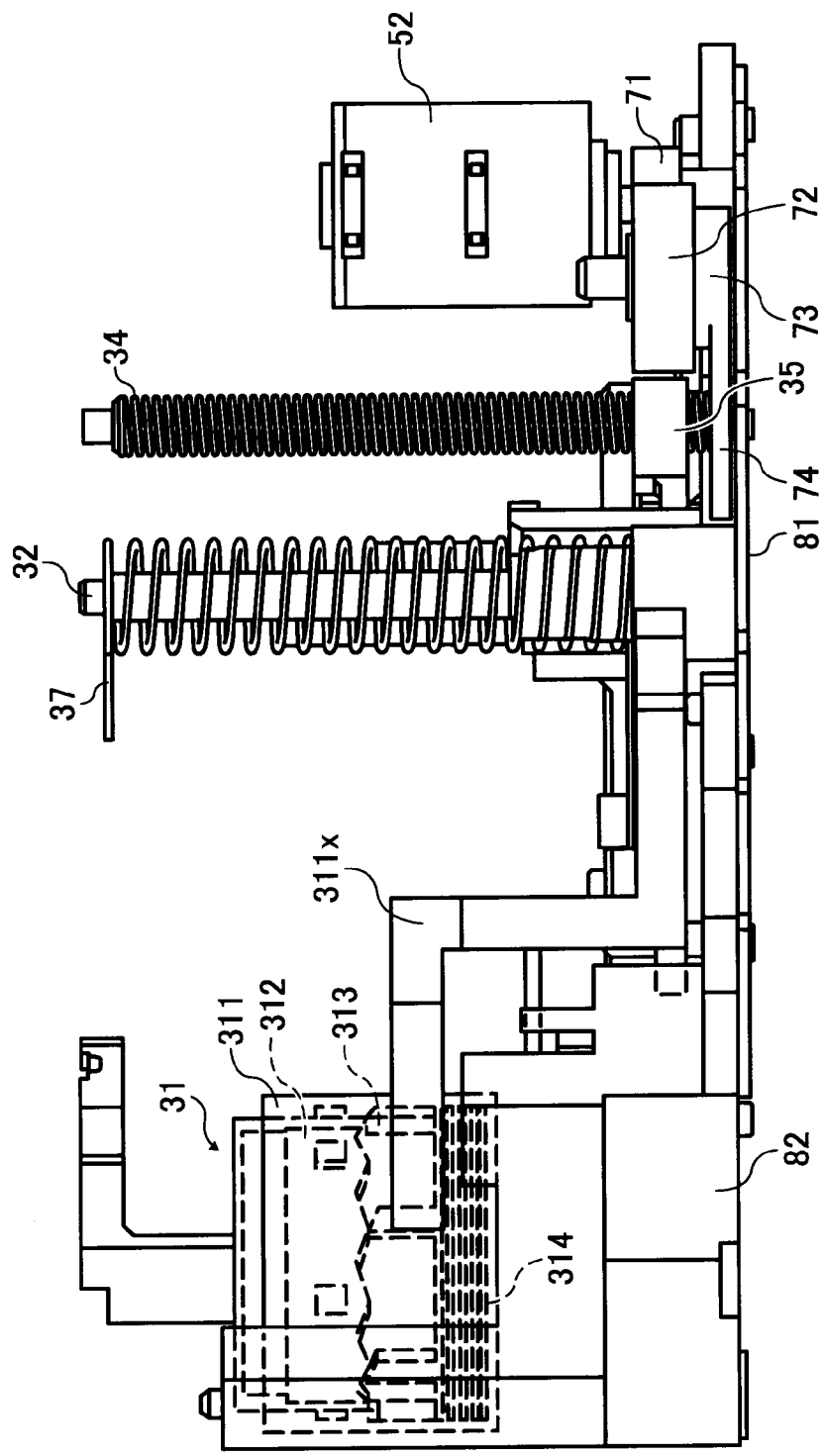
FIG. 35 is a side view of the third lens retention frame according to an embodiment of the invention whose retraction state is shown.
Figure 36:
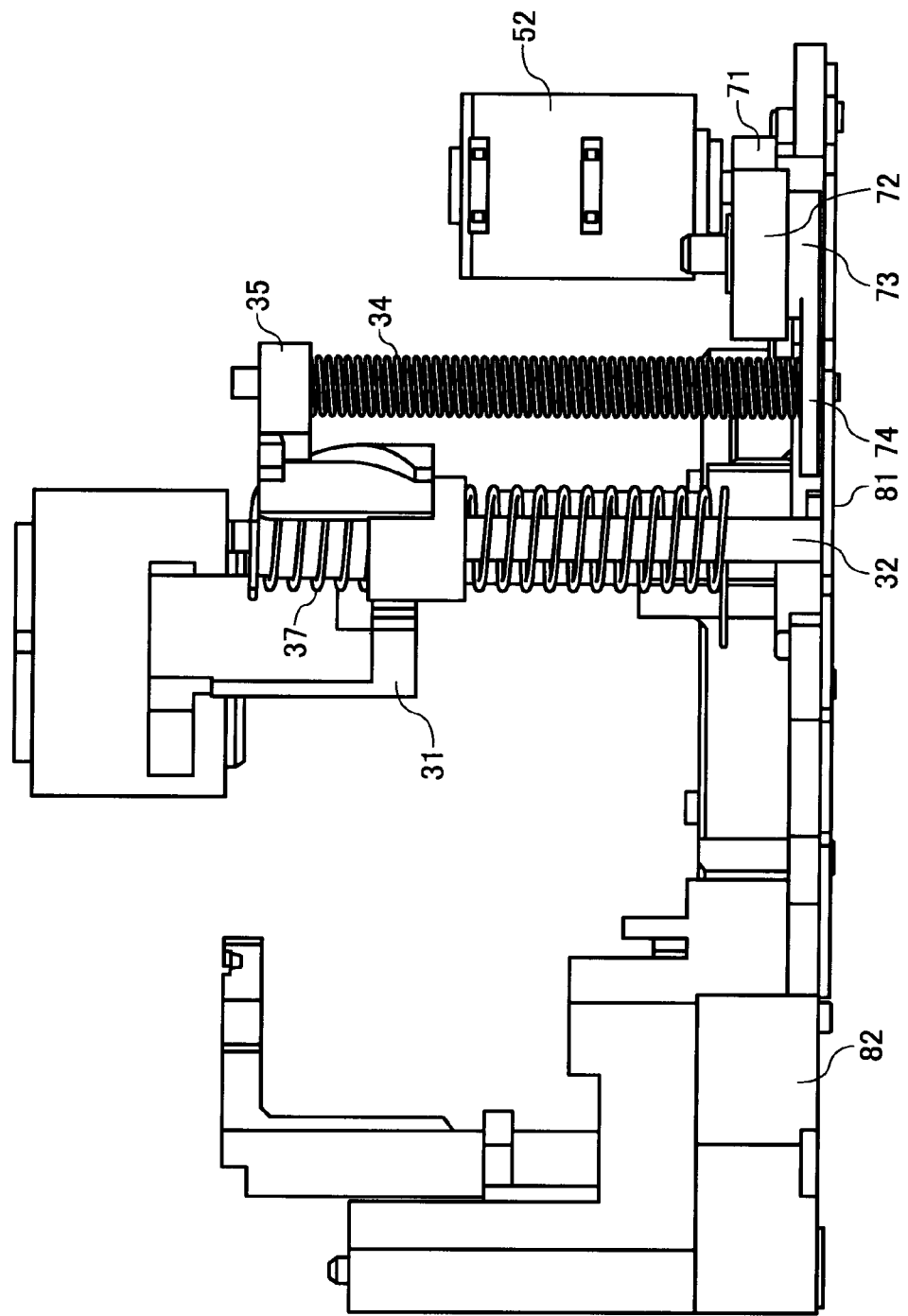
FIG. 36 is a side view of the third lens retention frame in the prior art that is moved most to the subject side in the optical axis direction on the optical axis.

FIG. 34 is a side view of the third lens retention frame in the prior art whose retraction state is shown. FIG. 35 is a side view of the third lens retention frame according to an embodiment of the invention whose retraction state is shown. FIG. 36 is a side view of the third lens retention frame in the prior art that is moved most to the subject side in the optical axis direction on the optical axis.

Every time the rotatable slider 313 is pushed by an external force that is applied to the optical axis direction through the pusher 312, it has a structure that can alternately take two positions between a forward position—that advances to the subject side in the optical axis direction with respect to the outer frame 311—and a backward position—that recedes to the image side in the optical axis direction with respect to the outer frame 311.

In the collapsed position, the rotatable slider 313 is disposed at a receded position with respect to the outer frame 311. While the thickness of the body having the lens barrel is maintained at the same level as in the past, the rotatable slider 313 is placed at an advanced position with respect to the outer frame 311 in a photographing state. This enables a lens system having a plurality of lens groups to have a higher magnification than in the past.

Comparing FIG. 34 with FIG. 35, in the collapsed state, the third lens retention frame in accordance with the embodiment of the invention has almost the same length in the optical axis direction in retracting as that of the third lens retention frame in the prior art system. On the other hand, in the protrusion state in photographing, as shown in FIG. 31D, the third lens retention frame of the present embodiment has the rotatable slider 313 pushed more, by forward stroke's length, toward the subject side in the optical axis direction, compared with the third lens retention frame of the prior art system shown in FIG. 36.

In this way, according to the third lens group 13 of the present embodiment, the third lens group 13 can be pushed more to the subject side in the optical axis direction in photographing, without making longer the length in the optical axis direction of the third lens retention frame 31 in the collapsed position.

On the contrary, in a photographing state, the rotatable slider 313 is placed at an advanced position with reference to the outer frame 311, in which a magnification of a lens system having a plurality of lens groups is maintained at the same level as in the past. In the collapsed state, the rotatable slider 313 is placed at a receded position with respect to the outer frame 311. By doing so, the thickness of the body including the lens barrel can be made thinner than in the past.

As described above, the direction to which the rotatable slider 313 is pushed through the pusher 312 with respect to the outer frame 311 is one that directs to the image side in the optical axis direction. The portion on the subject side in the optical axis direction than the rotatable slider 313 in the body is pushed. Thus, the rotatable slider 313 can be placed at two positions—a forward position and a backward position—with respect to the outer frame 311.

Because of this, making use of the movable lens cylinder provided on the subject side in the optical axis direction than the third lens retention frame 31, the position of the rotatable slider 313 can be changed easily.

In addition, the rotatable slider 313 is pressed toward the optical axis direction by the movable lens cylinder provided on the subject side in the optical axis direction than the third lens retention frame 31. Therefore, the rotatable slider 313 can be pushed in with respect to the outer frame 311 even if a driving force of the driving unit for the third lens retention frame 31 is small.

When a lock release mechanism, which is identical to the pusher 312, is provided on the image side in the optical axis direction of the third lens retention frame 31, the direction to which the rotatable slider 313 is pushed through the pusher 312 with respect to the outer frame 311 is one toward the subject side in the optical axis direction. The portion on the image side in the optical axis direction than the rotatable slider 313 in the body is pushed. Thus, the rotatable slider 313 can be placed at two positions—a forward position and a backward position—with respect to the outer frame 311.

Owing to this, when the rotatable slider 313 moves to a forward position with respect to the outer frame 311, interference with the lens retention frame on the subject side in the optical axis direction than the third lens retention frame 31 can be avoided. As a result, the rotatable slider 313 can be moved forward closer to the subject side in the optical axis direction.

Moreover, since the rotatable slider 313 is pushed by the protrusion fixed on the image side in the optical axis direction than the lens barrel, with the third lens retention frame 31 fixed, the rotatable slider 313 can be stably pushed in.

In either case, because the rotatable slider 313 is pushed in the optical axis direction with respect to the outer frame 311, by driving the third lens retention frame 31, there is no need for providing an additional power source.

When the rotatable slider 313 is pressed through the pusher 312 by a force from a user, it can actually be pressed even if a driving force from the driving unit of the third lens retention frame 31 or a driving force for driving the movable lens cylinder on the subject side in the optical axis direction than the third lens retention frame 31 is small.

Incorporating into a digital camera, portable information terminal and image input apparatus an optical system apparatus having the movable lens cylinder in accordance with the invention makes thinner the digital camera, portable information terminal and image input apparatus.

The present embodiment shows a structure in which the projected length of the rotatable slider 313 with respect to the third lens retention frame 31 changes alternately, according to the toggle operation mechanism owned by the third lens retention frame 31. Any mechanism will do, as far as a receding lens retention frame includes a movable barrel that can move in the optical axis direction, the movable barrel includes at least one lens group, and every time the movable barrel is pushed to the optical axis direction, a projected length of the movable barrel with respect to the receding lens retention frame changes alternately.

The present embodiment employs a push-out mechanism having two stages—a retraction state and a projection state—by the toggle operation mechanism. However, the present invention need not necessarily have the two-stage push-out mechanism; instead, can use a three- or more stage push-out mechanism.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. A lens barrel provided in a body, comprising:
a plurality of lens groups;
a plurality of lens retention frames for retaining each of the plurality of lens groups to make a collapsed state in which at least a part of the plurality of lens groups is collapsed inside the body and a photographing state in which the part of the plurality of lens groups is moved to a subject side in an optical axis direction from the collapsed state;
a movable lens cylinder for retaining the lens retention frames inside;
a retractable lens retention frame configured to retain a retractable lens group; and
a lens retention frame drive unit for driving the movable lens cylinder and the retractable lens retention frame,
wherein, in the photographing state, all of the lens groups and the retractable lens group are disposed at a photographing position on a photographic optical axis, and in the collapsed state, the retractable lens group is retracted into a retracted position that lies out of the photographic optical axis and at the same time is outside a maximum outer radius of the movable lens cylinder of the other lens groups, the retractable lens retention frame including:
an arm for moving the retractable lens group between the photographing position and the retracted position;
an outer frame incorporating the arm;
an inner frame movable in the optical axis direction with respect to the outer frame for holding the retractable lens group thereof; and
an energizing member provided between the outer frame and the inner frame for energizing the inner frame to the optical axis direction with respect to the outer frame,
wherein the inner frame is constructed to alternately take two positions of a forward position and a backward position, every time the inner frame is pushed by an external force applied in the optical axis direction, the forward position proceeding forward to the subject side in the optical axis direction with respect to the outer frame, the backward position proceeding backward to the image side in the optical axis direction with respect to the outer frame.

2. The lens barrel of claim 1, further comprising:
a fitting groove formed to extend to the outer frame parallel to the optical axis; and
a fitting protrusion formed to fit in with and be guided by the fitting groove in the inner frame,
wherein the two positions are formed, according to a state when the fitting groove and the fitting protrusion are fitted and another state when they are not.

3. The lens barrel of claim 1, wherein the inner frame is pushed to a direction of the image side of the optical axis direction with respect to the outer frame.

4. The lens barrel of claim 1, wherein the inner frame is pushed to a direction of the subject side of the optical axis direction with respect to the outer frame.

5. The lens barrel of claim 1, wherein the inner frame is pushed to the optical axis direction with respect to the outer frame by driving the one lens retention frame.

6. The lens barrel of claim 1, wherein the inner frame is pushed to the optical axis direction with respect to the outer frame by driving the movable lens cylinder.

7. The lens barrel of claim 1, wherein the inner frame is pushed to the optical axis direction with respect to the outer frame by a force from a user.

8. A camera comprising the lens barrel of claim 1.

9. A digital camera comprising the lens barrel of claim 1.

10. A portable information terminal comprising the lens barrel of claim 1.

11. An image input device comprising the lens barrel of claim 1.

12. The lens barrel of claim 1, wherein the energizing member is a spring.

* * * * *